US009047251B2

(12) United States Patent
Suganthi et al.

(10) Patent No.: US 9,047,251 B2
(45) Date of Patent: Jun. 2, 2015

(54) SYSTEMS AND METHODS FOR IMPLEMENTING CONNECTION MIRRORING IN A MULTI-CORE SYSTEM

(75) Inventors: Josephine Suganthi, Santa Clara, CA (US); Sergey Vezunov, Moscow (RU)

(73) Assignee: CITRIX SYSTEMS, INC., Fort Lauderdale, FL (US)

( * ) Notice: Subject to any disclaimer, the term of this patent is extended or adjusted under 35 U.S.C. 154(b) by 523 days.

(21) Appl. No.: 13/330,164

(22) Filed: Dec. 19, 2011

(65) Prior Publication Data
US 2012/0159235 A1  Jun. 21, 2012

Related U.S. Application Data

(60) Provisional application No. 61/425,116, filed on Dec. 20, 2010.

(51) Int. Cl.
*G06F 11/00* (2006.01)
*G06F 11/20* (2006.01)
*H04L 29/14* (2006.01)

(52) U.S. Cl.
CPC .......... *G06F 11/203* (2013.01); *G06F 11/2028* (2013.01); *G06F 11/2041* (2013.01); *G06F 11/2048* (2013.01); *G06F 2201/815* (2013.01); *H04L 69/40* (2013.01)

(58) Field of Classification Search
CPC ............ G06F 11/2005; G06F 11/2028; G06F 2201/815; G06F 2201/85; G06F 11/203; G06F 11/2038; G06F 11/2041; G06F 11/2048; G06F 11/2097; G06F 11/1662; G06F 11/3419; G06F 11/3495; G06F 17/30575; G06F 2201/86; G06F 2201/87; G06F 17/3033
USPC .................................................. 714/4.11, 6.3
See application file for complete search history.

(56) References Cited

U.S. PATENT DOCUMENTS

| 8,289,975 | B2 * | 10/2012 | Suganthi et al. ......... 370/395.53 |
| 8,327,181 | B2 * | 12/2012 | Gopinath et al. ............. 714/4.11 |
| 8,670,304 | B1 * | 3/2014 | Reynolds et al. ............ 370/220 |
| 2002/0156613 | A1 | 10/2002 | Geng et al. |
| 2006/0248581 | A1 * | 11/2006 | Sundarrajan et al. ........... 726/12 |
| 2010/0325474 | A1 * | 12/2010 | Gopinath et al. ................. 714/4 |

OTHER PUBLICATIONS

International Search Report issued Mar. 26, 2012 in PCT Application no. PCT/US2011/065849.

* cited by examiner

*Primary Examiner* — Bryce Bonzo
*Assistant Examiner* — Elmira Mehrmanesh
(74) *Attorney, Agent, or Firm* — Foley & Lardner LLP; Christopher J. McKenna

(57) ABSTRACT

The present application is directed to systems and methods for providing failover connection mirroring between two or more multi-core devices intermediary between a client and a server. A first multi-core device may receive a hash key of a second multi-core device for mapping packets to cores of the second multi-core device. The first device may identify a core of the second device using (i) the hash key of the second device and (ii) tuple information corresponding to a connection between the client and the server via the first device. The first device may determine that the identified core is not a desired core for providing a failover connection. The first device may modify the tuple information so as to identify the desired core when used with the hash key of the second device. The first device may use the modified tuple information to establish the failover connection.

20 Claims, 22 Drawing Sheets

SYSTEMS AND METHODS FOR IMPLEMENTING CONNECTION MIRRORING IN A MULTI-CORE SYSTEM

RELATED APPLICATION

This present application claims priority to U.S. Provisional Patent Application Ser. No. 61/425,116, entitled "SYSTEMS AND METHODS FOR IMPLEMENTING CONNECTION MIRRORING IN A MULTI-CORE SYSTEM", filed on Dec. 20, 2010, incorporated herein by reference in its entirety for all purposes.

A portion of the disclosure of this patent document contains material which is subject to copyright protection. The copyright owner has no objection to the facsimile reproduction by anyone of the patent document or the patent disclosure, as it appears in the file or records of the Patent and Trademark Office, but otherwise reserves all copyright rights whatsoever.

FIELD OF THE DISCLOSURE

The present application generally relates to data communication networks. In particular, the present application relates to systems and methods for maintaining operation of connections by multi-core intermediaries providing service between clients and servers upon failover.

BACKGROUND OF THE DISCLOSURE

An enterprise may provide a service to users accessing servers from client machines via intermediaries deployed by the enterprise between the clients and servers. The intermediaries may manage and control the network traffic to enhance the user experience. Sometimes, one or more intermediaries may be unavailable. When intermediaries become unavailable, service, such as session service or a connection, to users may be disrupted.

BRIEF SUMMARY

In some aspects the present disclosure relates to systems and methods for setting up a failover functionality such that connections that are supported by one core on a primary device are successfully maintained and kept alive by another core, or multitude of cores, on a secondary device. For example, a primary multi-core intermediary device may set up a connection on a first core of the primary device. The primary device may intend to set up a backup of the same connection on another core of the secondary multi-core intermediary device. Setting up a backup of the connection may entail performing any necessary steps so that the core on the secondary device may take over and process any incoming requests with respect to the connection should such requests arise. This may include setting up a connection, acquiring information necessary for maintaining a connection, such as server side and client side IP addresses, server side and client side MAC addresses, server side and client side port numbers and any other process related settings and/or configurations, such as compression/decompression information, encryption/decryption settings and any connection specific processing functionalities.

In order to set up a backup of a connection on a secondary device, a packet engine on the core of the primary device responsible for the connection may use an algorithm to identify the target core of the secondary device on which the connection will be established. Such algorithm may enable the packet engine to calculate a target core on the secondary multi-core device by processing information using inputs, such as an RSS key of a secondary multi-core device and tuple information of a connection. The tuple information of the connection may include any connection specific information, for example a source IP address, a destination IP address, a client side port number, a server side port number, a source MAC address, a destination MAC address or any other connection specific information. In some embodiments, the tuple information is a 4-tuple information of a connection, such as a source IP address, destination IP address, source port number and destination port number. Once the algorithm processes the RSS key and the tuple information, the algorithm may identify the core on the secondary device which will support the backup of the connection. As the RSS key of the secondary device may be different than the RSS of the primary device, the target core of the secondary does not have to correspond to the core that is the primary.

Once the target core of the secondary is identified by the primary, the primary may send to the secondary all the relevant information for setting up a backup connection. As the secondary device may forward the incoming transmission with the connection backup information to a core of the secondary device based on the algorithm, the primary core may modify the information to ensure that the correct target core is picked. In one embodiment, the primary core on the primary device modifies a port number of the tuple information to identify a different available port of the device. Such modification may ensure that the algorithm independently calculates to forward the transmission with backup information to the core of the secondary that the primary core identified as the target core of the secondary. Thus, based on the modified port number in the 4-tuple information of the connection, the primary core may transmit to the intended target core of the secondary and the secondary may receive any intended information directly and without using core-to-core messaging when a non-target core receives a transmission intended for the target core on the secondary.

In one aspect, the disclosure is directed to a method for providing failover connection mirroring between two or more multi-core devices intermediary between a client and a server. The method include receiving, by a first multi-core device intermediary between a client and a server, a hash key of a second multi-core device for distributing packets to cores of the second multi-core device. The first multi-core device may identify a core of the second multi-core system using (i) the hash key of the second multi-core device and (ii) tuple information corresponding to a connection between the client and the server via the first multi-core device. The first multi-core device may determine that the identified core of the second multi-core device is not a desired or target core for providing a failover connection between the client and the server. The first multi-core device may modify the tuple information so as to identify the desired or target core when used with the hash key of the second multi-core system. The first multi-core device may use the modified tuple information to establish the failover connection in the second multi-core device.

In some embodiments, first multi-core device applies the tuple information to the hash key to evaluate to a result corresponding to a core of the second multi-core system. The first multi-core device may identify, as the desired or target core for providing the failover connection, a core that is at least one of: available and operational. The first multi-core device may modify at least one of a port number and an address in the tuple information. The first multi-core device may use the modified tuple information to establish the failover connection via the desired or target core of the second multi-core device. The first multi-core device may communicate the modified tuple information to the second multi-core device to establish the failover connection.

In some embodiments, first multi-core device establishes a stateful failover connection in the second multi-core device mirroring the connection in the first multi-core device. The first multi-core device may communicate client-side and server-side process information to the second multi-core device to establish the failover connection with the client and the server. The first multi-core device may communicate network address translation information to the second multi-core device to establish the failover connection with the client and the server. The first multi-core device may establish a failover connection via a second core of the second multi-core device mirroring a connection via a second core of the first multi-core device.

In one aspect, the disclosure is directed to a system for providing failover connection mirroring between two or more multi-core devices intermediary between a client and a server. The system may include a first multi-core device intermediary between a client and a server. The first multi-core device may receive a hash key for mapping network traffic to cores of the second multi-core device. The first multi-core device may use the hash key to identify a core of the second multi-core device when used with tuple information corresponding to a first connection between the client and the server via the first multi-core device. The first multi-core device may determine that the identified core is not a desired or target core for providing a failover connection between the client and the server. The first multi-core device may modify the tuple information, so that the modified tuple information identifies the desired or target core when used with the hash key of the second multi-core system. The first multi-core device may use modified tuple information to establish the failover connection in the second multi-core device.

In some embodiments, the first multi-core device applies the tuple information to the hash key to evaluate to a result corresponding to a core of the second multi-core system. The first multi-core device may identify, as the desired or target core for providing the failover connection, a core that is at least one of: available and operational. The modified tuple information may comprise at least one of a port number and an address which is modified from that of the tuple information corresponding to the first connection. The modified tuple information may be used to establish the failover connection via the desired or target core of the second multi-core device. The first multi-core device may communicate the modified tuple information to the second multi-core device to establish the failover connection. The first multi-core device may use the modified tuple information to establish a stateful failover connection in the second multi-core device mirroring the connection in the first multi-core device.

In some embodiments, the first multi-core device communicates client-side and server-side process information to the second multi-core device to establish the failover connection with the client and the server. The first multi-core device may communicate network address translation information to the second multi-core device to establish the failover connection with the client and the server. The first multi-core device may facilitate establishment of a failover connection via a second core of the second multi-core device mirroring a connection via a second core of the first multi-core device.

The media for transferring data between the primary and primary and secondary nodes or devices may be SSF. SSF may be used for any connection mirroring functionality. Every core on the primary may establish a connection to a secondary node. On secondary node SSF connections may land on any core, so that even multiple connections may land on one core and none on another. However, this may be controlled using the technique based on tuple information, described above.

When a client connection is established on primary, a PCB create message, such as SSF_CM_CREATE_PCB may be sent to the secondary node. The PCB create message may include any and all information for creating a connection or setting up the core for handling and maintaining a connection. Upon receiving the PCB create message by the secondary device the target core may be identified using the algorithm described above. If the target core is the one on which message was received, client PCB may be created. If target core is not the one on which message was received, then a core-to-core message may be sent to the target core to create PCB there. However, the PCB may also be sent by modifying the tuple information of the connection by the primary device, as described above.

In case that a link message, such as SSF_CM_LINK_PCB with the information about server side connection is sent to the secondary, the client side PCB may be looked up to determine which core it was created on. If the core where client side PCB was created is the same as the core on which message was received, the server side PCB may be created on this core as well. However, if it turns out to be a different core, then a core-to-core message may be sent to the target core for processing. Next the core where server side PCB would have belonged is determined and if this is not the core where server side PCB is created, the software RSS filter may be installed on the core where server side PCB would have been created.

In some embodiments, a port in the core where the server connection will end up may be blocked and reserved. Traffic based updates, such as SSF_CM_PCB_UPDATE, may be sent from the primary to the secondary upon receiving the "new" ACK, which means that recipient has received the data and acknowledges it. If the core on which update is received the same where PCB pair exists, the data may be directly updated, if the core is different, then a core-to-core message may be sent to the core where the PCB pair exists. Once a NAT PCBs flow is created on primary, the message SSF_CM_LINK_NATPCB may be sent to the secondary. On the secondary, NAT PCBs may be created on the core where NAT PCB belongs according to the algorithm or the RSS, and on the core where client NAT PCB would have belonged software RSS filter may be installed.

The details of various embodiments of the invention are set forth in the accompanying drawings and the description below.

BRIEF DESCRIPTION OF THE FIGURES

The foregoing and other objects, aspects, features, and advantages of the invention will become more apparent and better understood by referring to the following description taken in conjunction with the accompanying drawings, in which.

The foregoing and other objects, aspects, features, and advantages of the invention will become more apparent and better understood by referring to the following description taken in conjunction with the accompanying drawings, in which.

In the drawings, like reference numbers generally indicate identical, functionally similar, and/or structurally similar elements.

DETAILED DESCRIPTION

For purposes of reading the description of the various embodiments below, the following descriptions of the sections of the specification and their respective contents may be helpful:

Section A describes a network environment and computing environment which may be useful for practicing embodiments described herein;

Section B describes embodiments of systems and methods for delivering a computing environment to a remote user;

Section C describes embodiments of systems and methods for accelerating communications between a client and a server;

Section D describes embodiments of systems and methods for virtualizing an application delivery controller;

Section E describes embodiments of systems and methods for providing a multi-core architecture and environment;

Section F describes embodiments of systems and methods for maintaining operation of a multi-core network appliance upon failover;

Section G describes embodiments of systems and methods for maintaining operation or handling of stateful sessions upon failover; and Section H describes embodiments of systems and methods for implementing connection mirroring in a multi-core system.

A. Network and Computing Environment

Figure 1A:
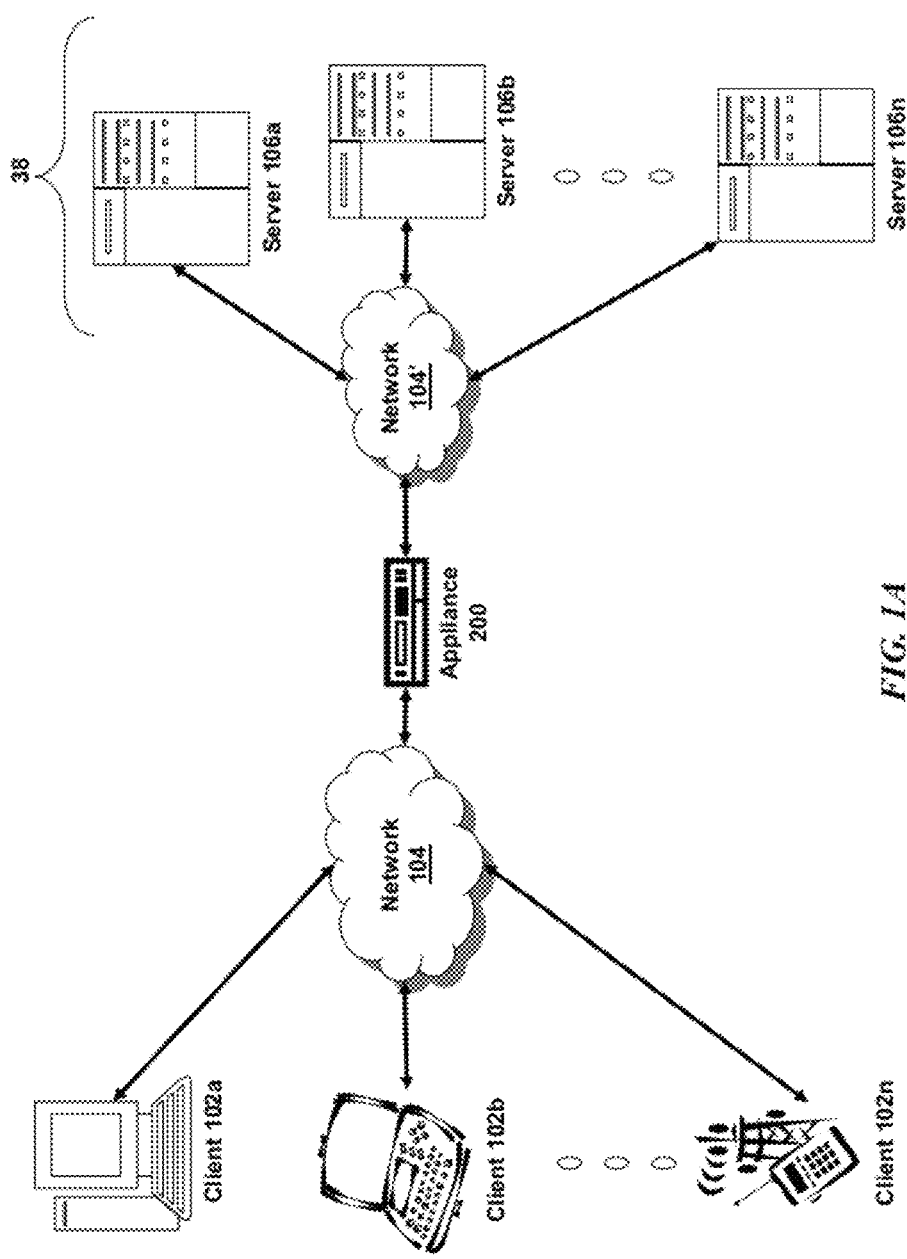
FIG. 1A is a block diagram of an embodiment of a network environment for a client to access a server via an appliance.

Prior to discussing the specifics of embodiments of the systems and methods of an appliance and/or client, it may be helpful to discuss the network and computing environments in which such embodiments may be deployed. Referring now to FIG. 1A, an embodiment of a network environment is depicted. In brief overview, the network environment comprises one or more clients 102a-102n (also generally referred to as local machine(s) 102, or client(s) 102) in communication with one or more servers 106a-106n (also generally referred to as server(s) 106, or remote machine(s) 106) via one or more networks 104, 104' (generally referred to as network 104). In some embodiments, a client 102 communicates with a server 106 via an appliance 200.

Although FIG. 1A shows a network 104 and a network 104' between the clients 102 and the servers 106, the clients 102 and the servers 106 may be on the same network 104. The networks 104 and 104' can be the same type of network or different types of networks. The network 104 and/or the network 104' can be a local-area network (LAN), such as a company Intranet, a metropolitan area network (MAN), or a wide area network (WAN), such as the Internet or the World Wide Web. In one embodiment, network 104' may be a private network and network 104 may be a public network. In some embodiments, network 104 may be a private network and network 104' a public network. In another embodiment, networks 104 and 104' may both be private networks. In some embodiments, clients 102 may be located at a branch office of a corporate enterprise communicating via a WAN connection over the network 104 to the servers 106 located at a corporate data center.

The network 104 and/or 104' be any type and/or form of network and may include any of the following: a point to point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. In some embodiments, the network 104 may comprise a wireless link, such as an infrared channel or satellite band. The topology of the network 104 and/or 104' may be a bus, star, or ring network topology. The network 104 and/or 104' and network topology may be of any such network or network topology as known to those ordinarily skilled in the art capable of supporting the operations described herein.

As shown in FIG. 1A, the appliance 200, which also may be referred to as an interface unit 200 or gateway 200, is shown between the networks 104 and 104'. In some embodiments, the appliance 200 may be located on network 104. For example, a branch office of a corporate enterprise may deploy an appliance 200 at the branch office. In other embodiments, the appliance 200 may be located on network 104'. For example, an appliance 200 may be located at a corporate data center. In yet another embodiment, a plurality of appliances 200 may be deployed on network 104. In some embodiments, a plurality of appliances 200 may be deployed on network 104'. In one embodiment, a first appliance 200 communicates with a second appliance 200'. In other embodiments, the appliance 200 could be a part of any client 102 or server 106 on the same or different network 104, 104' as the client 102. One or more appliances 200 may be located at any point in the network or network communications path between a client 102 and a server 106.

In some embodiments, the appliance 200 comprises any of the network devices manufactured by Citrix Systems, Inc. of Ft. Lauderdale Fla., referred to as Citrix NetScaler devices. In other embodiments, the appliance 200 includes any of the product embodiments referred to as WebAccelerator and BigIP manufactured by F5 Networks, Inc. of Seattle, Wash. In another embodiment, the appliance 205 includes any of the DX acceleration device platforms and/or the SSL VPN series of devices, such as SA 700, SA 2000, SA 4000, and SA 6000 devices manufactured by Juniper Networks, Inc. of Sunnyvale, Calif. In yet another embodiment, the appliance 200 includes any application acceleration and/or security related appliances and/or software manufactured by Cisco Systems, Inc. of San Jose, Calif., such as the Cisco ACE Application Control Engine Module service software and network modules, and Cisco AVS Series Application Velocity System.

In one embodiment, the system may include multiple, logically-grouped servers 106. In these embodiments, the logical group of servers may be referred to as a server farm 38. In some of these embodiments, the serves 106 may be geographically dispersed. In some cases, a farm 38 may be administered as a single entity. In other embodiments, the server farm 38 comprises a plurality of server farms 38. In one embodiment, the server farm executes one or more applications on behalf of one or more clients 102.

The servers 106 within each farm 38 can be heterogeneous. One or more of the servers 106 can operate according to one type of operating system platform (e.g., WINDOWS NT, manufactured by Microsoft Corp. of Redmond, Wash.), while one or more of the other servers 106 can operate on according to another type of operating system platform (e.g., Unix or Linux). The servers 106 of each farm 38 do not need to be physically proximate to another server 106 in the same farm 38. Thus, the group of servers 106 logically grouped as a farm 38 may be interconnected using a wide-area network (WAN) connection or medium-area network (MAN) connection. For example, a farm 38 may include servers 106 physically located in different continents or different regions of a continent, country, state, city, campus, or room. Data transmission speeds between servers 106 in the farm 38 can be increased if the servers 106 are connected using a local-area network (LAN) connection or some form of direct connection.

Servers 106 may be referred to as a file server, application server, web server, proxy server, or gateway server. In some embodiments, a server 106 may have the capacity to function as either an application server or as a master application server. In one embodiment, a server 106 may include an Active Directory. The clients 102 may also be referred to as client nodes or endpoints. In some embodiments, a client 102 has the capacity to function as both a client node seeking access to applications on a server and as an application server providing access to hosted applications for other clients 102a-102n.

In some embodiments, a client 102 communicates with a server 106. In one embodiment, the client 102 communicates directly with one of the servers 106 in a farm 38. In another embodiment, the client 102 executes a program neighborhood application to communicate with a server 106 in a farm 38. In still another embodiment, the server 106 provides the functionality of a master node. In some embodiments, the client 102 communicates with the server 106 in the farm 38 through a network 104. Over the network 104, the client 102 can, for example, request execution of various applications hosted by the servers 106a-106n in the farm 38 and receive output of the results of the application execution for display. In some embodiments, only the master node provides the functionality required to identify and provide address information associated with a server 106' hosting a requested application.

In one embodiment, the server 106 provides functionality of a web server. In another embodiment, the server 106a receives requests from the client 102, forwards the requests to a second server 106b and responds to the request by the client 102 with a response to the request from the server 106b. In still another embodiment, the server 106 acquires an enumeration of applications available to the client 102 and address information associated with a server 106 hosting an application identified by the enumeration of applications. In yet another embodiment, the server 106 presents the response to the request to the client 102 using a web interface. In one embodiment, the client 102 communicates directly with the server 106 to access the identified application. In another embodiment, the client 102 receives application output data, such as display data, generated by an execution of the identified application on the server 106.

Figure 1B:
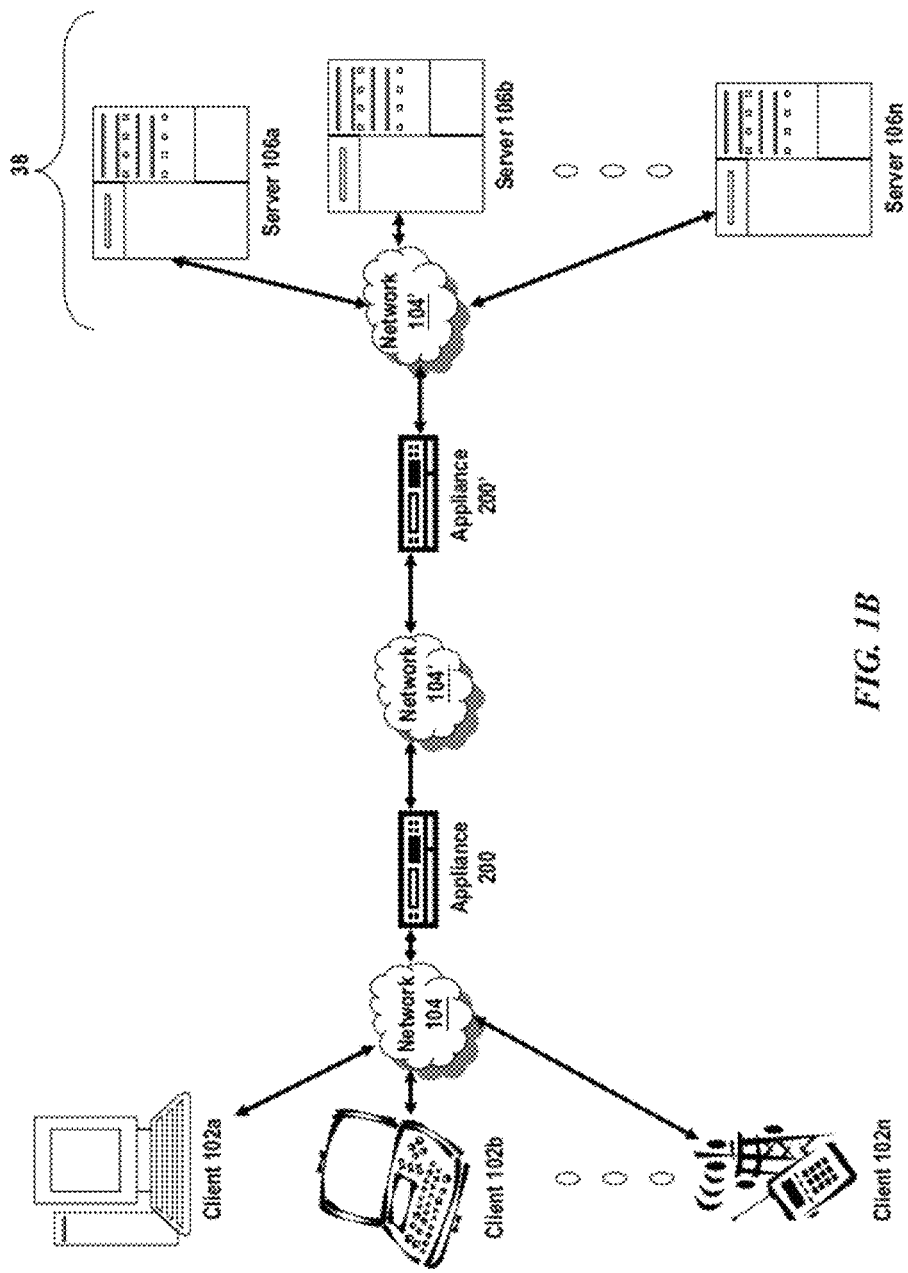
FIG. 1B is a block diagram of an embodiment of an environment for delivering a computing environment from a server to a client via an appliance.
Figure 1C:
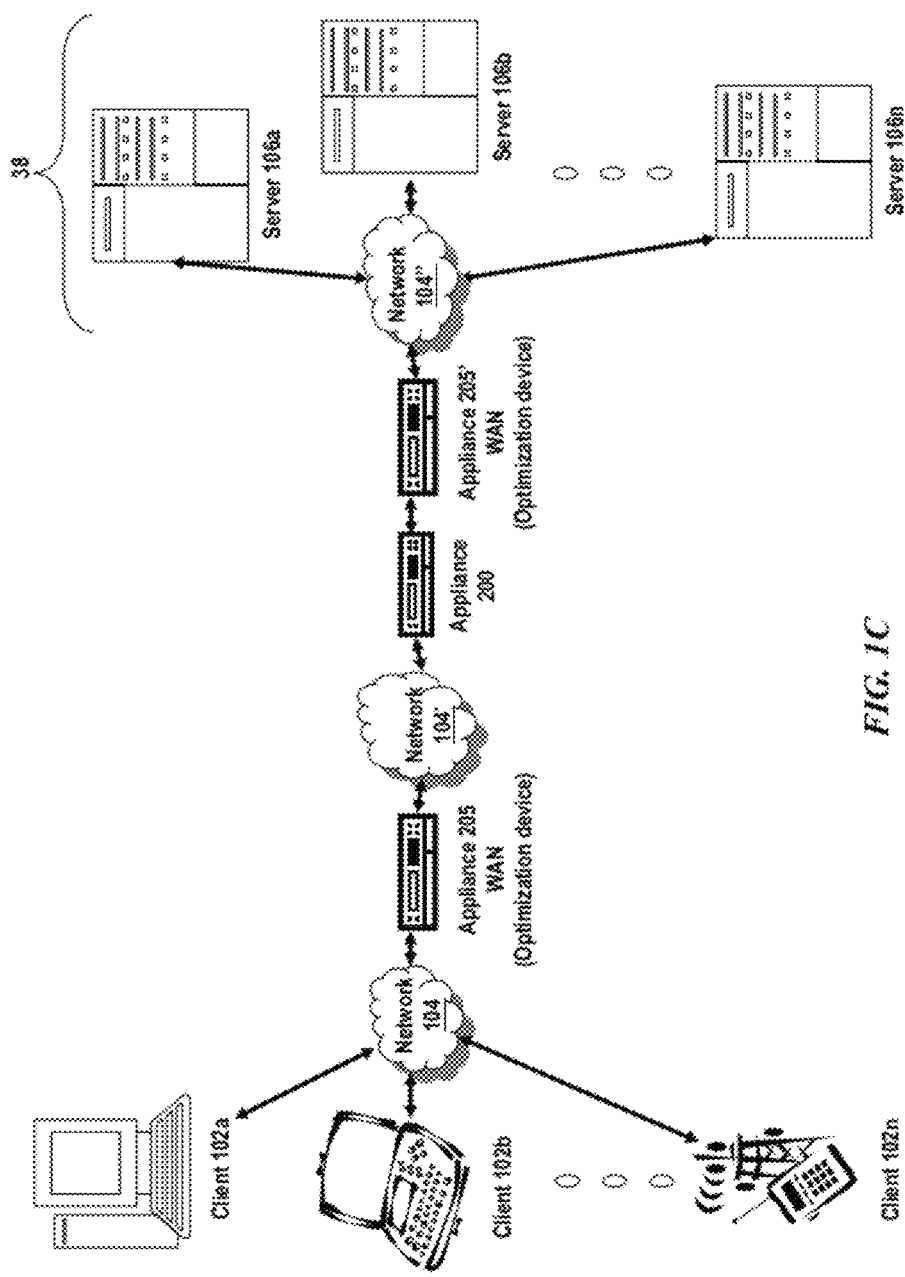
FIG. 1C is a block diagram of another embodiment of an environment for delivering a computing environment from a server to a client via an appliance.

Referring now to FIG. 1B, an embodiment of a network environment deploying multiple appliances 200 is depicted. A first appliance 200 may be deployed on a first network 104 and a second appliance 200' on a second network 104'. For example a corporate enterprise may deploy a first appliance 200 at a branch office and a second appliance 200' at a data center. In another embodiment, the first appliance 200 and second appliance 200' are deployed on the same network 104 or network 104. For example, a first appliance 200 may be deployed for a first server farm 38, and a second appliance 200 may be deployed for a second server farm 38'. In another example, a first appliance 200 may be deployed at a first branch office while the second appliance 200' is deployed at a second branch office'. In some embodiments, the first appliance 200 and second appliance 200' work in cooperation or in conjunction with each other to accelerate network traffic or the delivery of application and data between a client and a server Referring now to FIG. 1C, another embodiment of a network environment deploying the appliance 200 with one or more other types of appliances, such as between one or more WAN optimization appliance 205, 205's depicted. For example a first WAN optimization appliance 205 is shown between networks 104 and 104' and s second WAN optimization appliance 205' may be deployed between the appliance 200 and one or more servers 106. By way of example, a corporate enterprise may deploy a first WAN optimization appliance 205 at a branch office and a second WAN optimization appliance 205' at a data center. In some embodiments, the appliance 205 may be located on network 104'. In other embodiments, the appliance 205' may be located on network 104. In some embodiments, the appliance 205' may be located on network 104' or network 104". In one embodiment, the appliance 205 and 205' are on the same network. In another embodiment, the appliance 205 and 205' are on different networks. In another example, a first WAN optimization appliance 205 may be deployed for a first server farm 38 and a second WAN optimization appliance 205' for a second server farm 38'

In one embodiment, the appliance 205 is a device for accelerating, optimizing or otherwise improving the performance, operation, or quality of service of any type and form of network traffic, such as traffic to and/or from a WAN connection. In some embodiments, the appliance 205 is a performance enhancing proxy. In other embodiments, the appliance 205 is any type and form of WAN optimization or acceleration device, sometimes also referred to as a WAN optimization controller. In one embodiment, the appliance 205 is any of the product embodiments referred to as WANScaler manufactured by Citrix Systems, Inc. of Ft. Lauderdale, Fla. In other embodiments, the appliance 205 includes any of the product embodiments referred to as BIG-IP link controller and WANjet manufactured by F5 Networks, Inc. of Seattle, Wash. In another embodiment, the appliance 205 includes any of the WX and WXC WAN acceleration device platforms manufactured by Juniper Networks, Inc. of Sunnyvale, Calif. In some embodiments, the appliance 205 includes any of the steelhead line of WAN optimization appliances manufactured by Riverbed Technology of San Francisco, Calif. In other embodiments, the appliance 205 includes any of the WAN related devices manufactured by Expand Networks Inc. of Roseland, N.J. In one embodiment, the appliance 205 includes any of the WAN related appliances manufactured by Packeteer Inc. of Cupertino, Calif., such as the PacketShaper, iShared, and SkyX product embodiments provided by Packeteer. In yet another embodiment, the appliance 205 includes any WAN related appliances and/or software manufactured by Cisco Systems, Inc. of San Jose, Calif., such as the Cisco Wide Area Network Application Services software and network modules, and Wide Area Network engine appliances.

In one embodiment, the appliance 205 provides application and data acceleration services for branch-office or remote offices. In one embodiment, the appliance 205 includes optimization of Wide Area File Services (WAFS). In another embodiment, the appliance 205 accelerates the delivery of files, such as via the Common Internet File System (CIFS) protocol. In other embodiments, the appliance 205 provides caching in memory and/or storage to accelerate delivery of applications and data. In one embodiment, the appliance 205 provides compression of network traffic at any level of the network stack or at any protocol or network layer. In another embodiment, the appliance 205 provides transport layer protocol optimizations, flow control, performance enhancements or modifications and/or management to accelerate delivery of applications and data over a WAN connection. For example, in one embodiment, the appliance 205 provides Transport Control Protocol (TCP) optimizations. In other embodiments, the appliance 205 provides optimizations, flow control, performance enhancements or modifications and/or management for any session or application layer protocol.

In another embodiment, the appliance 205 encoded any type and form of data or information into custom or standard TCP and/or IP header fields or option fields of network packet to announce presence, functionality or capability to another appliance 205'. In another embodiment, an appliance 205' may communicate with another appliance 205' using data encoded in both TCP and/or IP header fields or options. For example, the appliance may use TCP option(s) or IP header fields or options to communicate one or more parameters to be used by the appliances 205, 205' in performing functionality, such as WAN acceleration, or for working in conjunction with each other.

In some embodiments, the appliance 200 preserves any of the information encoded in TCP and/or IP header and/or option fields communicated between appliances 205 and 205'. For example, the appliance 200 may terminate a transport layer connection traversing the appliance 200, such as a transport layer connection from between a client and a server traversing appliances 205 and 205'. In one embodiment, the appliance 200 identifies and preserves any encoded information in a transport layer packet transmitted by a first appliance 205 via a first transport layer connection and communicates a transport layer packet with the encoded information to a second appliance 205' via a second transport layer connection.

Figure 1D:
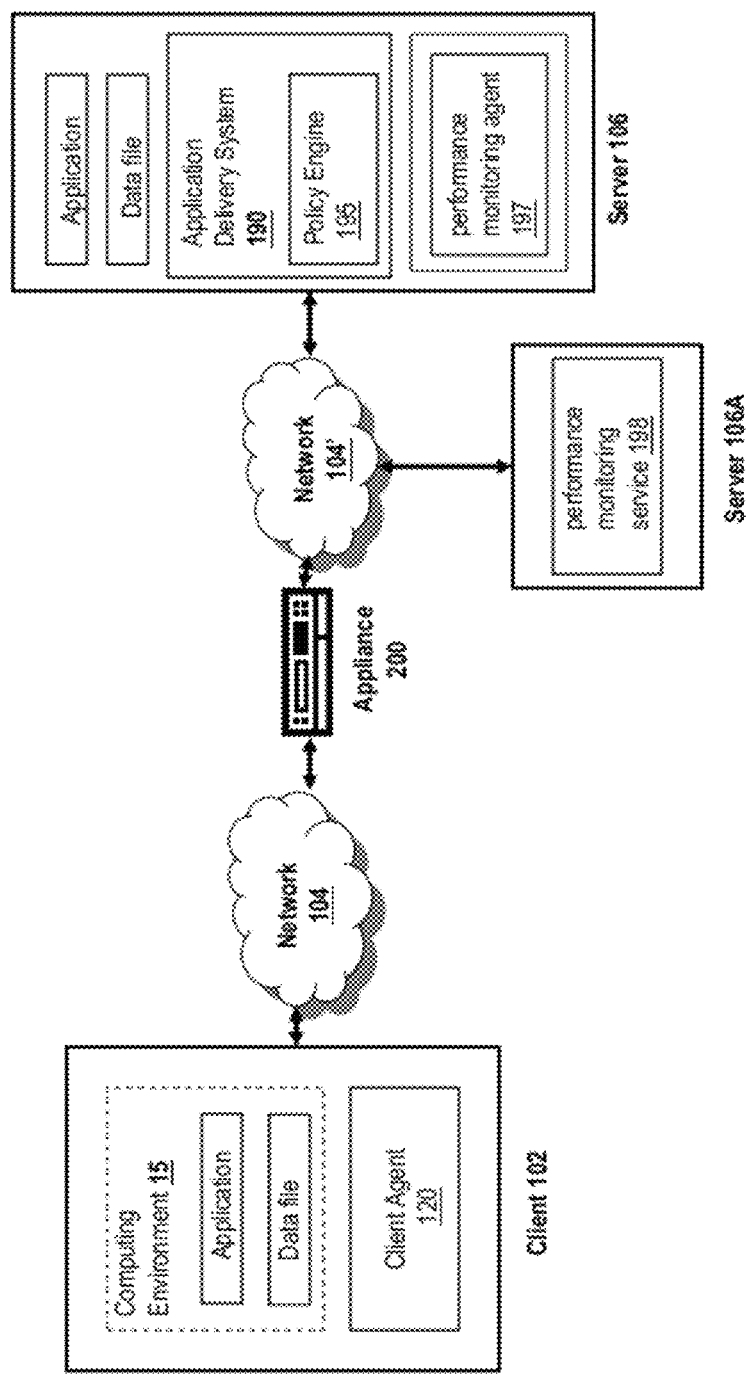
FIG. 1D is a block diagram of another embodiment of an environment for delivering a computing environment from a server to a client via an appliance.

Referring now to FIG. 1D, a network environment for delivering and/or operating a computing environment on a client 102 is depicted. In some embodiments, a server 106 includes an application delivery system 190 for delivering a computing environment or an application and/or data file to one or more clients 102. In brief overview, a client 10 is in communication with a server 106 via network 104, 104' and appliance 200. For example, the client 102 may reside in a remote office of a company, e.g., a branch office, and the server 106 may reside at a corporate data center. The client 102 comprises a client agent 120, and a computing environment 15. The computing environment 15 may execute or operate an application that accesses, processes or uses a data file. The computing environment 15, application and/or data file may be delivered via the appliance 200 and/or the server 106.

In some embodiments, the appliance 200 accelerates delivery of a computing environment 15, or any portion thereof, to a client 102. In one embodiment, the appliance 200 accelerates the delivery of the computing environment 15 by the application delivery system 190. For example, the embodiments described herein may be used to accelerate delivery of a streaming application and data file processable by the application from a central corporate data center to a remote user location, such as a branch office of the company. In another embodiment, the appliance 200 accelerates transport layer traffic between a client 102 and a server 106. The appliance 200 may provide acceleration techniques for accelerating any transport layer payload from a server 106 to a client 102, such as: 1) transport layer connection pooling, 2) transport layer connection multiplexing, 3) transport control protocol buffering, 4) compression and 5) caching. In some embodiments, the appliance 200 provides load balancing of servers 106 in responding to requests from clients 102. In other embodiments, the appliance 200 acts as a proxy or access server to provide access to the one or more servers 106. In another embodiment, the appliance 200 provides a secure virtual private network connection from a first network 104 of the client 102 to the second network 104' of the server 106, such as an SSL VPN connection. It yet other embodiments, the appliance 200 provides application firewall security, control and management of the connection and communications between a client 102 and a server 106.

In some embodiments, the application delivery management system 190 provides application delivery techniques to deliver a computing environment to a desktop of a user, remote or otherwise, based on a plurality of execution methods and based on any authentication and authorization policies applied via a policy engine 195. With these techniques, a remote user may obtain a computing environment and access to server stored applications and data files from any network connected device 100. In one embodiment, the application delivery system 190 may reside or execute on a server 106. In another embodiment, the application delivery system 190 may reside or execute on a plurality of servers 106a-106n. In some embodiments, the application delivery system 190 may execute in a server farm 38. In one embodiment, the server 106 executing the application delivery system 190 may also store or provide the application and data file. In another embodiment, a first set of one or more servers 106 may execute the application delivery system 190, and a different server 106n may store or provide the application and data file. In some embodiments, each of the application delivery system 190, the application, and data file may reside or be located on different servers. In yet another embodiment, any portion of the application delivery system 190 may reside, execute or be stored on or distributed to the appliance 200, or a plurality of appliances.

The client 102 may include a computing environment 15 for executing an application that uses or processes a data file. The client 102 via networks 104, 104' and appliance 200 may request an application and data file from the server 106. In one embodiment, the appliance 200 may forward a request from the client 102 to the server 106. For example, the client 102 may not have the application and data file stored or accessible locally. In response to the request, the application delivery system 190 and/or server 106 may deliver the application and data file to the client 102. For example, in one embodiment, the server 106 may transmit the application as an application stream to operate in computing environment 15 on client 102.

In some embodiments, the application delivery system 190 comprises any portion of the Citrix Access Suite™ by Citrix Systems, Inc., such as the MetaFrame or Citrix Presentation Server™ and/or any of the Microsoft® Windows Terminal Services manufactured by the Microsoft Corporation. In one embodiment, the application delivery system 190 may deliver one or more applications to clients 102 or users via a remote-display protocol or otherwise via remote-based or server-based computing. In another embodiment, the application delivery system 190 may deliver one or more applications to clients or users via steaming of the application.

In one embodiment, the application delivery system 190 includes a policy engine 195 for controlling and managing the access to, selection of application execution methods and the delivery of applications. In some embodiments, the policy engine 195 determines the one or more applications a user or client 102 may access. In another embodiment, the policy engine 195 determines how the application should be delivered to the user or client 102, e.g., the method of execution. In some embodiments, the application delivery system 190 provides a plurality of delivery techniques from which to select a method of application execution, such as a server-based computing, streaming or delivering the application locally to the client 120 for local execution.

In one embodiment, a client 102 requests execution of an application program and the application delivery system 190 comprising a server 106 selects a method of executing the application program. In some embodiments, the server 106 receives credentials from the client 102. In another embodiment, the server 106 receives a request for an enumeration of available applications from the client 102. In one embodiment, in response to the request or receipt of credentials, the application delivery system 190 enumerates a plurality of application programs available to the client 102. The application delivery system 190 receives a request to execute an enumerated application. The application delivery system 190 selects one of a predetermined number of methods for executing the enumerated application, for example, responsive to a policy of a policy engine. The application delivery system 190 may select a method of execution of the application enabling the client 102 to receive application-output data generated by execution of the application program on a server 106. The application delivery system 190 may select a method of execution of the application enabling the local machine 10 to execute the application program locally after retrieving a plurality of application files comprising the application. In yet another embodiment, the application delivery system 190 may select a method of execution of the application to stream the application via the network 104 to the client 102.

A client 102 may execute, operate or otherwise provide an application, which can be any type and/or form of software, program, or executable instructions such as any type and/or form of web browser, web-based client, client-server application, a thin-client computing client, an ActiveX control, or a Java applet, or any other type and/or form of executable instructions capable of executing on client 102. In some embodiments, the application may be a server-based or a remote-based application executed on behalf of the client 102 on a server 106. In one embodiments the server 106 may display output to the client 102 using any thin-client or remote-display protocol, such as the Independent Computing Architecture (ICA) protocol manufactured by Citrix Systems, Inc. of Ft. Lauderdale, Fla. or the Remote Desktop Protocol (RDP) manufactured by the Microsoft Corporation of Redmond, Wash. The application can use any type of protocol and it can be, for example, an HTTP client, an FTP client, an Oscar client, or a Telnet client. In other embodiments, the application comprises any type of software related to VoIP communications, such as a soft IP telephone. In further embodiments, the application comprises any application related to real-time data communications, such as applications for streaming video and/or audio.

In some embodiments, the server 106 or a server farm 38 may be running one or more applications, such as an application providing a thin-client computing or remote display presentation application. In one embodiment, the server 106 or server farm 38 executes as an application, any portion of the Citrix Access Suite™ by Citrix Systems, Inc., such as the MetaFrame or Citrix Presentation Server™, and/or any of the Microsoft® Windows Terminal Services manufactured by the Microsoft Corporation. In one embodiment, the application is an ICA client, developed by Citrix Systems, Inc. of Fort Lauderdale, Fla. In other embodiments, the application includes a Remote Desktop (RDP) client, developed by Microsoft Corporation of Redmond, Wash. Also, the server 106 may run an application, which for example, may be an application server providing email services such as Microsoft Exchange manufactured by the Microsoft Corporation of Redmond, Wash., a web or Internet server, or a desktop sharing server, or a collaboration server. In some embodiments, any of the applications may comprise any type of hosted service or products, such as GoToMeeting™ provided by Citrix Online Division, Inc. of Santa Barbara, Calif., WebEx™ provided by WebEx, Inc. of Santa Clara, Calif., or Microsoft Office Live Meeting provided by Microsoft Corporation of Redmond, Wash.

Still referring to FIG. 1D, an embodiment of the network environment may include a monitoring server 106A. The monitoring server 106A may include any type and form performance monitoring service 198. The performance monitoring service 198 may include monitoring, measurement and/or management software and/or hardware, including data collection, aggregation, analysis, management and reporting. In one embodiment, the performance monitoring service 198 includes one or more monitoring agents 197. The monitoring agent 197 includes any software, hardware or combination thereof for performing monitoring, measurement and data collection activities on a device, such as a client 102, server 106 or an appliance 200, 205. In some embodiments, the monitoring agent 197 includes any type and form of script, such as Visual Basic script, or Javascript. In one embodiment, the monitoring agent 197 executes transparently to any application and/or user of the device. In some embodiments, the monitoring agent 197 is installed and operated unobtrusively to the application or client. In yet another embodiment, the monitoring agent 197 is installed and operated without any instrumentation for the application or device.

In some embodiments, the monitoring agent 197 monitors, measures and collects data on a predetermined frequency. In other embodiments, the monitoring agent 197 monitors, measures and collects data based upon detection of any type and form of event. For example, the monitoring agent 197 may collect data upon detection of a request for a web page or receipt of an HTTP response. In another example, the monitoring agent 197 may collect data upon detection of any user input events, such as a mouse click. The monitoring agent 197 may report or provide any monitored, measured or collected data to the monitoring service 198. In one embodiment, the monitoring agent 197 transmits information to the monitoring service 198 according to a schedule or a predetermined frequency. In another embodiment, the monitoring agent 197 transmits information to the monitoring service 198 upon detection of an event.

In some embodiments, the monitoring service 198 and/or monitoring agent 197 performs monitoring and performance measurement of any network resource or network infrastructure element, such as a client, server, server farm, appliance 200, appliance 205, or network connection. In one embodiment, the monitoring service 198 and/or monitoring agent 197 performs monitoring and performance measurement of any transport layer connection, such as a TCP or UDP connection. In another embodiment, the monitoring service 198 and/or monitoring agent 197 monitors and measures network latency. In yet one embodiment, the monitoring service 198 and/or monitoring agent 197 monitors and measures bandwidth utilization.

In other embodiments, the monitoring service 198 and/or monitoring agent 197 monitors and measures end-user response times. In some embodiments, the monitoring service 198 performs monitoring and performance measurement of an application. In another embodiment, the monitoring service 198 and/or monitoring agent 197 performs monitoring and performance measurement of any session or connection to the application. In one embodiment, the monitoring service 198 and/or monitoring agent 197 monitors and measures performance of a browser. In another embodiment, the monitoring service 198 and/or monitoring agent 197 monitors and measures performance of HTTP based transactions. In some embodiments, the monitoring service 198 and/or monitoring agent 197 monitors and measures performance of a Voice over IP (VoIP) application or session. In other embodiments, the monitoring service 198 and/or monitoring agent 197 monitors and measures performance of a remote display protocol application, such as an ICA client or RDP client. In yet another embodiment, the monitoring service 198 and/or monitoring agent 197 monitors and measures performance of any type and form of streaming media. In still a further embodiment, the monitoring service 198 and/or monitoring agent 197 monitors and measures performance of a hosted application or a Software-As-A-Service (SaaS) delivery model.

In some embodiments, the monitoring service 198 and/or monitoring agent 197 performs monitoring and performance measurement of one or more transactions, requests or responses related to application. In other embodiments, the monitoring service 198 and/or monitoring agent 197 monitors and measures any portion of an application layer stack, such as any .NET or J2EE calls. In one embodiment, the monitoring service 198 and/or monitoring agent 197 monitors and measures database or SQL transactions. In yet another embodiment, the monitoring service 198 and/or monitoring agent 197 monitors and measures any method, function or application programming interface (API) call.

In one embodiment, the monitoring service 198 and/or monitoring agent 197 performs monitoring and performance measurement of a delivery of application and/or data from a server to a client via one or more appliances, such as appliance 200 and/or appliance 205. In some embodiments, the monitoring service 198 and/or monitoring agent 197 monitors and measures performance of delivery of a virtualized application. In other embodiments, the monitoring service 198 and/or monitoring agent 197 monitors and measures performance of delivery of a streaming application. In another embodiment, the monitoring service 198 and/or monitoring agent 197 monitors and measures performance of delivery of a desktop application to a client and/or the execution of the desktop application on the client. In another embodiment, the monitoring service 198 and/or monitoring agent 197 monitors and measures performance of a client/server application.

In one embodiment, the monitoring service 198 and/or monitoring agent 197 is designed and constructed to provide application performance management for the application delivery system 190. For example, the monitoring service 198 and/or monitoring agent 197 may monitor, measure and manage the performance of the delivery of applications via the Citrix Presentation Server. In this example, the monitoring service 198 and/or monitoring agent 197 monitors individual ICA sessions. The monitoring service 198 and/or monitoring agent 197 may measure the total and per session system resource usage, as well as application and networking performance. The monitoring service 198 and/or monitoring agent 197 may identify the active servers for a given user and/or user session. In some embodiments, the monitoring service 198 and/or monitoring agent 197 monitors back-end connections between the application delivery system 190 and an application and/or database server. The monitoring service 198 and/or monitoring agent 197 may measure network latency, delay and volume per user-session or ICA session.

In some embodiments, the monitoring service 198 and/or monitoring agent 197 measures and monitors memory usage for the application delivery system 190, such as total memory usage, per user session and/or per process. In other embodiments, the monitoring service 198 and/or monitoring agent 197 measures and monitors CPU usage the application delivery system 190, such as total CPU usage, per user session and/or per process. In another embodiments, the monitoring service 198 and/or monitoring agent 197 measures and monitors the time required to log-in to an application, a server, or the application delivery system, such as Citrix Presentation Server. In one embodiment, the monitoring service 198 and/or monitoring agent 197 measures and monitors the duration a user is logged into an application, a server, or the application delivery system 190. In some embodiments, the monitoring service 198 and/or monitoring agent 197 measures and monitors active and inactive session counts for an application, server or application delivery system session. In yet another embodiment, the monitoring service 198 and/or monitoring agent 197 measures and monitors user session latency.

In yet further embodiments, the monitoring service 198 and/or monitoring agent 197 measures and monitors measures and monitors any type and form of server metrics. In one embodiment, the monitoring service 198 and/or monitoring agent 197 measures and monitors metrics related to system memory, CPU usage, and disk storage. In another embodiment, the monitoring service 198 and/or monitoring agent 197 measures and monitors metrics related to page faults, such as page faults per second. In other embodiments, the monitoring service 198 and/or monitoring agent 197 measures and monitors round-trip time metrics. In yet another embodiment, the monitoring service 198 and/or monitoring agent 197 measures and monitors metrics related to application crashes, errors and/or hangs.

In some embodiments, the monitoring service 198 and monitoring agent 198 includes any of the product embodiments referred to as EdgeSight manufactured by Citrix Systems, Inc. of Ft. Lauderdale, Fla. In another embodiment, the performance monitoring service 198 and/or monitoring agent 198 includes any portion of the product embodiments referred to as the TrueView product suite manufactured by the Symphoniq Corporation of Palo Alto, Calif. In one embodiment, the performance monitoring service 198 and/or monitoring agent 198 includes any portion of the product embodiments referred to as the TeaLeaf CX product suite manufactured by the TeaLeaf Technology Inc. of San Francisco, Calif. In other embodiments, the performance monitoring service 198 and/or monitoring agent 198 includes any portion of the business service management products, such as the BMC Performance Manager and Patrol products, manufactured by BMC Software, Inc. of Houston, Tex.

Figure 1E:
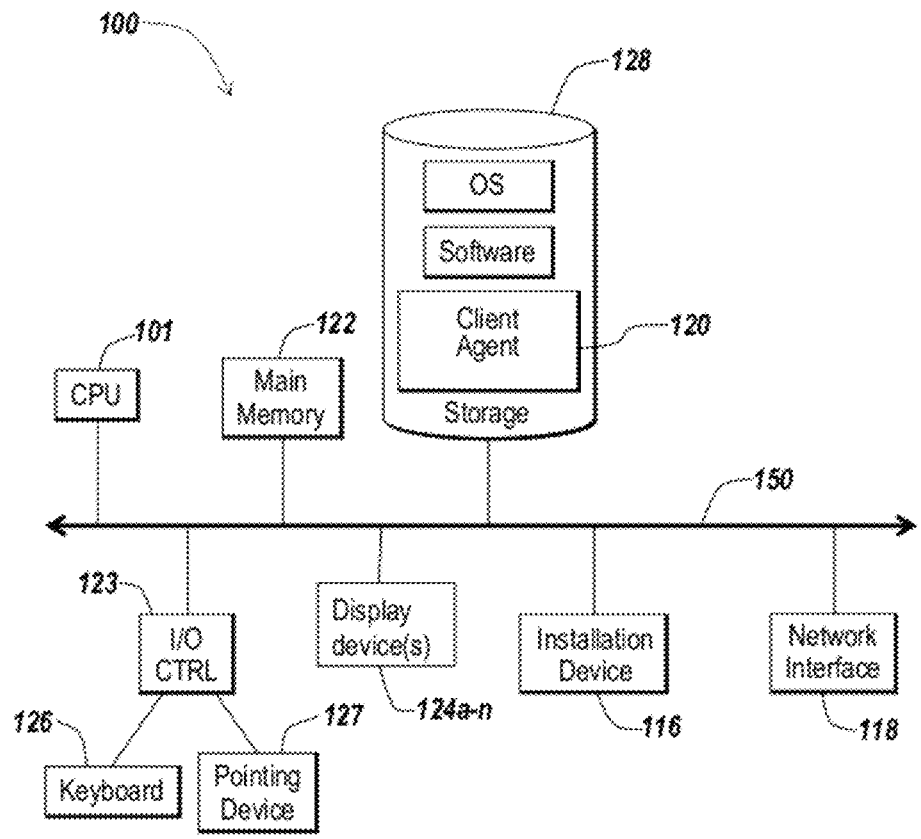
FIGS. 1E-1H are block diagrams of embodiments of a computing device.
Figure 1F:
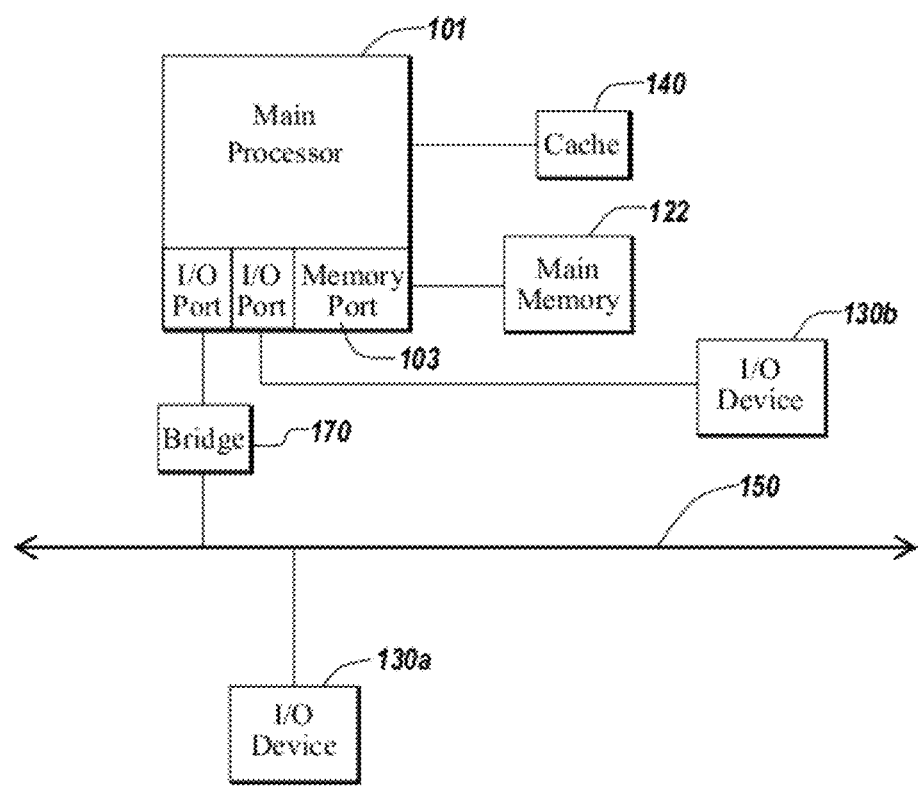

The client 102, server 106, and appliance 200 may be deployed as and/or executed on any type and form of computing device, such as a computer, network device or appliance capable of communicating on any type and form of network and performing the operations described herein. FIGS. 1E and 1F depict block diagrams of a computing device 100 useful for practicing an embodiment of the client 102, server 106 or appliance 200. As shown in FIGS. 1E and 1F, each computing device 100 includes a central processing unit 101, and a main memory unit 122. As shown in FIG. 1E, a computing device 100 may include a visual display device 124, a keyboard 126 and/or a pointing device 127, such as a mouse. Each computing device 100 may also include additional optional elements, such as one or more input/output devices 130a-130b (generally referred to using reference numeral 130), and a cache memory 140 in communication with the central processing unit 101.

The central processing unit 101 is any logic circuitry that responds to and processes instructions fetched from the main memory unit 122. In many embodiments, the central processing unit is provided by a microprocessor unit, such as: those manufactured by Intel Corporation of Mountain View, Calif.; those manufactured by Motorola Corporation of Schaumburg, Ill.; those manufactured by Transmeta Corporation of Santa Clara, Calif.; the RS/6000 processor, those manufactured by International Business Machines of White Plains, N.Y.; or those manufactured by Advanced Micro Devices of Sunnyvale, Calif. The computing device 100 may be based on any of these processors, or any other processor capable of operating as described herein.

Main memory unit 122 may be one or more memory chips capable of storing data and allowing any storage location to be directly accessed by the microprocessor 101, such as Static random access memory (SRAM), Burst SRAM or SynchBurst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), or Ferroelectric RAM (FRAM). The main memory 122 may be based on any of the above described memory chips, or any other available memory chips capable of operating as described herein. In the embodiment shown in FIG. 1E, the processor 101 communicates with main memory 122 via a system bus 150 (described in more detail below). FIG. 1E depicts an embodiment of a computing device 100 in which the processor communicates directly with main memory 122 via a memory port 103. For example, in FIG. 1F the main memory 122 may be DRDRAM.

FIG. 1F depicts an embodiment in which the main processor 101 communicates directly with cache memory 140 via a secondary bus, sometimes referred to as a backside bus. In other embodiments, the main processor 101 communicates with cache memory 140 using the system bus 150. Cache memory 140 typically has a faster response time than main memory 122 and is typically provided by SRAM, BSRAM, or EDRAM. In the embodiment shown in FIG. 1E, the processor 101 communicates with various I/O devices 130 via a local system bus 150. Various busses may be used to connect the central processing unit 101 to any of the I/O devices 130, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 124, the processor 101 may use an Advanced Graphics Port (AGP) to communicate with the display 124. FIG. 1F depicts an embodiment of a computer 100 in which the main processor 101 communicates directly with I/O device 130 via HyperTransport, Rapid I/O, or InfiniBand. FIG. 1F also depicts an embodiment in which local busses and direct communication are mixed: the processor 101 communicates with I/O device 130 using a local interconnect bus while communicating with I/O device 130 directly.

The computing device 100 may support any suitable installation device 116, such as a floppy disk drive for receiving floppy disks such as 3.5-inch, 5.25-inch disks or ZIP disks, a CD-ROM drive, a CD-R/RW drive, a DVD-ROM drive, tape drives of various formats, USB device, hard-drive or any other device suitable for installing software and programs such as any client agent 120, or portion thereof. The computing device 100 may further comprise a storage device 128, such as one or more hard disk drives or redundant arrays of independent disks, for storing an operating system and other related software, and for storing application software programs such as any program related to the client agent 120. Optionally, any of the installation devices 116 could also be used as the storage device 128. Additionally, the operating system and the software can be run from a bootable medium, for example, a bootable CD, such as KNOPPIX®, a bootable CD for GNU/Linux that is available as a GNU/Linux distribution from knoppix.net.

Furthermore, the computing device 100 may include a network interface 118 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25), broadband connections (e.g., ISDN, Frame Relay, ATM), wireless connections, or some combination of any or all of the above. The network interface 118 may comprise a built-in network adapter, network interface card, PCMCIA network card, card bus network adapter, wireless network adapter, USB network adapter, modem or any other device suitable for interfacing the computing device 100 to any type of network capable of communication and performing the operations described herein.

A wide variety of I/O devices 130a-130n may be present in the computing device 100. Input devices include keyboards, mice, trackpads, trackballs, microphones, and drawing tablets. Output devices include video displays, speakers, inkjet printers, laser printers, and dye-sublimation printers. The I/O devices 130 may be controlled by an I/O controller 123 as shown in FIG. 1E. The I/O controller may control one or more I/O devices such as a keyboard 126 and a pointing device 127, e.g., a mouse or optical pen. Furthermore, an I/O device may also provide storage 128 and/or an installation medium 116 for the computing device 100. In still other embodiments, the computing device 100 may provide USB connections to receive handheld USB storage devices such as the USB Flash Drive line of devices manufactured by Twintech Industry, Inc. of Los Alamitos, Calif.

In some embodiments, the computing device 100 may comprise or be connected to multiple display devices 124a-124n, which each may be of the same or different type and/or form. As such, any of the I/O devices 130a-130n and/or the I/O controller 123 may comprise any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may comprise multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices, such as computing devices 100a and 100b connected to the computing device 100, for example, via a network. These embodiments may include any type of software designed and constructed to use another computer's display device as a second display device 124a for the computing device 100. One ordinarily skilled in the art will recognize and appreciate the various ways and embodiments that a computing device 100 may be configured to have multiple display devices 124a-124n.

In further embodiments, an I/O device 130 may be a bridge 170 between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a FibreChannel bus, or a Serial Attached small computer system interface bus.

A computing device 100 of the sort depicted in FIGS. 1E and 1F typically operate under the control of operating systems, which control scheduling of tasks and access to system resources. The computing device 100 can be running any operating system such as any of the versions of the Microsoft® Windows operating systems, the different releases of the Unix and Linux operating systems, any version of the Mac OS® for Macintosh computers, any embedded operating system, any real-time operating system, any open source operating system, any proprietary operating system, any operating systems for mobile computing devices, or any other operating system capable of running on the computing device and performing the operations described herein. Typical operating systems include: WINDOWS 3.x, WINDOWS 95, WINDOWS 98, WINDOWS 2000, WINDOWS NT 3.51, WINDOWS NT 4.0, WINDOWS CE, and WINDOWS XP, all of which are manufactured by Microsoft Corporation of Redmond, Wash.; MacOS, manufactured by Apple Computer of Cupertino, Calif.; OS/2, manufactured by International Business Machines of Armonk, N.Y.; and Linux, a freely-available operating system distributed by Caldera Corp. of Salt Lake City, Utah, or any type and/or form of a Unix operating system, among others.

In other embodiments, the computing device 100 may have different processors, operating systems, and input devices consistent with the device. For example, in one embodiment the computer 100 is a Treo 180, 270, 1060, 600 or 650 smart phone manufactured by Palm, Inc. In this embodiment, the Treo smart phone is operated under the control of the PalmOS operating system and includes a stylus input device as well as a five-way navigator device. Moreover, the computing device 100 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

Figure 1G:
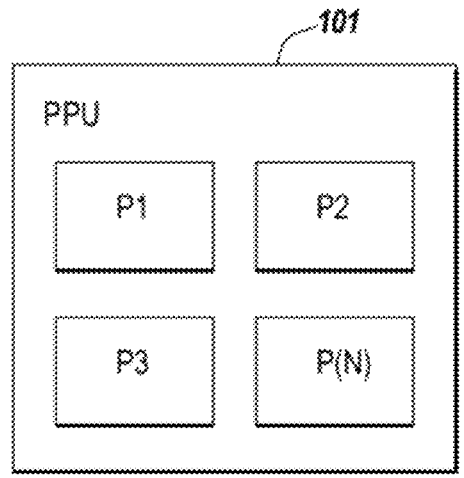

As shown in FIG. 1G, the computing device 100 may comprise multiple processors and may provide functionality for simultaneous execution of instructions or for simultaneous execution of one instruction on more than one piece of data. In some embodiments, the computing device 100 may comprise a parallel processor with one or more cores. In one of these embodiments, the computing device 100 is a shared memory parallel device, with multiple processors and/or multiple processor cores, accessing all available memory as a single global address space. In another of these embodiments, the computing device 100 is a distributed memory parallel device with multiple processors each accessing local memory only. In still another of these embodiments, the computing device 100 has both some memory which is shared and some memory which can only be accessed by particular processors or subsets of processors. In still even another of these embodiments, the computing device 100, such as a multi-core microprocessor, combines two or more independent processors into a single package, often a single integrated circuit (IC). In yet another of these embodiments, the computing device 100 includes a chip having a CELL BROADBAND ENGINE architecture and including a Power processor element and a plurality of synergistic processing elements, the Power processor element and the plurality of synergistic processing elements linked together by an internal high speed bus, which may be referred to as an element interconnect bus.

In some embodiments, the processors provide functionality for execution of a single instruction simultaneously on multiple pieces of data (SIMD). In other embodiments, the processors provide functionality for execution of multiple instructions simultaneously on multiple pieces of data (MIMD). In still other embodiments, the processor may use any combination of SIMD and MIMD cores in a single device.

Figure 1H:
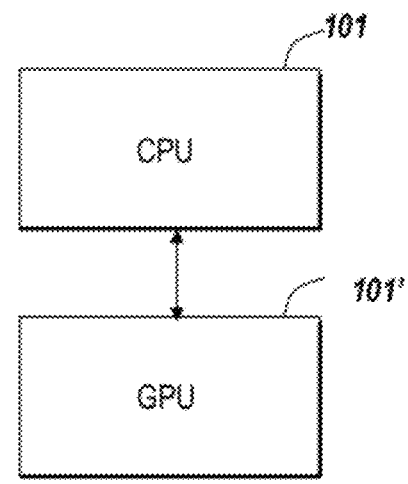

In some embodiments, the computing device 100 may comprise a graphics processing unit. In one of these embodiments, depicted in FIG. 1H, the computing device 100 includes at least one central processing unit 101 and at least one graphics processing unit. In another of these embodiments, the computing device 100 includes at least one parallel processing unit and at least one graphics processing unit. In still another of these embodiments, the computing device 100 includes a plurality of processing units of any type, one of the plurality of processing units comprising a graphics processing unit.

In some embodiments, a first computing device 100a executes an application on behalf of a user of a client computing device 100b. In other embodiments, a computing device 100a executes a virtual machine, which provides an execution session within which applications execute on behalf of a user or a client computing devices 100b. In one of these embodiments, the execution session is a hosted desktop session. In another of these embodiments, the computing device 100 executes a terminal services session. The terminal services session may provide a hosted desktop environment. In still another of these embodiments, the execution session provides access to a computing environment, which may comprise one or more of: an application, a plurality of applications, a desktop application, and a desktop session in which one or more applications may execute.

B. Appliance Architecture

Figure 2A:
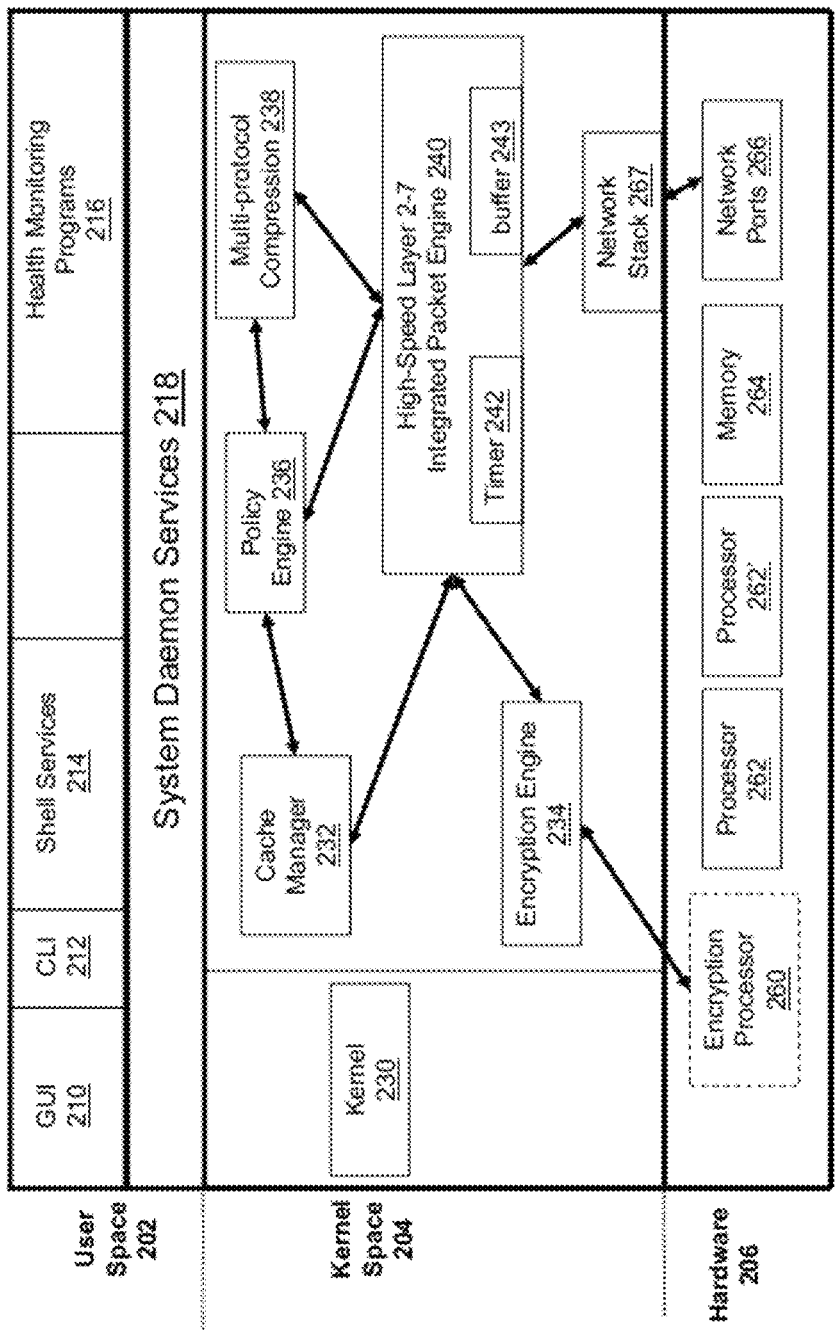
FIG. 2A is a block diagram of an embodiment of an appliance for processing communications between a client and a server.

FIG. 2A illustrates an example embodiment of the appliance 200. The architecture of the appliance 200 in FIG. 2A is provided by way of illustration only and is not intended to be limiting. As shown in FIG. 2, appliance 200 comprises a hardware layer 206 and a software layer divided into a user space 202 and a kernel space 204.

Hardware layer 206 provides the hardware elements upon which programs and services within kernel space 204 and user space 202 are executed. Hardware layer 206 also provides the structures and elements which allow programs and services within kernel space 204 and user space 202 to communicate data both internally and externally with respect to appliance 200. As shown in FIG. 2, the hardware layer 206 includes a processing unit 262 for executing software programs and services, a memory 264 for storing software and data, network ports 266 for transmitting and receiving data over a network, and an encryption processor 260 for performing functions related to Secure Sockets Layer processing of data transmitted and received over the network. In some embodiments, the central processing unit 262 may perform the functions of the encryption processor 260 in a single processor. Additionally, the hardware layer 206 may comprise multiple processors for each of the processing unit 262 and the encryption processor 260. The processor 262 may include any of the processors 101 described above in connection with FIGS. 1E and 1F. For example, in one embodiment, the appliance 200 comprises a first processor 262 and a second processor 262'. In other embodiments, the processor 262 or 262' comprises a multi-core processor.

Although the hardware layer 206 of appliance 200 is generally illustrated with an encryption processor 260, processor 260 may be a processor for performing functions related to any encryption protocol, such as the Secure Socket Layer (SSL) or Transport Layer Security (TLS) protocol. In some embodiments, the processor 260 may be a general purpose processor (GPP), and in further embodiments, may have executable instructions for performing processing of any security related protocol.

Although the hardware layer 206 of appliance 200 is illustrated with certain elements in FIG. 2, the hardware portions or components of appliance 200 may comprise any type and form of elements, hardware or software, of a computing device, such as the computing device 100 illustrated and discussed herein in conjunction with FIGS. 1E and 1F. In some embodiments, the appliance 200 may comprise a server, gateway, router, switch, bridge or other type of computing or network device, and have any hardware and/or software elements associated therewith.

The operating system of appliance 200 allocates, manages, or otherwise segregates the available system memory into kernel space 204 and user space 204. In example software architecture 200, the operating system may be any type and/or form of Unix operating system although the invention is not so limited. As such, the appliance 200 can be running any operating system such as any of the versions of the Microsoft® Windows operating systems, the different releases of the Unix and Linux operating systems, any version of the Mac OS® for Macintosh computers, any embedded operating system, any network operating system, any real-time operating system, any open source operating system, any proprietary operating system, any operating systems for mobile computing devices or network devices, or any other operating system capable of running on the appliance 200 and performing the operations described herein.

The kernel space 204 is reserved for running the kernel 230, including any device drivers, kernel extensions or other kernel related software. As known to those skilled in the art, the kernel 230 is the core of the operating system, and provides access, control, and management of resources and hardware-related elements of the application 104. In accordance with an embodiment of the appliance 200, the kernel space 204 also includes a number of network services or processes working in conjunction with a cache manager 232, sometimes also referred to as the integrated cache, the benefits of which are described in detail further herein. Additionally, the embodiment of the kernel 230 will depend on the embodiment of the operating system installed, configured, or otherwise used by the device 200.

In one embodiment, the device 200 comprises one network stack 267, such as a TCP/IP based stack, for communicating with the client 102 and/or the server 106. In one embodiment, the network stack 267 is used to communicate with a first network, such as network 108, and a second network 110. In some embodiments, the device 200 terminates a first transport layer connection, such as a TCP connection of a client 102, and establishes a second transport layer connection to a server 106 for use by the client 102, e.g., the second transport layer connection is terminated at the appliance 200 and the server 106. The first and second transport layer connections may be established via a single network stack 267. In other embodiments, the device 200 may comprise multiple network stacks, for example 267 and 267', and the first transport layer connection may be established or terminated at one network stack 267, and the second transport layer connection on the second network stack 267'. For example, one network stack may be for receiving and transmitting network packet on a first network, and another network stack for receiving and transmitting network packets on a second network. In one embodiment, the network stack 267 comprises a buffer 243 for queuing one or more network packets for transmission by the appliance 200.

As shown in FIG. 2, the kernel space 204 includes the cache manager 232, a high-speed layer 2-7 integrated packet engine 240, an encryption engine 234, a policy engine 236 and multi-protocol compression logic 238. Running these components or processes 232, 240, 234, 236 and 238 in kernel space 204 or kernel mode instead of the user space 202 improves the performance of each of these components, alone and in combination. Kernel operation means that these components or processes 232, 240, 234, 236 and 238 run in the core address space of the operating system of the device 200. For example, running the encryption engine 234 in kernel mode improves encryption performance by moving encryption and decryption operations to the kernel, thereby reducing the number of transitions between the memory space or a kernel thread in kernel mode and the memory space or a thread in user mode. For example, data obtained in kernel mode may not need to be passed or copied to a process or thread running in user mode, such as from a kernel level data structure to a user level data structure. In another aspect, the number of context switches between kernel mode and user mode are also reduced. Additionally, synchronization of and communications between any of the components or processes 232, 240, 235, 236 and 238 can be performed more efficiently in the kernel space 204.

In some embodiments, any portion of the components 232, 240, 234, 236 and 238 may run or operate in the kernel space 204, while other portions of these components 232, 240, 234, 236 and 238 may run or operate in user space 202. In one embodiment, the appliance 200 uses a kernel-level data structure providing access to any portion of one or more network packets, for example, a network packet comprising a request from a client 102 or a response from a server 106. In some embodiments, the kernel-level data structure may be obtained by the packet engine 240 via a transport layer driver interface or filter to the network stack 267. The kernel-level data structure may comprise any interface and/or data accessible via the kernel space 204 related to the network stack 267, network traffic or packets received or transmitted by the network stack 267. In other embodiments, the kernel-level data structure may be used by any of the components or processes 232, 240, 234, 236 and 238 to perform the desired operation of the component or process. In one embodiment, a component 232, 240, 234, 236 and 238 is running in kernel mode 204 when using the kernel-level data structure, while in another embodiment, the component 232, 240, 234, 236 and 238 is running in user mode when using the kernel-level data structure. In some embodiments, the kernel-level data structure may be copied or passed to a second kernel-level data structure, or any desired user-level data structure.

The cache manager 232 may comprise software, hardware or any combination of software and hardware to provide cache access, control and management of any type and form of content, such as objects or dynamically generated objects served by the originating servers 106. The data, objects or content processed and stored by the cache manager 232 may comprise data in any format, such as a markup language, or communicated via any protocol. In some embodiments, the cache manager 232 duplicates original data stored elsewhere or data previously computed, generated or transmitted, in which the original data may require longer access time to fetch, compute or otherwise obtain relative to reading a cache memory element. Once the data is stored in the cache memory element, future use can be made by accessing the cached copy rather than refetching or recomputing the original data, thereby reducing the access time. In some embodiments, the cache memory element may comprise a data object in memory 264 of device 200. In other embodiments, the cache memory element may comprise memory having a faster access time than memory 264. In another embodiment, the cache memory element may comprise any type and form of storage element of the device 200, such as a portion of a hard disk. In some embodiments, the processing unit 262 may provide cache memory for use by the cache manager 232. In yet further embodiments, the cache manager 232 may use any portion and combination of memory, storage, or the processing unit for caching data, objects, and other content.

Furthermore, the cache manager 232 includes any logic, functions, rules, or operations to perform any embodiments of the techniques of the appliance 200 described herein. For example, the cache manager 232 includes logic or functionality to invalidate objects based on the expiration of an invalidation time period or upon receipt of an invalidation command from a client 102 or server 106. In some embodiments, the cache manager 232 may operate as a program, service, process or task executing in the kernel space 204, and in other embodiments, in the user space 202. In one embodiment, a first portion of the cache manager 232 executes in the user space 202 while a second portion executes in the kernel space 204. In some embodiments, the cache manager 232 can comprise any type of general purpose processor (GPP), or any other type of integrated circuit, such as a Field Programmable Gate Array (FPGA), Programmable Logic Device (PLD), or Application Specific Integrated Circuit (ASIC).

The policy engine 236 may include, for example, an intelligent statistical engine or other programmable application(s). In one embodiment, the policy engine 236 provides a configuration mechanism to allow a user to identify, specify, define or configure a caching policy. Policy engine 236, in some embodiments, also has access to memory to support data structures such as lookup tables or hash tables to enable user-selected caching policy decisions. In other embodiments, the policy engine 236 may comprise any logic, rules, functions or operations to determine and provide access, control and management of objects, data or content being cached by the appliance 200 in addition to access, control and management of security, network traffic, network access, compression or any other function or operation performed by the appliance 200. Further examples of specific caching policies are further described herein.

The encryption engine 234 comprises any logic, business rules, functions or operations for handling the processing of any security related protocol, such as SSL or TLS, or any function related thereto. For example, the encryption engine 234 encrypts and decrypts network packets, or any portion thereof, communicated via the appliance 200. The encryption engine 234 may also setup or establish SSL or TLS connections on behalf of the client 102a-102n, server 106a-106n, or appliance 200. As such, the encryption engine 234 provides offloading and acceleration of SSL processing. In one embodiment, the encryption engine 234 uses a tunneling protocol to provide a virtual private network between a client 102a-102n and a server 106a-106n. In some embodiments, the encryption engine 234 is in communication with the Encryption processor 260. In other embodiments, the encryption engine 234 comprises executable instructions running on the Encryption processor 260.

The multi-protocol compression engine 238 comprises any logic, business rules, function or operations for compressing one or more protocols of a network packet, such as any of the protocols used by the network stack 267 of the device 200. In one embodiment, multi-protocol compression engine 238 compresses bi-directionally between clients 102a-102n and servers 106a-106n any TCP/IP based protocol, including Messaging Application Programming Interface (MAPI) (email), File Transfer Protocol (FTP), HyperText Transfer Protocol (HTTP), Common Internet File System (CIFS) protocol (file transfer), Independent Computing Architecture (ICA) protocol, Remote Desktop Protocol (RDP), Wireless Application Protocol (WAP), Mobile IP protocol, and Voice Over IP (VoIP) protocol. In other embodiments, multi-protocol compression engine 238 provides compression of Hypertext Markup Language (HTML) based protocols and in some embodiments, provides compression of any markup languages, such as the Extensible Markup Language (XML). In one embodiment, the multi-protocol compression engine 238 provides compression of any high-performance protocol, such as any protocol designed for appliance 200 to appliance 200 communications. In another embodiment, the multi-protocol compression engine 238 compresses any payload of or any communication using a modified transport control protocol, such as Transaction TCP (T/TCP), TCP with selection acknowledgements (TCP-SACK), TCP with large windows (TCP-LW), a congestion prediction protocol such as the TCP-Vegas protocol, and a TCP spoofing protocol.

As such, the multi-protocol compression engine 238 accelerates performance for users accessing applications via desktop clients, e.g., Microsoft Outlook and non-Web thin clients, such as any client launched by popular enterprise applications like Oracle, SAP and Siebel, and even mobile clients, such as the Pocket PC. In some embodiments, the multi-protocol compression engine 238 by executing in the kernel mode 204 and integrating with packet processing engine 240 accessing the network stack 267 is able to compress any of the protocols carried by the TCP/IP protocol, such as any application layer protocol.

High speed layer 2-7 integrated packet engine 240, also generally referred to as a packet processing engine or packet engine, is responsible for managing the kernel-level processing of packets received and transmitted by appliance 200 via network ports 266. The high speed layer 2-7 integrated packet engine 240 may comprise a buffer for queuing one or more network packets during processing, such as for receipt of a network packet or transmission of a network packet. Additionally, the high speed layer 2-7 integrated packet engine 240 is in communication with one or more network stacks 267 to send and receive network packets via network ports 266. The high speed layer 2-7 integrated packet engine 240 works in conjunction with encryption engine 234, cache manager 232, policy engine 236 and multi-protocol compression logic 238. In particular, encryption engine 234 is configured to perform SSL processing of packets, policy engine 236 is configured to perform functions related to traffic management such as request-level content switching and request-level cache redirection, and multi-protocol compression logic 238 is configured to perform functions related to compression and decompression of data.

The high speed layer 2-7 integrated packet engine 240 includes a packet processing timer 242. In one embodiment, the packet processing timer 242 provides one or more time intervals to trigger the processing of incoming, i.e., received, or outgoing, i.e., transmitted, network packets. In some embodiments, the high speed layer 2-7 integrated packet engine 240 processes network packets responsive to the timer 242. The packet processing timer 242 provides any type and form of signal to the packet engine 240 to notify, trigger, or communicate a time related event, interval or occurrence. In many embodiments, the packet processing timer 242 operates in the order of milliseconds, such as for example 100 ms, 50 ms or 25 ms. For example, in some embodiments, the packet processing timer 242 provides time intervals or otherwise causes a network packet to be processed by the high speed layer 2-7 integrated packet engine 240 at a 10 ms time interval, while in other embodiments, at a 5 ms time interval, and still yet in further embodiments, as short as a 3, 2, or 1 ms time interval. The high speed layer 2-7 integrated packet engine 240 may be interfaced, integrated or in communication with the encryption engine 234, cache manager 232, policy engine 236 and multi-protocol compression engine 238 during operation. As such, any of the logic, functions, or operations of the encryption engine 234, cache manager 232, policy engine 236 and multi-protocol compression logic 238 may be performed responsive to the packet processing timer 242 and/or the packet engine 240. Therefore, any of the logic, functions, or operations of the encryption engine 234, cache manager 232, policy engine 236 and multi-protocol compression logic 238 may be performed at the granularity of time intervals provided via the packet processing timer 242, for example, at a time interval of less than or equal to 10 ms. For example, in one embodiment, the cache manager 232 may perform invalidation of any cached objects responsive to the high speed layer 2-7 integrated packet engine 240 and/or the packet processing timer 242. In another embodiment, the expiry or invalidation time of a cached object can be set to the same order of granularity as the time interval of the packet processing timer 242, such as at every 10 ms.

In contrast to kernel space 204, user space 202 is the memory area or portion of the operating system used by user mode applications or programs otherwise running in user mode. A user mode application may not access kernel space 204 directly and uses service calls in order to access kernel services. As shown in FIG. 2, user space 202 of appliance 200 includes a graphical user interface (GUI) 210, a command line interface (CLI) 212, shell services 214, health monitoring program 216, and daemon services 218. GUI 210 and CLI 212 provide a means by which a system administrator or other user can interact with and control the operation of appliance 200, such as via the operating system of the appliance 200. The GUI 210 or CLI 212 can comprise code running in user space 202 or kernel space 204. The GUI 210 may be any type and form of graphical user interface and may be presented via text, graphical or otherwise, by any type of program or application, such as a browser. The CLI 212 may be any type and form of command line or text-based interface, such as a command line provided by the operating system. For example, the CLI 212 may comprise a shell, which is a tool to enable users to interact with the operating system. In some embodiments, the CLI 212 may be provided via a bash, csh, tcsh, or ksh type shell. The shell services 214 comprises the programs, services, tasks, processes or executable instructions to support interaction with the appliance 200 or operating system by a user via the GUI 210 and/or CLI 212.

Health monitoring program 216 is used to monitor, check, report and ensure that network systems are functioning properly and that users are receiving requested content over a network. Health monitoring program 216 comprises one or more programs, services, tasks, processes or executable instructions to provide logic, rules, functions or operations for monitoring any activity of the appliance 200. In some embodiments, the health monitoring program 216 intercepts and inspects any network traffic passed via the appliance 200. In other embodiments, the health monitoring program 216 interfaces by any suitable means and/or mechanisms with one or more of the following: the encryption engine 234, cache manager 232, policy engine 236, multi-protocol compression logic 238, packet engine 240, daemon services 218, and shell services 214. As such, the health monitoring program 216 may call any application programming interface (API) to determine a state, status, or health of any portion of the appliance 200. For example, the health monitoring program 216 may ping or send a status inquiry on a periodic basis to check if a program, process, service or task is active and currently running. In another example, the health monitoring program 216 may check any status, error or history logs provided by any program, process, service or task to determine any condition, status or error with any portion of the appliance 200.

Daemon services 218 are programs that run continuously or in the background and handle periodic service requests received by appliance 200. In some embodiments, a daemon service may forward the requests to other programs or processes, such as another daemon service 218 as appropriate. As known to those skilled in the art, a daemon service 218 may run unattended to perform continuous or periodic system wide functions, such as network control, or to perform any desired task. In some embodiments, one or more daemon services 218 run in the user space 202, while in other embodiments, one or more daemon services 218 run in the kernel space.

Figure 2B:
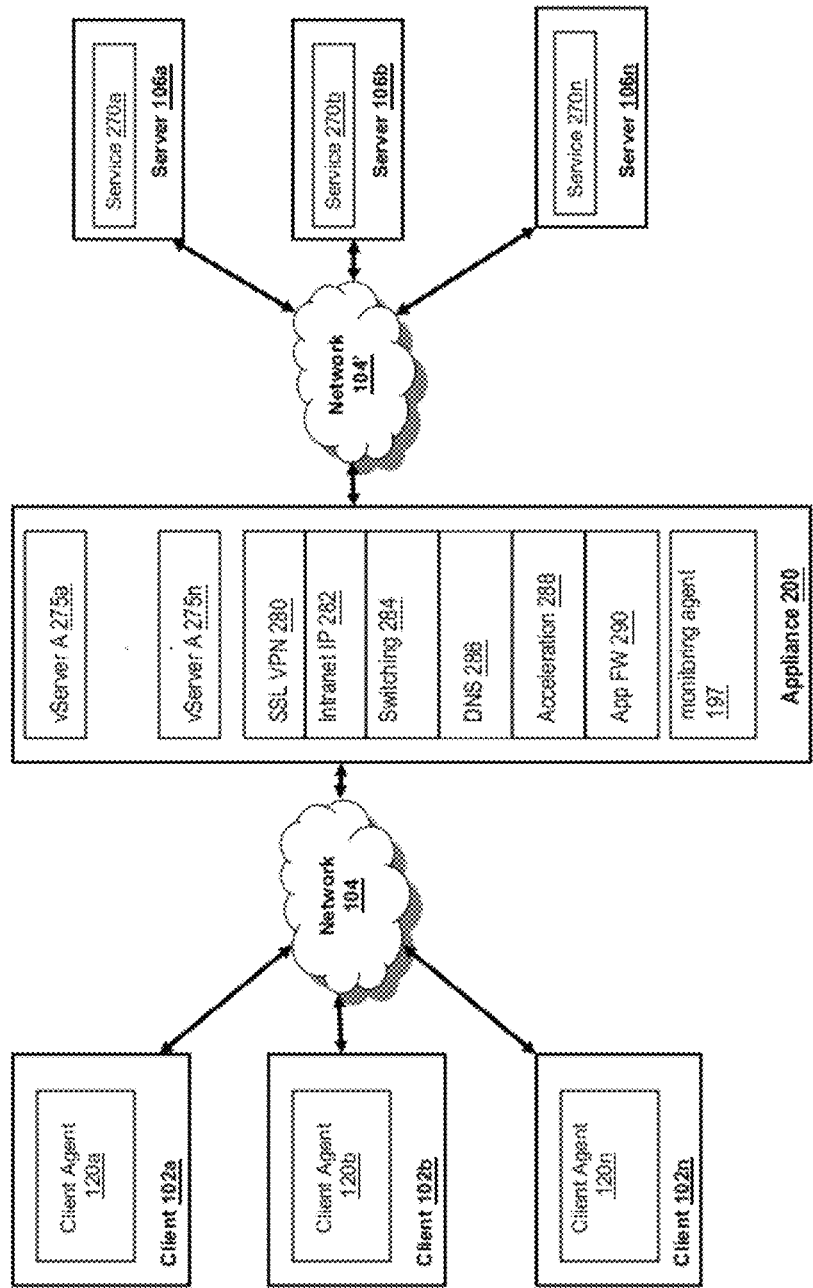
FIG. 2B is a block diagram of another embodiment of an appliance for optimizing, accelerating, load-balancing and routing communications between a client and a server.

Referring now to FIG. 2B, another embodiment of the appliance 200 is depicted. In brief overview, the appliance 200 provides one or more of the following services, functionality or operations: SSL VPN connectivity 280, switching/load balancing 284, Domain Name Service resolution 286, acceleration 288 and an application firewall 290 for communications between one or more clients 102 and one or more servers 106. Each of the servers 106 may provide one or more network related services 270a-270n (referred to as services 270). For example, a server 106 may provide an http service 270. The appliance 200 comprises one or more virtual servers or virtual internet protocol servers, referred to as a vServer, VIP server, or just VIP 275a-275n (also referred herein as vServer 275). The vServer 275 receives, intercepts or otherwise processes communications between a client 102 and a server 106 in accordance with the configuration and operations of the appliance 200.

The vServer 275 may comprise software, hardware or any combination of software and hardware. The vServer 275 may comprise any type and form of program, service, task, process or executable instructions operating in user mode 202, kernel mode 204 or any combination thereof in the appliance 200. The vServer 275 includes any logic, functions, rules, or operations to perform any embodiments of the techniques described herein, such as SSL VPN 280, switching/load balancing 284, Domain Name Service resolution 286, acceleration 288 and an application firewall 290. In some embodiments, the vServer 275 establishes a connection to a service 270 of a server 106. The service 275 may comprise any program, application, process, task or set of executable instructions capable of connecting to and communicating to the appliance 200, client 102 or vServer 275. For example, the service 275 may comprise a web server, http server, ftp, email or database server. In some embodiments, the service 270 is a daemon process or network driver for listening, receiving and/or sending communications for an application, such as email, database or an enterprise application. In some embodiments, the service 270 may communicate on a specific IP address, or IP address and port.

In some embodiments, the vServer 275 applies one or more policies of the policy engine 236 to network communications between the client 102 and server 106. In one embodiment, the policies are associated with a VServer 275. In another embodiment, the policies are based on a user, or a group of users. In yet another embodiment, a policy is global and applies to one or more vServers 275a-275n, and any user or group of users communicating via the appliance 200. In some embodiments, the policies of the policy engine have conditions upon which the policy is applied based on any content of the communication, such as internet protocol address, port, protocol type, header or fields in a packet, or the context of the communication, such as user, group of the user, vServer 275, transport layer connection, and/or identification or attributes of the client 102 or server 106.

In other embodiments, the appliance 200 communicates or interfaces with the policy engine 236 to determine authentication and/or authorization of a remote user or a remote client 102 to access the computing environment 15, application, and/or data file from a server 106. In another embodiment, the appliance 200 communicates or interfaces with the policy engine 236 to determine authentication and/or authorization of a remote user or a remote client 102 to have the application delivery system 190 deliver one or more of the computing environment 15, application, and/or data file. In yet another embodiment, the appliance 200 establishes a VPN or SSL VPN connection based on the policy engine's 236 authentication and/or authorization of a remote user or a remote client 102. In one embodiment, the appliance 200 controls the flow of network traffic and communication sessions based on policies of the policy engine 236. For example, the appliance 200 may control the access to a computing environment 15, application or data file based on the policy engine 236.

In some embodiments, the vServer 275 establishes a transport layer connection, such as a TCP or UDP connection with a client 102 via the client agent 120. In one embodiment, the vServer 275 listens for and receives communications from the client 102. In other embodiments, the vServer 275 establishes a transport layer connection, such as a TCP or UDP connection with a client server 106. In one embodiment, the vServer 275 establishes the transport layer connection to an internet protocol address and port of a server 270 running on the server 106. In another embodiment, the vServer 275 associates a first transport layer connection to a client 102 with a second transport layer connection to the server 106. In some embodiments, a vServer 275 establishes a pool of transport layer connections to a server 106 and multiplexes client requests via the pooled transport layer connections.

In some embodiments, the appliance 200 provides a SSL VPN connection 280 between a client 102 and a server 106. For example, a client 102 on a first network 102 requests to establish a connection to a server 106 on a second network 104'. In some embodiments, the second network 104' is not routable from the first network 104. In other embodiments, the client 102 is on a public network 104 and the server 106 is on a private network 104', such as a corporate network. In one embodiment, the client agent 120 intercepts communications of the client 102 on the first network 104, encrypts the communications, and transmits the communications via a first transport layer connection to the appliance 200. The appliance 200 associates the first transport layer connection on the first network 104 to a second transport layer connection to the server 106 on the second network 104. The appliance 200 receives the intercepted communication from the client agent 102, decrypts the communications, and transmits the communication to the server 106 on the second network 104 via the second transport layer connection. The second transport layer connection may be a pooled transport layer connection. As such, the appliance 200 provides an end-to-end secure transport layer connection for the client 102 between the two networks 104, 104'.

In one embodiment, the appliance 200 hosts an intranet internet protocol or intranetIP 282 address of the client 102 on the virtual private network 104. The client 102 has a local network identifier, such as an internet protocol (IP) address and/or host name on the first network 104. When connected to the second network 104' via the appliance 200, the appliance 200 establishes, assigns or otherwise provides an IntranetIP, which is network identifier, such as IP address and/or host name, for the client 102 on the second network 104'. The appliance 200 listens for and receives on the second or private network 104' for any communications directed towards the client 102 using the client's established IntranetIP 282. In one embodiment, the appliance 200 acts as or on behalf of the client 102 on the second private network 104. For example, in another embodiment, a vServer 275 listens for and responds to communications to the IntranetIP 282 of the client 102. In some embodiments, if a computing device 100 on the second network 104' transmits a request, the appliance 200 processes the request as if it were the client 102. For example, the appliance 200 may respond to a ping to the client's IntranetIP 282. In another example, the appliance may establish a connection, such as a TCP or UDP connection, with computing device 100 on the second network 104 requesting a connection with the client's IntranetIP 282.

In some embodiments, the appliance 200 provides one or more of the following acceleration techniques 288 to communications between the client 102 and server 106: 1) compression; 2) decompression; 3) Transmission Control Protocol pooling; 4) Transmission Control Protocol multiplexing; 5) Transmission Control Protocol buffering; and 6) caching. In one embodiment, the appliance 200 relieves servers 106 of much of the processing load caused by repeatedly opening and closing transport layers connections to clients 102 by opening one or more transport layer connections with each server 106 and maintaining these connections to allow repeated data accesses by clients via the Internet. This technique is referred to herein as "connection pooling".

In some embodiments, in order to seamlessly splice communications from a client 102 to a server 106 via a pooled transport layer connection, the appliance 200 translates or multiplexes communications by modifying sequence number and acknowledgment numbers at the transport layer protocol level. This is referred to as "connection multiplexing". In some embodiments, no application layer protocol interaction is required. For example, in the case of an in-bound packet (that is, a packet received from a client 102), the source network address of the packet is changed to that of an output port of appliance 200, and the destination network address is changed to that of the intended server. In the case of an outbound packet (that is, one received from a server 106), the source network address is changed from that of the server 106 to that of an output port of appliance 200 and the destination address is changed from that of appliance 200 to that of the requesting client 102. The sequence numbers and acknowledgment numbers of the packet are also translated to sequence numbers and acknowledgement expected by the client 102 on the appliance's 200 transport layer connection to the client 102. In some embodiments, the packet checksum of the transport layer protocol is recalculated to account for these translations.

In another embodiment, the appliance 200 provides switching or load-balancing functionality 284 for communications between the client 102 and server 106. In some embodiments, the appliance 200 distributes traffic and directs client requests to a server 106 based on layer 4 or application-layer request data. In one embodiment, although the network layer or layer 2 of the network packet identifies a destination server 106, the appliance 200 determines the server 106 to distribute the network packet by application information and data carried as payload of the transport layer packet. In one embodiment, the health monitoring programs 216 of the appliance 200 monitor the health of servers to determine the server 106 for which to distribute a client's request. In some embodiments, if the appliance 200 detects a server 106 is not available or has a load over a predetermined threshold, the appliance 200 can direct or distribute client requests to another server 106.

In some embodiments, the appliance 200 acts as a Domain Name Service (DNS) resolver or otherwise provides resolution of a DNS request from clients 102. In some embodiments, the appliance intercepts' a DNS request transmitted by the client 102. In one embodiment, the appliance 200 responds to a client's DNS request with an IP address of or hosted by the appliance 200. In this embodiment, the client 102 transmits network communication for the domain name to the appliance 200. In another embodiment, the appliance 200 responds to a client's DNS request with an IP address of or hosted by a second appliance 200'. In some embodiments, the appliance 200 responds to a client's DNS request with an IP address of a server 106 determined by the appliance 200.

In yet another embodiment, the appliance 200 provides application firewall functionality 290 for communications between the client 102 and server 106. In one embodiment, the policy engine 236 provides rules for detecting and blocking illegitimate requests. In some embodiments, the application firewall 290 protects against denial of service (DoS) attacks. In other embodiments, the appliance inspects the content of intercepted requests to identify and block application-based attacks. In some embodiments, the rules/policy engine 236 comprises one or more application firewall or security control policies for providing protections against various classes and types of web or Internet based vulnerabilities, such as one or more of the following: 1) buffer overflow, 2) CGI-BIN parameter manipulation, 3) form/hidden field manipulation, 4) forceful browsing, 5) cookie or session poisoning, 6) broken access control list (ACLs) or weak passwords, 7) cross-site scripting (XSS), 8) command injection, 9) SQL injection, 10) error triggering sensitive information leak, 11) insecure use of cryptography, 12) server misconfiguration, 13) back doors and debug options, 14) website defacement, 15) platform or operating systems vulnerabilities, and 16) zero-day exploits. In an embodiment, the application firewall 290 provides HTML form field protection in the form of inspecting or analyzing the network communication for one or more of the following: 1) required fields are returned, 2) no added field allowed, 3) read-only and hidden field enforcement, 4) drop-down list and radio button field conformance, and 5) form-field max-length enforcement. In some embodiments, the application firewall 290 ensures cookies are not modified. In other embodiments, the application firewall 290 protects against forceful browsing by enforcing legal URLs.

In still yet other embodiments, the application firewall 290 protects any confidential information contained in the network communication. The application firewall 290 may inspect or analyze any network communication in accordance with the rules or polices of the engine 236 to identify any confidential information in any field of the network packet. In some embodiments, the application firewall 290 identifies in the network communication one or more occurrences of a credit card number, password, social security number, name, patient code, contact information, and age. The encoded portion of the network communication may comprise these occurrences or the confidential information. Based on these occurrences, in one embodiment, the application firewall 290 may take a policy action on the network communication, such as prevent transmission of the network communication. In another embodiment, the application firewall 290 may rewrite, remove or otherwise mask such identified occurrence or confidential information.

Still referring to FIG. 2B, the appliance 200 may include a performance monitoring agent 197 as discussed above in conjunction with FIG. 1D. In one embodiment, the appliance 200 receives the monitoring agent 197 from the monitoring service 198 or monitoring server 106 as depicted in FIG. 1D. In some embodiments, the appliance 200 stores the monitoring agent 197 in storage, such as disk, for delivery to any client or server in communication with the appliance 200. For example, in one embodiment, the appliance 200 transmits the monitoring agent 197 to a client upon receiving a request to establish a transport layer connection. In other embodiments, the appliance 200 transmits the monitoring agent 197 upon establishing the transport layer connection with the client 102. In another embodiment, the appliance 200 transmits the monitoring agent 197 to the client upon intercepting or detecting a request for a web page. In yet another embodiment, the appliance 200 transmits the monitoring agent 197 to a client or a server in response to a request from the monitoring server 198. In one embodiment, the appliance 200 transmits the monitoring agent 197 to a second appliance 200' or appliance 205.

In other embodiments, the appliance 200 executes the monitoring agent 197. In one embodiment, the monitoring agent 197 measures and monitors the performance of any application, program, process, service, task or thread executing on the appliance 200. For example, the monitoring agent 197 may monitor and measure performance and operation of vServers 275A-275N. In another embodiment, the monitoring agent 197 measures and monitors the performance of any transport layer connections of the appliance 200. In some embodiments, the monitoring agent 197 measures and monitors the performance of any user sessions traversing the appliance 200. In one embodiment, the monitoring agent 197 measures and monitors the performance of any virtual private network connections and/or sessions traversing the appliance 200, such an SSL VPN session. In still further embodiments, the monitoring agent 197 measures and monitors the memory, CPU and disk usage and performance of the appliance 200. In yet another embodiment, the monitoring agent 197 measures and monitors the performance of any acceleration technique 288 performed by the appliance 200, such as SSL offloading, connection pooling and multiplexing, caching, and compression. In some embodiments, the monitoring agent 197 measures and monitors the performance of any load balancing and/or content switching 284 performed by the appliance 200. In other embodiments, the monitoring agent 197 measures and monitors the performance of application firewall 290 protection and processing performed by the appliance 200.

C. Client Agent

Figure 3:
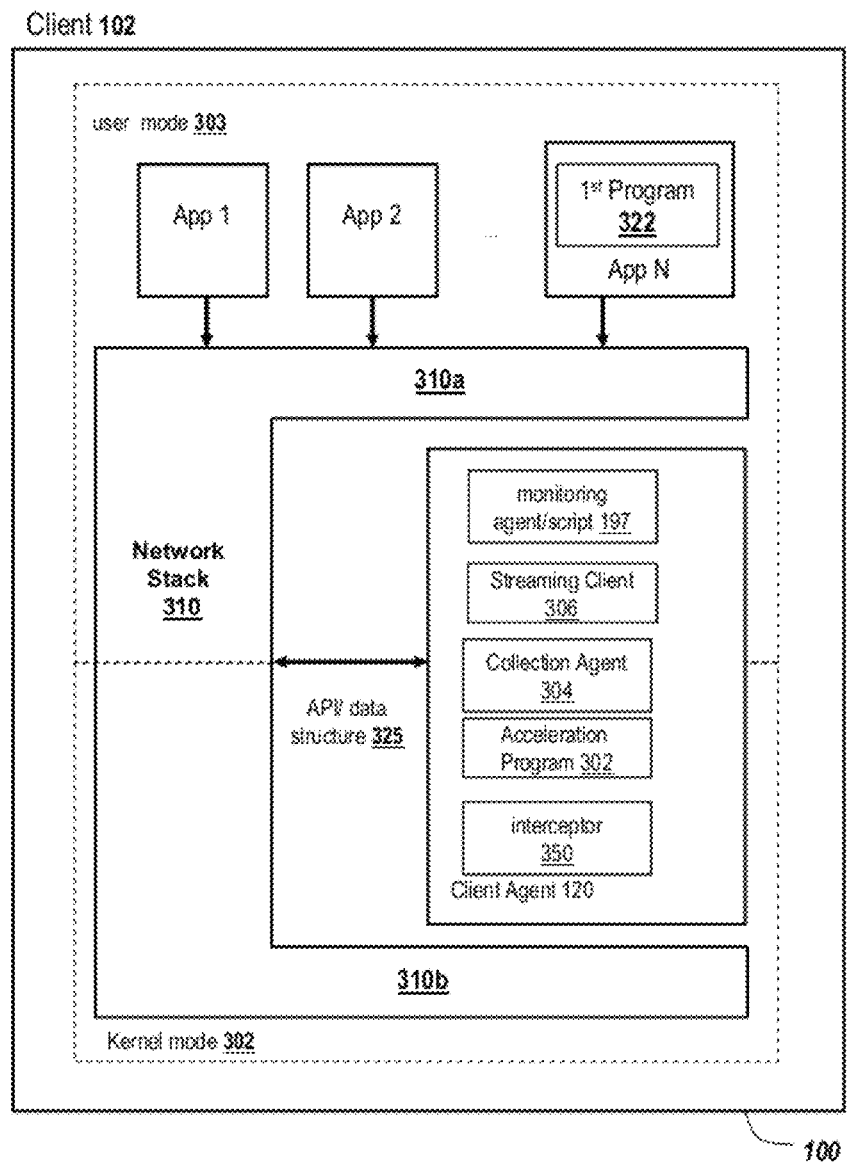
FIG. 3 is a block diagram of an embodiment of a client for communicating with a server via the appliance.

Referring now to FIG. 3, an embodiment of the client agent 120 is depicted. The client 102 includes a client agent 120 for establishing and exchanging communications with the appliance 200 and/or server 106 via a network 104. In brief overview, the client 102 operates on computing device 100 having an operating system with a kernel mode 302 and a user mode 303, and a network stack 310 with one or more layers 310a-310b. The client 102 may have installed and/or execute one or more applications. In some embodiments, one or more applications may communicate via the network stack 310 to a network 104. One of the applications, such as a web browser, may also include a first program 322. For example, the first program 322 may be used in some embodiments to install and/or execute the client agent 120, or any portion thereof. The client agent 120 includes an interception mechanism, or interceptor 350, for intercepting network communications from the network stack 310 from the one or more applications.

The network stack 310 of the client 102 may comprise any type and form of software, or hardware, or any combinations thereof, for providing connectivity to and communications with a network. In one embodiment, the network stack 310 comprises a software implementation for a network protocol suite. The network stack 310 may comprise one or more network layers, such as any networks layers of the Open Systems Interconnection (OSI) communications model as those skilled in the art recognize and appreciate. As such, the network stack 310 may comprise any type and form of protocols for any of the following layers of the OSI model: 1) physical link layer, 2) data link layer, 3) network layer, 4) transport layer, 5) session layer, 6) presentation layer, and 7) application layer. In one embodiment, the network stack 310 may comprise a transport control protocol (TCP) over the network layer protocol of the internet protocol (IP), generally referred to as TCP/IP. In some embodiments, the TCP/IP protocol may be carried over the Ethernet protocol, which may comprise any of the family of IEEE wide-area-network (WAN) or local-area-network (LAN) protocols, such as those protocols covered by the IEEE 802.3. In some embodiments, the network stack 310 comprises any type and form of a wireless protocol, such as IEEE 802.11 and/or mobile internet protocol.

In view of a TCP/IP based network, any TCP/IP based protocol may be used, including Messaging Application Programming Interface (MAPI) (email), File Transfer Protocol (FTP), HyperText Transfer Protocol (HTTP), Common Internet File System (CIFS) protocol (file transfer), Independent Computing Architecture (ICA) protocol, Remote Desktop Protocol (RDP), Wireless Application Protocol (WAP), Mobile IP protocol, and Voice Over IP (VoIP) protocol. In another embodiment, the network stack 310 comprises any type and form of transport control protocol, such as a modified transport control protocol, for example a Transaction TCP (T/TCP), TCP with selection acknowledgements (TCP-SACK), TCP with large windows (TCP-LW), a congestion prediction protocol such as the TCP-Vegas protocol, and a TCP spoofing protocol. In other embodiments, any type and form of user datagram protocol (UDP), such as UDP over IP, may be used by the network stack 310, such as for voice communications or real-time data communications.

Furthermore, the network stack 310 may include one or more network drivers supporting the one or more layers, such as a TCP driver or a network layer driver. The network drivers may be included as part of the operating system of the computing device 100 or as part of any network interface cards or other network access components of the computing device 100. In some embodiments, any of the network drivers of the network stack 310 may be customized, modified or adapted to provide a custom or modified portion of the network stack 310 in support of any of the techniques described herein. In other embodiments, the acceleration program 120 is designed and constructed to operate with or work in conjunction with the network stack 310 installed or otherwise provided by the operating system of the client 102.

The network stack 310 comprises any type and form of interfaces for receiving, obtaining, providing or otherwise accessing any information and data related to network communications of the client 102. In one embodiment, an interface to the network stack 310 comprises an application programming interface (API). The interface may also comprise any function call, hooking or filtering mechanism, event or call back mechanism, or any type of interfacing technique. The network stack 310 via the interface may receive or provide any type and form of data structure, such as an object, related to functionality or operation of the network stack 310. For example, the data structure may comprise information and data related to a network packet or one or more network packets. In some embodiments, the data structure comprises a portion of the network packet processed at a protocol layer of the network stack 310, such as a network packet of the transport layer. In some embodiments, the data structure 325 comprises a kernel-level data structure, while in other embodiments, the data structure 325 comprises a user-mode data structure. A kernel-level data structure may comprise a data structure obtained or related to a portion of the network stack 310 operating in kernel-mode 302, or a network driver or other software running in kernel-mode 302, or any data structure obtained or received by a service, process, task, thread or other executable instructions running or operating in kernel-mode of the operating system.

Additionally, some portions of the network stack 310 may execute or operate in kernel-mode 302, for example, the data link or network layer, while other portions execute or operate in user-mode 303, such as an application layer of the network stack 310. For example, a first portion 310a of the network stack may provide user-mode access to the network stack 310 to an application while a second portion 310a of the network stack 310 provides access to a network. In some embodiments, a first portion 310a of the network stack may comprise one or more upper layers of the network stack 310, such as any of layers 5-7. In other embodiments, a second portion 310b of the network stack 310 comprises one or more lower layers, such as any of layers 1-4. Each of the first portion 310a and second portion 310b of the network stack 310 may comprise any portion of the network stack 310, at any one or more network layers, in user-mode 203, kernel-mode, 202, or combinations thereof, or at any portion of a network layer or interface point to a network layer or any portion of or interface point to the user-mode 203 and kernel-mode 203.

The interceptor 350 may comprise software, hardware, or any combination of software and hardware. In one embodiment, the interceptor 350 intercept a network communication at any point in the network stack 310, and redirects or transmits the network communication to a destination desired, managed or controlled by the interceptor 350 or client agent 120. For example, the interceptor 350 may intercept a network communication of a network stack 310 of a first network and transmit the network communication to the appliance 200 for transmission on a second network 104. In some embodiments, the interceptor 350 comprises any type interceptor 350 comprises a driver, such as a network driver constructed and designed to interface and work with the network stack 310. In some embodiments, the client agent 120 and/or interceptor 350 operates at one or more layers of the network stack 310, such as at the transport layer. In one embodiment, the interceptor 350 comprises a filter driver, hooking mechanism, or any form and type of suitable network driver interface that interfaces to the transport layer of the network stack, such as via the transport driver interface (TDI). In some embodiments, the interceptor 350 interfaces to a first protocol layer, such as the transport layer and another protocol layer, such as any layer above the transport protocol layer, for example, an application protocol layer. In one embodiment, the interceptor 350 may comprise a driver complying with the Network Driver Interface Specification (NDIS), or a NDIS driver. In another embodiment, the interceptor 350 may comprise a min-filter or a mini-port driver. In one embodiment, the interceptor 350, or portion thereof, operates in kernel-mode 202. In another embodiment, the interceptor 350, or portion thereof, operates in user-mode 203. In some embodiments, a portion of the interceptor 350 operates in kernel-mode 202 while another portion of the interceptor 350 operates in user-mode 203. In other embodiments, the client agent 120 operates in user-mode 203 but interfaces via the interceptor 350 to a kernel-mode driver, process, service, task or portion of the operating system, such as to obtain a kernel-level data structure 225. In further embodiments, the interceptor 350 is a user-mode application or program, such as application.

In one embodiment, the interceptor 350 intercepts any transport layer connection requests. In these embodiments, the interceptor 350 execute transport layer application programming interface (API) calls to set the destination information, such as destination IP address and/or port to a desired location for the location. In this manner, the interceptor 350 intercepts and redirects the transport layer connection to a IP address and port controlled or managed by the interceptor 350 or client agent 120. In one embodiment, the interceptor 350 sets the destination information for the connection to a local IP address and port of the client 102 on which the client agent 120 is listening. For example, the client agent 120 may comprise a proxy service listening on a local IP address and port for redirected transport layer communications. In some embodiments, the client agent 120 then communicates the redirected transport layer communication to the appliance 200.

In some embodiments, the interceptor 350 intercepts a Domain Name Service (DNS) request. In one embodiment, the client agent 120 and/or interceptor 350 resolves the DNS request. In another embodiment, the interceptor transmits the intercepted DNS request to the appliance 200 for DNS resolution. In one embodiment, the appliance 200 resolves the DNS request and communicates the DNS response to the client agent 120. In some embodiments, the appliance 200 resolves the DNS request via another appliance 200' or a DNS server 106.

In yet another embodiment, the client agent 120 may comprise two agents 120 and 120'. In one embodiment, a first agent 120 may comprise an interceptor 350 operating at the network layer of the network stack 310. In some embodiments, the first agent 120 intercepts network layer requests such as Internet Control Message Protocol (ICMP) requests (e.g., ping and traceroute). In other embodiments, the second agent 120' may operate at the transport layer and intercept transport layer communications. In some embodiments, the first agent 120 intercepts communications at one layer of the network stack 210 and interfaces with or communicates the intercepted communication to the second agent 120'.

The client agent 120 and/or interceptor 350 may operate at or interface with a protocol layer in a manner transparent to any other protocol layer of the network stack 310. For example, in one embodiment, the interceptor 350 operates or interfaces with the transport layer of the network stack 310 transparently to any protocol layer below the transport layer, such as the network layer, and any protocol layer above the transport layer, such as the session, presentation or application layer protocols. This allows the other protocol layers of the network stack 310 to operate as desired and without modification for using the interceptor 350. As such, the client agent 120 and/or interceptor 350 can interface with the transport layer to secure, optimize, accelerate, route or load-balance any communications provided via any protocol carried by the transport layer, such as any application layer protocol over TCP/IP.

Furthermore, the client agent 120 and/or interceptor may operate at or interface with the network stack 310 in a manner transparent to any application, a user of the client 102, and any other computing device, such as a server, in communications with the client 102. The client agent 120 and/or interceptor 350 may be installed and/or executed on the client 102 in a manner without modification of an application. In some embodiments, the user of the client 102 or a computing device in communications with the client 102 are not aware of the existence, execution or operation of the client agent 120 and/or interceptor 350. As such, in some embodiments, the client agent 120 and/or interceptor 350 is installed, executed, and/or operated transparently to an application, user of the client 102, another computing device, such as a server, or any of the protocol layers above and/or below the protocol layer interfaced to by the interceptor 350.

The client agent 120 includes an acceleration program 302, a streaming client 306, a collection agent 304, and/or monitoring agent 197. In one embodiment, the client agent 120 comprises an Independent Computing Architecture (ICA) client, or any portion thereof, developed by Citrix Systems, Inc. of Fort Lauderdale, Fla., and is also referred to as an ICA client. In some embodiments, the client 120 comprises an application streaming client 306 for streaming an application from a server 106 to a client 102. In some embodiments, the client agent 120 comprises an acceleration program 302 for accelerating communications between client 102 and server 106. In another embodiment, the client agent 120 includes a collection agent 304 for performing end-point detection/scanning and collecting end-point information for the appliance 200 and/or server 106.

In some embodiments, the acceleration program 302 comprises a client-side acceleration program for performing one or more acceleration techniques to accelerate, enhance or otherwise improve a client's communications with and/or access to a server 106, such as accessing an application provided by a server 106. The logic, functions, and/or operations of the executable instructions of the acceleration program 302 may perform one or more of the following acceleration techniques: 1) multi-protocol compression, 2) transport control protocol pooling, 3) transport control protocol multiplexing, 4) transport control protocol buffering, and 5) caching via a cache manager. Additionally, the acceleration program 302 may perform encryption and/or decryption of any communications received and/or transmitted by the client 102. In some embodiments, the acceleration program 302 performs one or more of the acceleration techniques in an integrated manner or fashion. Additionally, the acceleration program 302 can perform compression on any of the protocols, or multiple-protocols, carried as a payload of a network packet of the transport layer protocol. The streaming client 306 comprises an application, program, process, service, task or executable instructions for receiving and executing a streamed application from a server 106. A server 106 may stream one or more application data files to the streaming client 306 for playing, executing or otherwise causing to be executed the application on the client 102. In some embodiments, the server 106 transmits a set of compressed or packaged application data files to the streaming client 306. In some embodiments, the plurality of application files are compressed and stored on a file server within an archive file such as a CAB, ZIP, SIT, TAR, JAR or other archive. In one embodiment, the server 106 decompresses, unpackages or unarchives the application files and transmits the files to the client 102. In another embodiment, the client 102 decompresses, unpackages or unarchives the application files. The streaming client 306 dynamically installs the application, or portion thereof, and executes the application. In one embodiment, the streaming client 306 may be an executable program. In some embodiments, the streaming client 306 may be able to launch another executable program.

The collection agent 304 comprises an application, program, process, service, task or executable instructions for identifying, obtaining and/or collecting information about the client 102. In some embodiments, the appliance 200 transmits the collection agent 304 to the client 102 or client agent 120. The collection agent 304 may be configured according to one or more policies of the policy engine 236 of the appliance. In other embodiments, the collection agent 304 transmits collected information on the client 102 to the appliance 200. In one embodiment, the policy engine 236 of the appliance 200 uses the collected information to determine and provide access, authentication and authorization control of the client's connection to a network 104.

In one embodiment, the collection agent 304 comprises an end-point detection and scanning mechanism, which identifies and determines one or more attributes or characteristics of the client. For example, the collection agent 304 may identify and determine any one or more of the following client-side attributes: 1) the operating system an/or a version of an operating system, 2) a service pack of the operating system, 3) a running service, 4) a running process, and 5) a file. The collection agent 304 may also identify and determine the presence or versions of any one or more of the following on the client: 1) antivirus software, 2) personal firewall software, 3) anti-spam software, and 4) internet security software. The policy engine 236 may have one or more policies based on any one or more of the attributes or characteristics of the client or client-side attributes.

In some embodiments, the client agent 120 includes a monitoring agent 197 as discussed in conjunction with FIGS. 1D and 2B. The monitoring agent 197 may be any type and form of script, such as Visual Basic or Java script. In one embodiment, the monitoring agent 129 monitors and measures performance of any portion of the client agent 120. For example, in some embodiments, the monitoring agent 129 monitors and measures performance of the acceleration program 302. In another embodiment, the monitoring agent 129 monitors and measures performance of the streaming client 306. In other embodiments, the monitoring agent 129 monitors and measures performance of the collection agent 304. In still another embodiment, the monitoring agent 129 monitors and measures performance of the interceptor 350. In some embodiments, the monitoring agent 129 monitors and measures any resource of the client 102, such as memory, CPU and disk.

The monitoring agent 197 may monitor and measure performance of any application of the client. In one embodiment, the monitoring agent 129 monitors and measures performance of a browser on the client 102. In some embodiments, the monitoring agent 197 monitors and measures performance of any application delivered via the client agent 120. In other embodiments, the monitoring agent 197 measures and monitors end user response times for an application, such as web-based or HTTP response times. The monitoring agent 197 may monitor and measure performance of an ICA or RDP client. In another embodiment, the monitoring agent 197 measures and monitors metrics for a user session or application session. In some embodiments, monitoring agent 197 measures and monitors an ICA or RDP session. In one embodiment, the monitoring agent 197 measures and monitors the performance of the appliance 200 in accelerating delivery of an application and/or data to the client 102.

In some embodiments and still referring to FIG. 3, a first program 322 may be used to install and/or execute the client agent 120, or portion thereof, such as the interceptor 350, automatically, silently, transparently, or otherwise. In one embodiment, the first program 322 comprises a plugin component, such an ActiveX control or Java control or script that is loaded into and executed by an application. For example, the first program comprises an ActiveX control loaded and run by a web browser application, such as in the memory space or context of the application. In another embodiment, the first program 322 comprises a set of executable instructions loaded into and run by the application, such as a browser. In one embodiment, the first program 322 comprises a designed and constructed program to install the client agent 120. In some embodiments, the first program 322 obtains, downloads, or receives the client agent 120 via the network from another computing device. In another embodiment, the first program 322 is an installer program or a plug and play manager for installing programs, such as network drivers, on the operating system of the client 102.

Figure 4A:
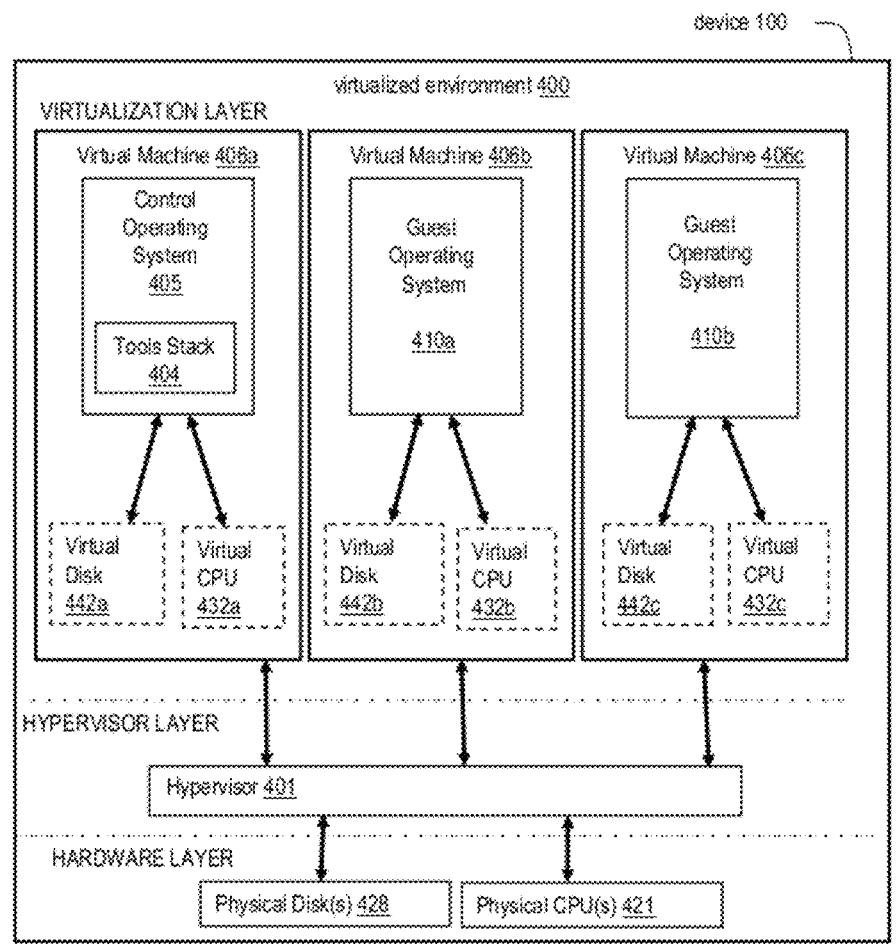
FIG. 4A is a block diagram of an embodiment of a virtualization environment.

D. Systems and Methods for Providing Virtualized Application Delivery Controller Referring now to FIG. 4A, a block diagram depicts one embodiment of a virtualization environment 400. In brief overview, a computing device 100 includes a hypervisor layer, a virtualization layer, and a hardware layer. The hypervisor layer includes a hypervisor 401 (also referred to as a virtualization manager) that allocates and manages access to a number of physical resources in the hardware layer (e.g., the processor(s) 421, and disk(s) 428) by at least one virtual machine executing in the virtualization layer. The virtualization layer includes at least one operating system 410 and a plurality of virtual resources allocated to the at least one operating system 410. Virtual resources may include, without limitation, a plurality of virtual processors 432a, 432b, 432c (generally 432), and virtual disks 442a, 442b, 442c (generally 442), as well as virtual resources such as virtual memory and virtual network interfaces. The plurality of virtual resources and the operating system 410 may be referred to as a virtual machine 406. A virtual machine 406 may include a control operating system 405 in communication with the hypervisor 401 and used to execute applications for managing and configuring other virtual machines on the computing device 100.

In greater detail, a hypervisor 401 may provide virtual resources to an operating system in any manner which simulates the operating system having access to a physical device. A hypervisor 401 may provide virtual resources to any number of guest operating systems 410a, 410b (generally 410). In some embodiments, a computing device 100 executes one or more types of hypervisors. In these embodiments, hypervisors may be used to emulate virtual hardware, partition physical hardware, virtualize physical hardware, and execute virtual machines that provide access to computing environments. Hypervisors may include those manufactured by VMWare, Inc., of Palo Alto, Calif.; the XEN hypervisor, an open source product whose development is overseen by the open source Xen.org community; HyperV, VirtualServer or virtual PC hypervisors provided by Microsoft, or others. In some embodiments, a computing device 100 executing a hypervisor that creates a virtual machine platform on which guest operating systems may execute is referred to as a host server. In one of these embodiments, for example, the computing device 100 is a XEN SERVER provided by Citrix Systems, Inc., of Fort Lauderdale, Fla.

In some embodiments, a hypervisor 401 executes within an operating system executing on a computing device. In one of these embodiments, a computing device executing an operating system and a hypervisor 401 may be said to have a host operating system (the operating system executing on the computing device), and a guest operating system (an operating system executing within a computing resource partition provided by the hypervisor 401). In other embodiments, a hypervisor 401 interacts directly with hardware on a computing device, instead of executing on a host operating system. In one of these embodiments, the hypervisor 401 may be said to be executing on "bare metal," referring to the hardware comprising the computing device.

In some embodiments, a hypervisor 401 may create a virtual machine 406a-c (generally 406) in which an operating system 410 executes. In one of these embodiments, for example, the hypervisor 401 loads a virtual machine image to create a virtual machine 406. In another of these embodiments, the hypervisor 401 executes an operating system 410 within the virtual machine 406. In still another of these embodiments, the virtual machine 406 executes an operating system 410.

In some embodiments, the hypervisor 401 controls processor scheduling and memory partitioning for a virtual machine 406 executing on the computing device 100. In one of these embodiments, the hypervisor 401 controls the execution of at least one virtual machine 406. In another of these embodiments, the hypervisor 401 presents at least one virtual machine 406 with an abstraction of at least one hardware resource provided by the computing device 100. In other embodiments, the hypervisor 401 controls whether and how physical processor capabilities are presented to the virtual machine 406.

A control operating system 405 may execute at least one application for managing and configuring the guest operating systems. In one embodiment, the control operating system 405 may execute an administrative application, such as an application including a user interface providing administrators with access to functionality for managing the execution of a virtual machine, including functionality for executing a virtual machine, terminating an execution of a virtual machine, or identifying a type of physical resource for allocation to the virtual machine. In another embodiment, the hypervisor 401 executes the control operating system 405 within a virtual machine 406 created by the hypervisor 401. In still another embodiment, the control operating system 405 executes in a virtual machine 406 that is authorized to directly access physical resources on the computing device 100. In some embodiments, a control operating system 405a on a computing device 100a may exchange data with a control operating system 405b on a computing device 100b, via communications between a hypervisor 401a and a hypervisor 401b. In this way, one or more computing devices 100 may exchange data with one or more of the other computing devices 100 regarding processors and other physical resources available in a pool of resources. In one of these embodiments, this functionality allows a hypervisor to manage a pool of resources distributed across a plurality of physical computing devices. In another of these embodiments, multiple hypervisors manage one or more of the guest operating systems executed on one of the computing devices 100.

In one embodiment, the control operating system 405 executes in a virtual machine 406 that is authorized to interact with at least one guest operating system 410. In another embodiment, a guest operating system 410 communicates with the control operating system 405 via the hypervisor 401 in order to request access to a disk or a network. In still another embodiment, the guest operating system 410 and the control operating system 405 may communicate via a communication channel established by the hypervisor 401, such as, for example, via a plurality of shared memory pages made available by the hypervisor 401.

In some embodiments, the control operating system 405 includes a network back-end driver for communicating directly with networking hardware provided by the computing device 100. In one of these embodiments, the network back-end driver processes at least one virtual machine request from at least one guest operating system 110. In other embodiments, the control operating system 405 includes a block back-end driver for communicating with a storage element on the computing device 100. In one of these embodiments, the block back-end driver reads and writes data from the storage element based upon at least one request received from a guest operating system 410.

In one embodiment, the control operating system 405 includes a tools stack 404. In another embodiment, a tools stack 404 provides functionality for interacting with the hypervisor 401, communicating with other control operating systems 405 (for example, on a second computing device 100b), or managing virtual machines 406b, 406c on the computing device 100. In another embodiment, the tools stack 404 includes customized applications for providing improved management functionality to an administrator of a virtual machine farm. In some embodiments, at least one of the tools stack 404 and the control operating system 405 include a management API that provides an interface for remotely configuring and controlling virtual machines 406 running on a computing device 100. In other embodiments, the control operating system 405 communicates with the hypervisor 401 through the tools stack 104.

In one embodiment, the hypervisor 401 executes a guest operating system 410 within a virtual machine 406 created by the hypervisor 401. In another embodiment, the guest operating system 410 provides a user of the computing device 100 with access to resources within a computing environment. In still another embodiment, a resource includes a program, an application, a document, a file, a plurality of applications, a plurality of files, an executable program file, a desktop environment, a computing environment, or other resource made available to a user of the computing device 100. In yet another embodiment, the resource may be delivered to the computing device 100 via a plurality of access methods including, but not limited to, conventional installation directly on the computing device 100, delivery to the computing device 100 via a method for application streaming, delivery to the computing device 100 of output data generated by an execution of the resource on a second computing device 100' and communicated to the computing device 100 via a presentation layer protocol, delivery to the computing device 100 of output data generated by an execution of the resource via a virtual machine executing on a second computing device 100', or execution from a removable storage device connected to the computing device 100, such as a USB device, or via a virtual machine executing on the computing device 100 and generating output data. In some embodiments, the computing device 100 transmits output data generated by the execution of the resource to another computing device 100'.

In one embodiment, the guest operating system 410, in conjunction with the virtual machine on which it executes, forms a fully-virtualized virtual machine which is not aware that it is a virtual machine; such a machine may be referred to as a "Domain U HVM (Hardware Virtual Machine) virtual machine". In another embodiment, a fully-virtualized machine includes software emulating a Basic Input/Output System (BIOS) in order to execute an operating system within the fully-virtualized machine. In still another embodiment, a fully-virtualized machine may include a driver that provides functionality by communicating with the hypervisor 401. In such an embodiment, the driver may be aware that it executes within a virtualized environment. In another embodiment, the guest operating system 410, in conjunction with the virtual machine on which it executes, forms a paravirtualized virtual machine, which is aware that it is a virtual machine; such a machine may be referred to as a "Domain U PV virtual machine". In another embodiment, a paravirtualized machine includes additional drivers that a fully-virtualized machine does not include. In still another embodiment, the paravirtualized machine includes the network back-end driver and the block back-end driver included in a control operating system 405, as described above.

Figure 4B:
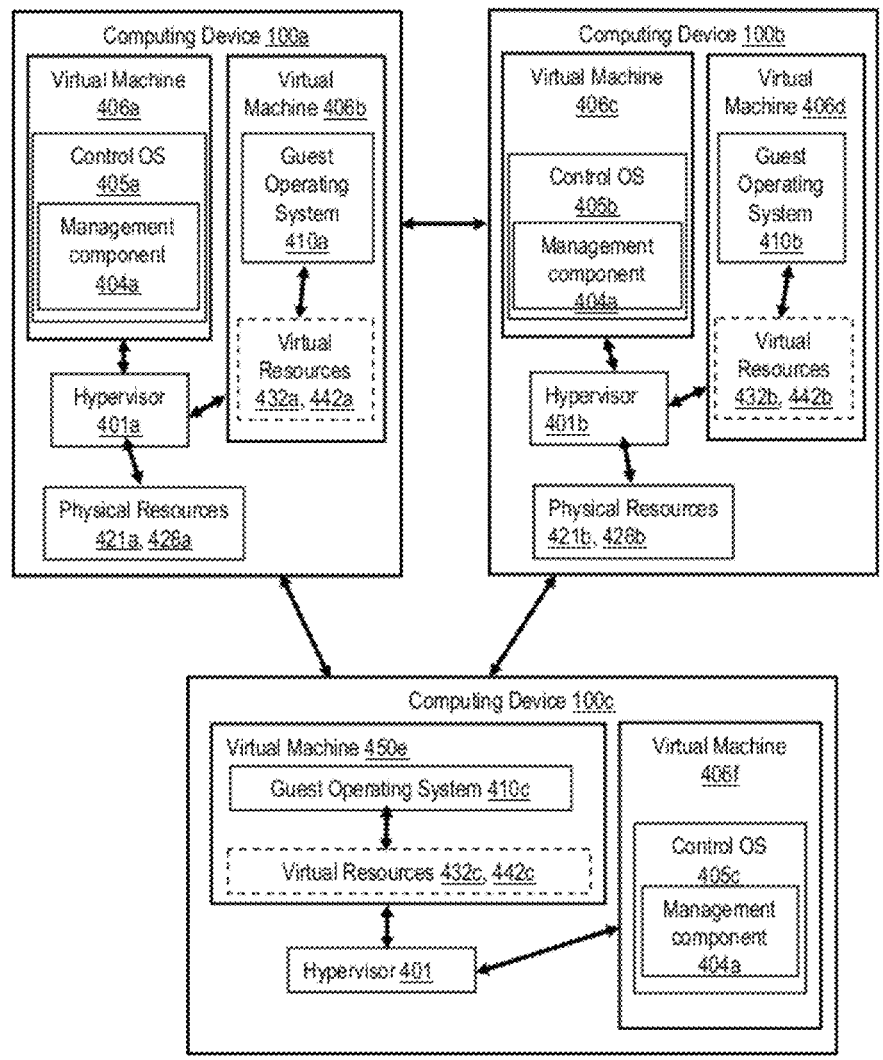
FIG. 4B is a block diagram of another embodiment of a virtualization environment.

Referring now to FIG. 4B, a block diagram depicts one embodiment of a plurality of networked computing devices in a system in which at least one physical host executes a virtual machine. In brief overview, the system includes a management component 404 and a hypervisor 401. The system includes a plurality of computing devices 100, a plurality of virtual machines 406, a plurality of hypervisors 401, a plurality of management components referred to as tools stacks 404, and a physical resource 421, 428. The plurality of physical machines 100 may each be provided as computing devices 100, described above in connection with FIGS. 1E-1H and 4A.

In greater detail, a physical disk 428 is provided by a computing device 100 and stores at least a portion of a virtual disk 442. In some embodiments, a virtual disk 442 is associated with a plurality of physical disks 428. In one of these embodiments, one or more computing devices 100 may exchange data with one or more of the other computing devices 100 regarding processors and other physical resources available in a pool of resources, allowing a hypervisor to manage a pool of resources distributed across a plurality of physical computing devices. In some embodiments, a computing device 100 on which a virtual machine 406 executes is referred to as a physical host 100 or as a host machine 100.

The hypervisor executes on a processor on the computing device 100. The hypervisor allocates, to a virtual disk, an amount of access to the physical disk. In one embodiment, the hypervisor 401 allocates an amount of space on the physical disk. In another embodiment, the hypervisor 401 allocates a plurality of pages on the physical disk. In some embodiments, the hypervisor provisions the virtual disk 442 as part of a process of initializing and executing a virtual machine 450.

In one embodiment, the management component 404a is referred to as a pool management component 404a. In another embodiment, a management operating system 405a, which may be referred to as a control operating system 405a, includes the management component. In some embodiments, the management component is referred to as a tools stack. In one of these embodiments, the management component is the tools stack 404 described above in connection with FIG. 4A. In other embodiments, the management component 404 provides a user interface for receiving, from a user such as an administrator, an identification of a virtual machine 406 to provision and/or execute. In still other embodiments, the management component 404 provides a user interface for receiving, from a user such as an administrator, the request for migration of a virtual machine 406b from one physical machine 100 to another. In further embodiments, the management component 404a identifies a computing device 100b on which to execute a requested virtual machine 406d and instructs the hypervisor 401b on the identified computing device 100b to execute the identified virtual machine; such a management component may be referred to as a pool management component.

Figure 4C:
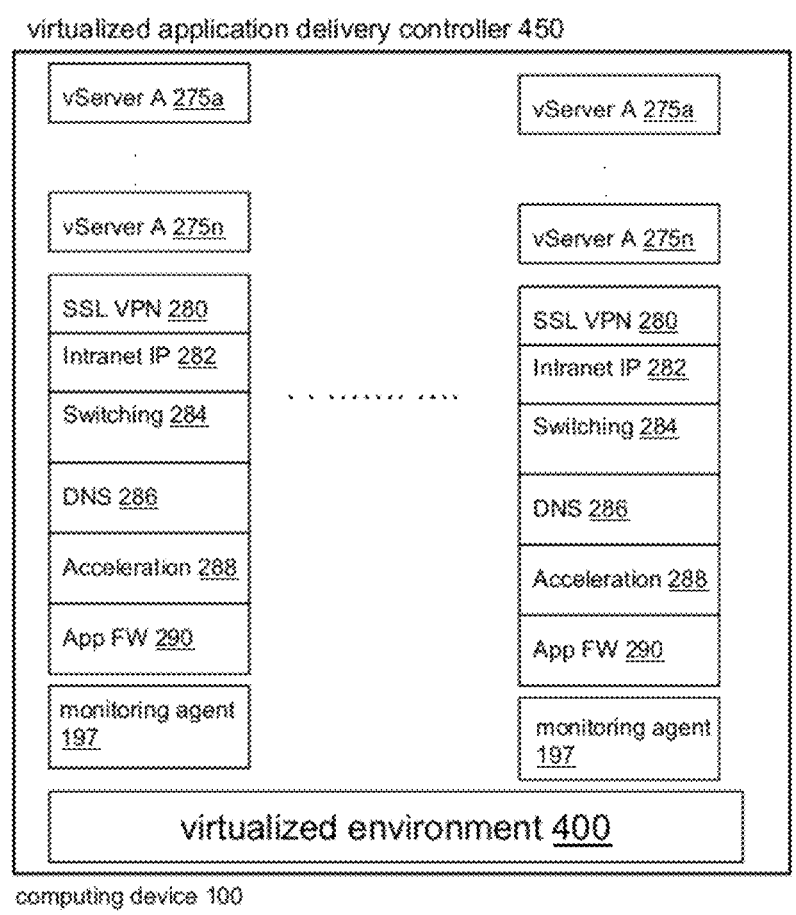
FIG. 4C is a block diagram of an embodiment of a virtualized appliance.

Referring now to FIG. 4C, embodiments of a virtual application delivery controller or virtual appliance 450 are depicted. In brief overview, any of the functionality and/or embodiments of the appliance 200 (e.g., an application delivery controller) described above in connection with FIGS. 2A and 2B may be deployed in any embodiment of the virtualized environment described above in connection with FIGS. 4A and 4B. Instead of the functionality of the application delivery controller being deployed in the form of an appliance 200, such functionality may be deployed in a virtualized environment 400 on any computing device 100, such as a client 102, server 106 or appliance 200.

Referring now to FIG. 4C, a diagram of an embodiment of a virtual appliance 450 operating on a hypervisor 401 of a server 106 is depicted. As with the appliance 200 of FIGS. 2A and 2B, the virtual appliance 450 may provide functionality for availability, performance, offload and security. For availability, the virtual appliance may perform load balancing between layers 4 and 7 of the network and may also perform intelligent service health monitoring. For performance increases via network traffic acceleration, the virtual appliance may perform caching and compression. To offload processing of any servers, the virtual appliance may perform connection multiplexing and pooling and/or SSL processing. For security, the virtual appliance may perform any of the application firewall functionality and SSL VPN function of appliance 200.

Any of the modules of the appliance 200 as described in connection with FIG. 2A may be packaged, combined, designed or constructed in a form of the virtualized appliance delivery controller 450 deployable as one or more software modules or components executable in a virtualized environment 300 or non-virtualized environment on any server, such as an off the shelf server. For example, the virtual appliance may be provided in the form of an installation package to install on a computing device. With reference to FIG. 2A, any of the cache manager 232, policy engine 236, compression 238, encryption engine 234, packet engine 240, GUI 210, CLI 212, shell services 214 and health monitoring programs 216 may be designed and constructed as a software component or module to run on any operating system of a computing device and/or of a virtualized environment 300. Instead of using the encryption processor 260, processor 262, memory 264 and network stack 267 of the appliance 200, the virtualized appliance 400 may use any of these resources as provided by the virtualized environment 400 or as otherwise available on the server 106.

Still referring to FIG. 4C, and in brief overview, any one or more vServers 275A-275N may be in operation or executed in a virtualized environment 400 of any type of computing device 100, such as any server 106. Any of the modules or functionality of the appliance 200 described in connection with FIG. 2B may be designed and constructed to operate in either a virtualized or non-virtualized environment of a server. Any of the vServer 275, SSL VPN 280, Intranet UP 282, Switching 284, DNS 286, acceleration 288, App FW 280 and monitoring agent may be packaged, combined, designed or constructed in a form of application delivery controller 450 deployable as one or more software modules or components executable on a device and/or virtualized environment 400.

In some embodiments, a server may execute multiple virtual machines 406a-406n in the virtualization environment with each virtual machine running the same or different embodiments of the virtual application delivery controller 450. In some embodiments, the server may execute one or more virtual appliances 450 on one or more virtual machines on a core of a multi-core processing system. In some embodiments, the server may execute one or more virtual appliances 450 on one or more virtual machines on each processor of a multiple processor device.

E. Systems and Methods for Providing A Multi-Core Architecture

In accordance with Moore's Law, the number of transistors that may be placed on an integrated circuit may double approximately every two years. However, CPU speed increases may reach plateaus, for example CPU speed has been around 3.5-4 GHz range since 2005. In some cases, CPU manufacturers may not rely on CPU speed increases to gain additional performance. Some CPU manufacturers may add additional cores to their processors to provide additional performance. Products, such as those of software and networking vendors, that rely on CPUs for performance gains may improve their performance by leveraging these multi-core CPUs. The software designed and constructed for a single CPU may be redesigned and/or rewritten to take advantage of a multi-threaded, parallel architecture or otherwise a multi-core architecture.

A multi-core architecture of the appliance 200, referred to as nCore or multi-core technology, allows the appliance in some embodiments to break the single core performance barrier and to leverage the power of multi-core CPUs. In the previous architecture described in connection with FIG. 2A, a single network or packet engine is run. The multiple cores of the nCore technology and architecture allow multiple packet engines to run concurrently and/or in parallel. With a packet engine running on each core, the appliance architecture leverages the processing capacity of additional cores. In some embodiments, this provides up to a 7× increase in performance and scalability.

Figure 5A:
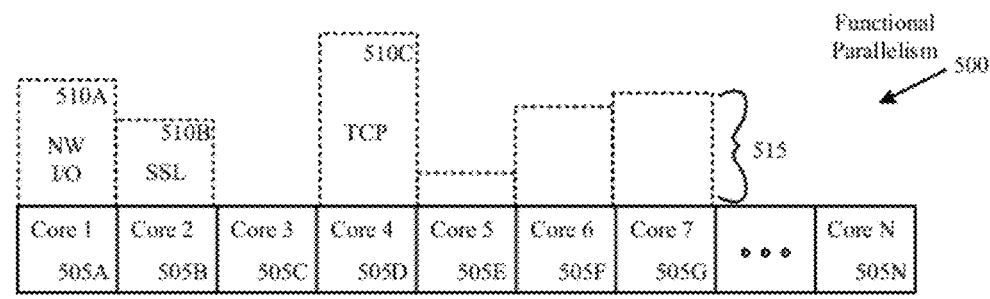
FIG. 5A are block diagrams of embodiments of approaches to implementing parallelism in a multi-core network appliance.
Figure 5A:
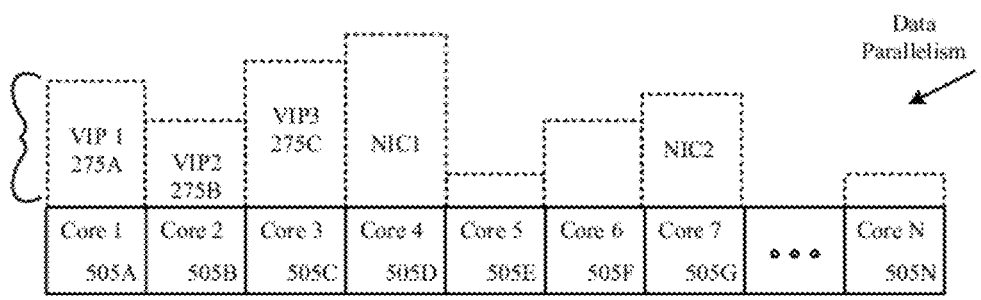
Figure 5A:
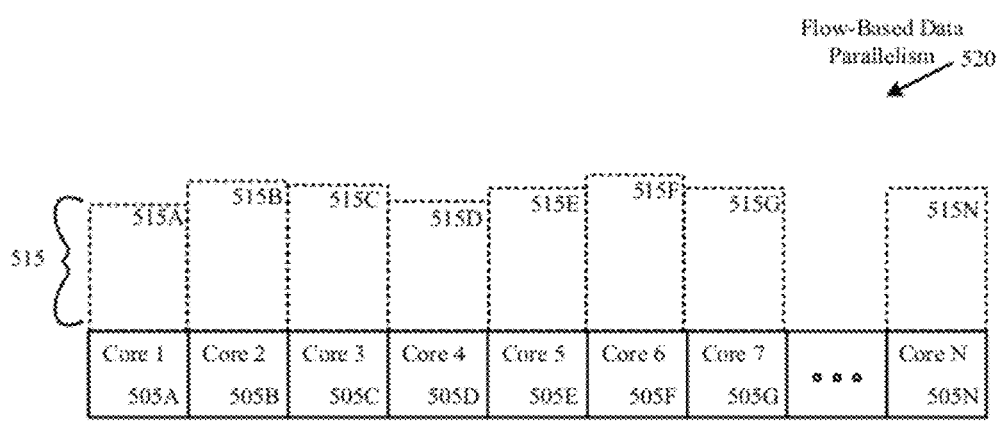

Illustrated in FIG. 5A are some embodiments of work, task, load or network traffic distribution across one or more processor cores according to a type of parallelism or parallel computing scheme, such as functional parallelism, data parallelism or flow-based data parallelism. In brief overview, FIG. 5A illustrates embodiments of a multi-core system such as an appliance 200' with n-cores, a total of cores numbers 1 through N. In one embodiment, work, load or network traffic can be distributed among a first core 505A, a second core 505B, a third core 505C, a fourth core 505D, a fifth core 505E, a sixth core 505F, a seventh core 505G, and so on such that distribution is across all or two or more of the n cores 505N (hereinafter referred to collectively as cores 505.) There may be multiple VIPs 275 each running on a respective core of the plurality of cores. There may be multiple packet engines 240 each running on a respective core of the plurality of cores. Any of the approaches used may lead to different, varying or similar work load or performance level 515 across any of the cores. For a functional parallelism approach, each core may run a different function of the functionalities provided by the packet engine, a VIP 275 or appliance 200. In a data parallelism approach, data may be paralleled or distributed across the cores based on the Network Interface Card (NIC) or VIP 275 receiving the data. In another data parallelism approach, processing may be distributed across the cores by distributing data flows to each core.

In further detail to FIG. 5A, in some embodiments, load, work or network traffic can be distributed among cores 505 according to functional parallelism 500. Functional parallelism may be based on each core performing one or more respective functions. In some embodiments, a first core may perform a first function while a second core performs a second function. In functional parallelism approach, the functions to be performed by the multi-core system are divided and distributed to each core according to functionality. In some embodiments, functional parallelism may be referred to as task parallelism and may be achieved when each processor or core executes a different process or function on the same or different data. The core or processor may execute the same or different code. In some cases, different execution threads or code may communicate with one another as they work. Communication may take place to pass data from one thread to the next as part of a workflow.

In some embodiments, distributing work across the cores 505 according to functional parallelism 500, can comprise distributing network traffic according to a particular function such as network input/output management (NW I/O) 510A, secure sockets layer (SSL) encryption and decryption 510B and transmission control protocol (TCP) functions 510C. This may lead to a work, performance or computing load 515 based on a volume or level of functionality being used. In some embodiments, distributing work across the cores 505 according to data parallelism 540, can comprise distributing an amount of work 515 based on distributing data associated with a particular hardware or software component. In some embodiments, distributing work across the cores 505 according to flow-based data parallelism 520, can comprise distributing data based on a context or flow such that the amount of work 515A-N on each core may be similar, substantially equal or relatively evenly distributed.

In the case of the functional parallelism approach, each core may be configured to run one or more functionalities of the plurality of functionalities provided by the packet engine or VIP of the appliance. For example, core 1 may perform network I/O processing for the appliance 200' while core 2 performs TCP connection management for the appliance. Likewise, core 3 may perform SSL offloading while core 4 may perform layer 7 or application layer processing and traffic management. Each of the cores may perform the same function or different functions. Each of the cores may perform more than one function. Any of the cores may run any of the functionality or portions thereof identified and/or described in conjunction with FIGS. 2A and 2B. In this the approach, the work across the cores may be divided by function in either a coarse-grained or fine-grained manner. In some cases, as illustrated in FIG. 5A, division by function may lead to different cores running at different levels of performance or load 515.

In the case of the functional parallelism approach, each core may be configured to run one or more functionalities of the plurality of functionalities provided by the packet engine of the appliance. For example, core 1 may perform network I/O processing for the appliance 200' while core 2 performs TCP connection management for the appliance. Likewise, core 3 may perform SSL offloading while core 4 may perform layer 7 or application layer processing and traffic management. Each of the cores may perform the same function or different functions. Each of the cores may perform more than one function. Any of the cores may run any of the functionality or portions thereof identified and/or described in conjunction with FIGS. 2A and 2B. In this the approach, the work across the cores may be divided by function in either a coarse-grained or fine-grained manner. In some cases, as illustrated in FIG. 5A division by function may lead to different cores running at different levels of load or performance.

Figure 5B:
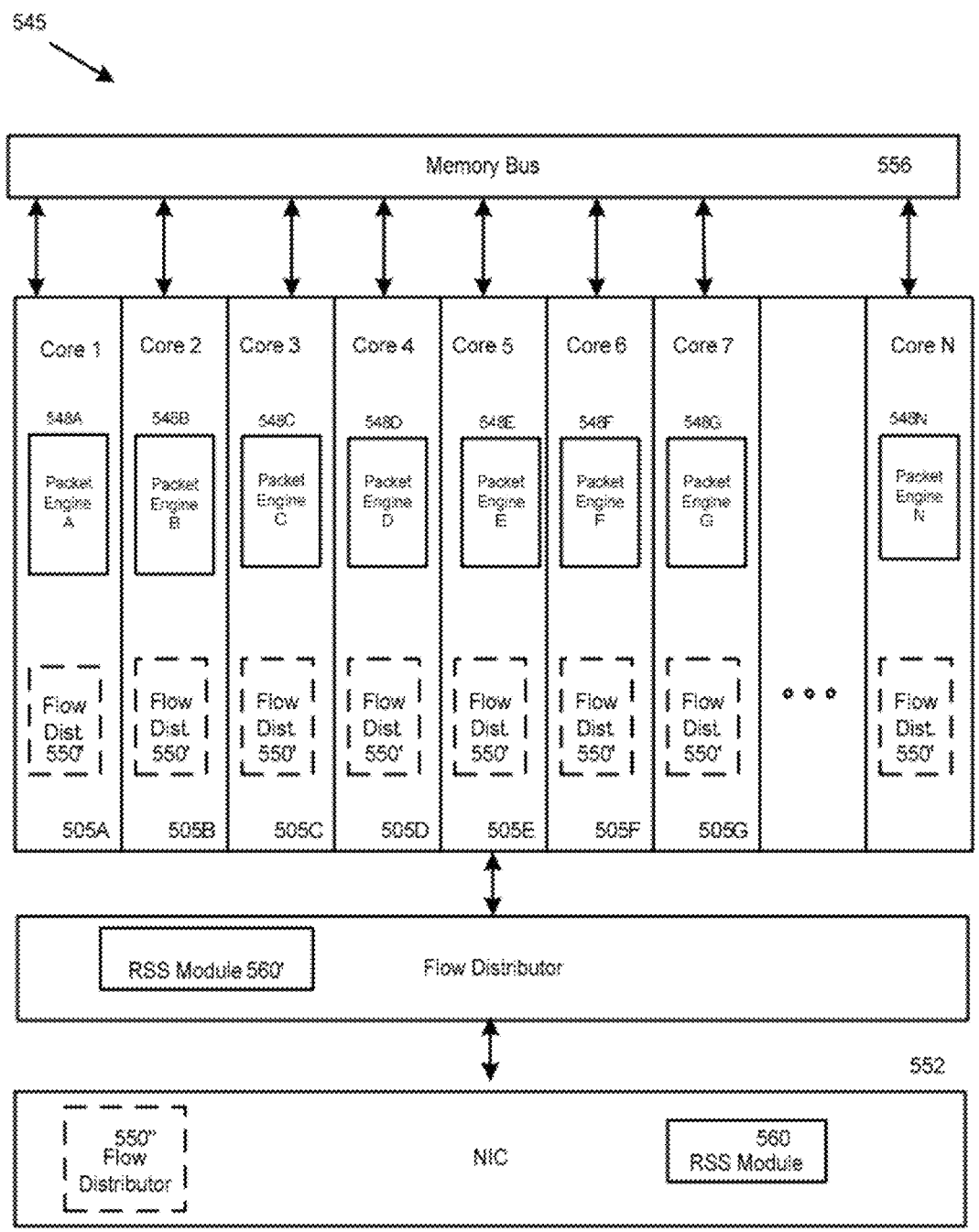
FIG. 5B is a block diagram of an embodiment of a system utilizing a multi-core network application.

The functionality or tasks may be distributed in any arrangement and scheme. For example, FIG. 5B illustrates a first core, Core 1 505A, processing applications and processes associated with network I/O functionality 510A. Network traffic associated with network I/O, in some embodiments, can be associated with a particular port number. Thus, outgoing and incoming packets having a port destination associated with NW I/O 510A will be directed towards Core 1 505A which is dedicated to handling all network traffic associated with the NW I/O port. Similarly, Core 2 505B is dedicated to handling functionality associated with SSL processing and Core 4 505D may be dedicated handling all TCP level processing and functionality.

While FIG. 5A illustrates functions such as network I/O, SSL and TCP, other functions can be assigned to cores. These other functions can include any one or more of the functions or operations described herein. For example, any of the functions described in conjunction with FIGS. 2A and 2B may be distributed across the cores on a functionality basis. In some cases, a first VIP 275A may run on a first core while a second VIP 275B with a different configuration may run on a second core. In some embodiments, each core 505 can handle a particular functionality such that each core 505 can handle the processing associated with that particular function. For example, Core 2 505B may handle SSL offloading while Core 4 505D may handle application layer processing and traffic management.

In other embodiments, work, load or network traffic may be distributed among cores 505 according to any type and form of data parallelism 540. In some embodiments, data parallelism may be achieved in a multi-core system by each core performing the same task or functionally on different pieces of distributed data. In some embodiments, a single execution thread or code controls operations on all pieces of data. In other embodiments, different threads or instructions control the operation, but may execute the same code. In some embodiments, data parallelism is achieved from the perspective of a packet engine, vServers (VIPs) 275A-C, network interface cards (NIC) 542D-E and/or any other networking hardware or software included on or associated with an appliance 200. For example, each core may run the same packet engine or VIP code or configuration but operate on different sets of distributed data. Each networking hardware or software construct can receive different, varying or substantially the same amount of data, and as a result may have varying, different or relatively the same amount of load 515.

In the case of a data parallelism approach, the work may be divided up and distributed based on VIPs, NICs and/or data flows of the VIPs or NICs. In one of these approaches, the work of the multi-core system may be divided or distributed among the VIPs by having each VIP work on a distributed set of data. For example, each core may be configured to run one or more VIPs. Network traffic may be distributed to the core for each VIP handling that traffic. In another of these approaches, the work of the appliance may be divided or distributed among the cores based on which NIC receives the network traffic. For example, network traffic of a first NIC may be distributed to a first core while network traffic of a second NIC may be distributed to a second core. In some cases, a core may process data from multiple NICs.

While FIG. 5A illustrates a single vServer associated with a single core 505, as is the case for VIP1 275A, VIP2 275B and VIP3 275C. In some embodiments, a single vServer can be associated with one or more cores 505. In contrast, one or more vServers can be associated with a single core 505. Associating a vServer with a core 505 may include that core 505 to process all functions associated with that particular vServer. In some embodiments, each core executes a VIP having the same code and configuration. In other embodiments, each core executes a VIP having the same code but different configuration. In some embodiments, each core executes a VIP having different code and the same or different configuration.

Like vServers, NICs can also be associated with particular cores 505. In many embodiments, NICs can be connected to one or more cores 505 such that when a NIC receives or transmits data packets, a particular core 505 handles the processing involved with receiving and transmitting the data packets. In one embodiment, a single NIC can be associated with a single core 505, as is the case with NIC1 542D and NIC2 542E. In other embodiments, one or more NICs can be associated with a single core 505. In other embodiments, a single NIC can be associated with one or more cores 505. In these embodiments, load could be distributed amongst the one or more cores 505 such that each core 505 processes a substantially similar amount of load. A core 505 associated with a NIC may process all functions and/or data associated with that particular NIC.

While distributing work across cores based on data of VIPs or NICs may have a level of independency, in some embodiments, this may lead to unbalanced use of cores as illustrated by the varying loads 515 of FIG. 5A.

In some embodiments, load, work or network traffic can be distributed among cores 505 based on any type and form of data flow. In another of these approaches, the work may be divided or distributed among cores based on data flows. For example, network traffic between a client and a server traversing the appliance may be distributed to and processed by one core of the plurality of cores. In some cases, the core initially establishing the session or connection may be the core for which network traffic for that session or connection is distributed. In some embodiments, the data flow is based on any unit or portion of network traffic, such as a transaction, a request/response communication or traffic originating from an application on a client. In this manner and in some embodiments, data flows between clients and servers traversing the appliance 200' may be distributed in a more balanced manner than the other approaches.

In flow-based data parallelism 520, distribution of data is related to any type of flow of data, such as request/response pairings, transactions, sessions, connections or application communications. For example, network traffic between a client and a server traversing the appliance may be distributed to and processed by one core of the plurality of cores. In some cases, the core initially establishing the session or connection may be the core for which network traffic for that session or connection is distributed. The distribution of data flow may be such that each core 505 carries a substantially equal or relatively evenly distributed amount of load, data or network traffic.

In some embodiments, the data flow is based on any unit or portion of network traffic, such as a transaction, a request/response communication or traffic originating from an application on a client. In this manner and in some embodiments, data flows between clients and servers traversing the appliance 200' may be distributed in a more balanced manner than the other approached. In one embodiment, data flow can be distributed based on a transaction or a series of transactions. This transaction, in some embodiments, can be between a client and a server and can be characterized by an IP address or other packet identifier. For example, Core 1 505A can be dedicated to transactions between a particular client and a particular server, therefore the load 536A on Core 1 505A may be comprised of the network traffic associated with the transactions between the particular client and server. Allocating the network traffic to Core 1 505A can be accomplished by routing all data packets originating from either the particular client or server to Core 1 505A.

While work or load can be distributed to the cores based in part on transactions, in other embodiments load or work can be allocated on a per packet basis. In these embodiments, the appliance 200 can intercept data packets and allocate them to a core 505 having the least amount of load. For example, the appliance 200 could allocate a first incoming data packet to Core 1 505A because the load 536A on Core 1 is less than the load 536B-N on the rest of the cores 505B-N. Once the first data packet is allocated to Core 1 505A, the amount of load 536A on Core 1 505A is increased proportional to the amount of processing resources needed to process the first data packet. When the appliance 200 intercepts a second data packet, the appliance 200 will allocate the load to Core 4 505D because Core 4 505D has the second least amount of load. Allocating data packets to the core with the least amount of load can, in some embodiments, ensure that the load 536A-N distributed to each core 505 remains substantially equal.

In other embodiments, load can be allocated on a per unit basis where a section of network traffic is allocated to a particular core 505. The above-mentioned example illustrates load balancing on a per/packet basis. In other embodiments, load can be allocated based on a number of packets such that every 10, 100 or 1000 packets are allocated to the core 505 having the least amount of load. The number of packets allocated to a core 505 can be a number determined by an application, user or administrator and can be any number greater than zero. In still other embodiments, load can be allocated based on a time metric such that packets are distributed to a particular core 505 for a predetermined amount of time. In these embodiments, packets can be distributed to a particular core 505 for five milliseconds or for any period of time determined by a user, program, system, administrator or otherwise. After the predetermined time period elapses, data packets are transmitted to a different core 505 for the predetermined period of time.

Flow-based data parallelism methods for distributing work, load or network traffic among the one or more cores 505 can comprise any combination of the above-mentioned embodiments. These methods can be carried out by any part of the appliance 200, by an application or set of executable instructions executing on one of the cores 505, such as the packet engine, or by any application, program or agent executing on a computing device in communication with the appliance 200.

The functional and data parallelism computing schemes illustrated in FIG. 5A can be combined in any manner to generate a hybrid parallelism or distributed processing scheme that encompasses function parallelism 500, data parallelism 540, flow-based data parallelism 520 or any portions thereof. In some cases, the multi-core system may use any type and form of load balancing schemes to distribute load among the one or more cores 505. The load balancing scheme may be used in any combination with any of the functional and data parallelism schemes or combinations thereof.

Illustrated in FIG. 5B is an embodiment of a multi-core system 545, which may be any type and form of one or more systems, appliances, devices or components. This system 545, in some embodiments, can be included within an appliance 200 having one or more processing cores 505A-N. The system 545 can further include one or more packet engines (PE) or packet processing engines (PPE) 548A-N communicating with a memory bus 556. The memory bus may be used to communicate with the one or more processing cores 505A-N. Also included within the system 545 can be one or more network interface cards (NIC) 552 and a flow distributor 550 which can further communicate with the one or more processing cores 505A-N. The flow distributor 550 can comprise a Receive Side Scaler (RSS) or Receive Side Scaling (RSS) module 560.

Further referring to FIG. 5B, and in more detail, in one embodiment the packet engine(s) 548A-N can comprise any portion of the appliance 200 described herein, such as any portion of the appliance described in FIGS. 2A and 2B. The packet engine(s) 548A-N can, in some embodiments, comprise any of the following elements: the packet engine 240, a network stack 267; a cache manager 232; a policy engine 236; a compression engine 238; an encryption engine 234; a GUI 210; a CLI 212; shell services 214; monitoring programs 216; and any other software or hardware element able to receive data packets from one of either the memory bus 556 or the one of more cores 505A-N. In some embodiments, the packet engine(s) 548A-N can comprise one or more vServers 275A-N, or any portion thereof. In other embodiments, the packet engine(s) 548A-N can provide any combination of the following functionalities: SSL VPN 280; Intranet UP 282; switching 284; DNS 286; packet acceleration 288; App FW 280; monitoring such as the monitoring provided by a monitoring agent 197; functionalities associated with functioning as a TCP stack; load balancing; SSL offloading and processing; content switching; policy evaluation; caching; compression; encoding; decompression; decoding; application firewall functionalities; XML processing and acceleration; and SSL VPN connectivity.

The packet engine(s) 548A-N can, in some embodiments, be associated with a particular server, user, client or network. When a packet engine 548 becomes associated with a particular entity, that packet engine 548 can process data packets associated with that entity. For example, should a packet engine 548 be associated with a first user, that packet engine 548 will process and operate on packets generated by the first user, or packets having a destination address associated with the first user. Similarly, the packet engine 548 may choose not to be associated with a particular entity such that the packet engine 548 can process and otherwise operate on any data packets not generated by that entity or destined for that entity.

In some instances, the packet engine(s) 548A-N can be configured to carry out the any of the functional and/or data parallelism schemes illustrated in FIG. 5A. In these instances, the packet engine(s) 548A-N can distribute functions or data among the processing cores 505A-N so that the distribution is according to the parallelism or distribution scheme. In some embodiments, a single packet engine(s) 548A-N carries out a load balancing scheme, while in other embodiments one or more packet engine(s) 548A-N carry out a load balancing scheme. Each core 505A-N, in one embodiment, can be associated with a particular packet engine 505 such that load balancing can be carried out by the packet engine 505. Load balancing may in this embodiment, require that each packet engine 505 associated with a core 505 communicate with the other packet engines 505 associated with cores 505 so that the packet engines 505 can collectively determine where to distribute load. One embodiment of this process can include an arbiter that receives votes from each packet engine 505 for load. The arbiter can distribute load to each packet engine 505 based in part on the age of the engine's vote and in some cases a priority value associated with the current amount of load on an engine's associated core 505.

Any of the packet engines running on the cores may run in user mode, kernel or any combination thereof. In some embodiments, the packet engine operates as an application or program running is user or application space. In these embodiments, the packet engine may use any type and form of interface to access any functionality provided by the kernel. In some embodiments, the packet engine operates in kernel mode or as part of the kernel. In some embodiments, a first portion of the packet engine operates in user mode while a second portion of the packet engine operates in kernel mode. In some embodiments, a first packet engine on a first core executes in kernel mode while a second packet engine on a second core executes in user mode. In some embodiments, the packet engine or any portions thereof operates on or in conjunction with the NIC or any drivers thereof.

In some embodiments the memory bus 556 can be any type and form of memory or computer bus. While a single memory bus 556 is depicted in FIG. 5B, the system 545 can comprise any number of memory buses 556. In one embodiment, each packet engine 548 can be associated with one or more individual memory buses 556.

The NIC 552 can in some embodiments be any of the network interface cards or mechanisms described herein. The NIC 552 can have any number of ports. The NIC can be designed and constructed to connect to any type and form of network 104. While a single NIC 552 is illustrated, the system 545 can comprise any number of NICs 552. In some embodiments, each core 505A-N can be associated with one or more single NICs 552. Thus, each core 505 can be associated with a single NIC 552 dedicated to a particular core 505. The cores 505A-N can comprise any of the processors described herein. Further, the cores 505A-N can be configured according to any of the core 505 configurations described herein. Still further, the cores 505A-N can have any of the core 505 functionalities described herein. While FIG. 5B illustrates seven cores 505A-G, any number of cores 505 can be included within the system 545. In particular, the system 545 can comprise "N" cores, where "N" is a whole number greater than zero.

A core may have or use memory that is allocated or assigned for use to that core. The memory may be considered private or local memory of that core and only accessible by that core. A core may have or use memory that is shared or assigned to multiple cores. The memory may be considered public or shared memory that is accessible by more than one core. A core may use any combination of private and public memory. With separate address spaces for each core, some level of coordination is eliminated from the case of using the same address space. With a separate address space, a core can perform work on information and data in the core's own address space without worrying about conflicts with other cores. Each packet engine may have a separate memory pool for TCP and/or SSL connections.

Further referring to FIG. 5B, any of the functionality and/or embodiments of the cores 505 described above in connection with FIG. 5A can be deployed in any embodiment of the virtualized environment described above in connection with FIGS. 4A and 4B. Instead of the functionality of the cores 505 being deployed in the form of a physical processor 505, such functionality may be deployed in a virtualized environment 400 on any computing device 100, such as a client 102, server 106 or appliance 200. In other embodiments, instead of the functionality of the cores 505 being deployed in the form of an appliance or a single device, the functionality may be deployed across multiple devices in any arrangement. For example, one device may comprise two or more cores and another device may comprise two or more cores. For example, a multi-core system may include a cluster of computing devices, a server farm or network of computing devices. In some embodiments, instead of the functionality of the cores 505 being deployed in the form of cores, the functionality may be deployed on a plurality of processors, such as a plurality of single core processors.

In one embodiment, the cores 505 may be any type and form of processor. In some embodiments, a core can function substantially similar to any processor or central processing unit described herein. In some embodiment, the cores 505 may comprise any portion of any processor described herein. While FIG. 5A illustrates seven cores, there can exist any "N" number of cores within an appliance 200, where "N" is any whole number greater than one. In some embodiments, the cores 505 can be installed within a common appliance 200, while in other embodiments the cores 505 can be installed within one or more appliance(s) 200 communicatively connected to one another. The cores 505 can in some embodiments comprise graphics processing software, while in other embodiments the cores 505 provide general processing capabilities. The cores 505 can be installed physically near each other and/or can be communicatively connected to each other. The cores may be connected by any type and form of bus or subsystem physically and/or communicatively coupled to the cores for transferring data between to, from and/or between the cores.

While each core 505 can comprise software for communicating with other cores, in some embodiments a core manager (Not Shown) can facilitate communication between each core 505. In some embodiments, the kernel may provide core management. The cores may interface or communicate with each other using a variety of interface mechanisms. In some embodiments, core to core messaging may be used to communicate between cores, such as a first core sending a message or data to a second core via a bus or subsystem connecting the cores. In some embodiments, cores may communicate via any type and form of shared memory interface. In one embodiment, there may be one or more memory locations shared among all the cores. In some embodiments, each core may have separate memory locations shared with each other core. For example, a first core may have a first shared memory with a second core and a second share memory with a third core. In some embodiments, cores may communicate via any type of programming or API, such as function calls via the kernel. In some embodiments, the operating system may recognize and support multiple core devices and provide interfaces and API for inter-core communications.

The flow distributor 550 can be any application, program, library, script, task, service, process or any type and form of executable instructions executing on any type and form of hardware. In some embodiments, the flow distributor 550 may any design and construction of circuitry to perform any of the operations and functions described herein. In some embodiments, the flow distributor distribute, forwards, routes, controls and/ors manage the distribution of data packets among the cores 505 and/or packet engine or VIPs running on the cores. The flow distributor 550, in some embodiments, can be referred to as an interface master. In one embodiment, the flow distributor 550 comprises a set of executable instructions executing on a core or processor of the appliance 200. In another embodiment, the flow distributor 550 comprises a set of executable instructions executing on a computing machine in communication with the appliance 200. In some embodiments, the flow distributor 550 comprises a set of executable instructions executing on a NIC, such as firmware. In still other embodiments, the flow distributor 550 comprises any combination of software and hardware to distribute data packets among cores or processors. In one embodiment, the flow distributor 550 executes on at least one of the cores 505A-N, while in other embodiments a separate flow distributor 550 assigned to each core 505A-N executes on an associated core 505A-N. The flow distributor may use any type and form of statistical or probabilistic algorithms or decision making to balance the flows across the cores. The hardware of the appliance, such as a NIC, or the kernel may be designed and constructed to support sequential operations across the NICs and/or cores.

In embodiments where the system 545 comprises one or more flow distributors 550, each flow distributor 550 can be associated with a processor 505 or a packet engine 548. The flow distributors 550 can comprise an interface mechanism that allows each flow distributor 550 to communicate with the other flow distributors 550 executing within the system 545. In one instance, the one or more flow distributors 550 can determine how to balance load by communicating with each other. This process can operate substantially similarly to the process described above for submitting votes to an arbiter which then determines which flow distributor 550 should receive the load. In other embodiments, a first flow distributor 550' can identify the load on an associated core and determine whether to forward a first data packet to the associated core based on any of the following criteria: the load on the associated core is above a predetermined threshold; the load on the associated core is below a predetermined threshold; the load on the associated core is less than the load on the other cores; or any other metric that can be used to determine where to forward data packets based in part on the amount of load on a processor.

The flow distributor 550 can distribute network traffic among the cores 505 according to a distribution, computing or load balancing scheme such as those described herein. In one embodiment, the flow distributor can distribute network traffic or; pad according to any one of a functional parallelism distribution scheme 550, a data parallelism load distribution scheme 540, a flow-based data parallelism distribution scheme 520, or any combination of these distribution scheme or any load balancing scheme for distributing load among multiple processors. The flow distributor 550 can therefore act as a load distributor by taking in data packets and distributing them across the processors according to an operative load balancing or distribution scheme. In one embodiment, the flow distributor 550 can comprise one or more operations, functions or logic to determine how to distribute packers, work or load accordingly. In still other embodiments, the flow distributor 550 can comprise one or more sub operations, functions or logic that can identify a source address and a destination address associated with a data packet, and distribute packets accordingly.

In some embodiments, the flow distributor 550 can comprise a receive-side scaling (RSS) network driver, module 560 or any type and form of executable instructions which distribute data packets among the one or more cores 505. The RSS module 560 can comprise any combination of hardware and software, In some embodiments, the RSS module 560 works in conjunction with the flow distributor 550 to distribute data packets across the cores 505A-N or among multiple processors in a multi-processor network. The RSS module 560 can execute within the NIC 552 in some embodiments, and in other embodiments can execute on any one of the cores 505.

In some embodiments, the RSS module 560 uses the MICROSOFT receive-side-scaling (RSS) scheme. In one embodiment, RSS is a Microsoft Scalable Networking initiative technology that enables receive processing to be balanced across multiple processors in the system while maintaining in-order delivery of the data. The RSS may use any type and form of hashing scheme to determine a core or processor for processing a network packet.

The RSS module 560 can apply any type and form hash function such as the Toeplitz hash function. The hash function may be applied to the hash type or any the sequence of values. The hash function may be a secure hash of any security level or is otherwise cryptographically secure. The has function may use a hash key. The size of the key is dependent upon the hash function. For the Toeplitz hash, the size may be 40 bytes for IPv6 and 16 bytes for IPv4.

The hash function may be designed and constructed based on any one or more criteria or design goals. In some embodiments, a hash function may be used that provides an even distribution of hash result for different hash inputs and different hash types, including TCP/IPv4, TCP/IPv6, IPv4, and IPv6 headers. In some embodiments, a hash function may be used that provides a hash result that is evenly distributed when a small number of buckets are present (for example, two or four). In some embodiments, hash function may be used that provides a hash result that is randomly distributed when a large number of buckets were present (for example, 64 buckets). In some embodiments, the hash function is determined based on a level of computational or resource usage. In some embodiments, the hash function is determined based on ease or difficulty of implementing the hash in hardware. In some embodiments, the hash function is determined bases on the ease or difficulty of a malicious remote host to send packets that would all hash to the same bucket.

The RSS may generate hashes from any type and form of input, such as a sequence of values. This sequence of values can include any portion of the network packet, such as any header, field or payload of network packet, or portions thereof. In some embodiments, the input to the hash may be referred to as a hash type and include any tuples of information associated with a network packet or data flow, such as any of the following: a four tuple comprising at least two IP addresses and two ports; a four tuple comprising any four sets of values; a six tuple; a two tuple; and/or any other sequence of numbers or values. The following are example of hash types that may be used by RSS:

- 4-tuple of source TCP Port, source IP version 4 (IPv4) address, destination TCP Port, and destination IPv4 address. This is the only required hash type to support.
- 4-tuple of source TCP Port, source IP version 6 (IPv6) address, destination TCP Port, and destination IPv6 address.
- 2-tuple of source IPv4 address, and destination IPv4 address.
- 2-tuple of source IPv6 address, and destination IPv6 address.
- 2-tuple of source IPv6 address, and destination IPv6 address, including support for parsing IPv6 extension headers.

The hash result or any portion thereof may used to identify a core or entity, such as a packet engine or VIP, for distributing a network packet. In some embodiments, one or more hash bits or mask are applied to the hash result. The hash bit or mask may be any number of bits or bytes. A NIC may support any number of bits, such as seven bits. The network stack may set the actual number of bits to be used during initialization. The number will be between 1 and 7, inclusive.

The hash result may be used to identify the core or entity via any type and form of table, such as a bucket table or indirection table. In some embodiments, the number of hash-result bits are used to index into the table. The range of the hash mask may effectively define the size of the indirection table. Any portion of the hash result or the hast result itself may be used to index the indirection table. The values in the table may identify any of the cores or processor, such as by a core or processor identifier. In some embodiments, all of the cores of the multi-core system are identified in the table. In other embodiments, a port of the cores of the multi-core system are identified in the table. The indirection table may comprise any number of buckets for example 2 to 128 buckets that may be indexed by a hash mask. Each bucket may comprise a range of index values that identify a core or processor. In some embodiments, the flow controller and/or RSS module may rebalance the network rebalance the network load by changing the indirection table.

In some embodiments, the multi-core system 575 does not include a RSS driver or RSS module 560. In some of these embodiments, a software steering module (Not Shown) or a software embodiment of the RSS module within the system can operate in conjunction with or as part of the flow distributor 550 to steer packets to cores 505 within the multi-core system 575.

The flow distributor 550, in some embodiments, executes within any module or program on the appliance 200, on any one of the cores 505 and on any one of the devices or components included within the multi-core system 575. In some embodiments, the flow distributor 550' can execute on the first core 505A, while in other embodiments the flow distributor 550" can execute on the NIC 552. In still other embodiments, an instance of the flow distributor 550' can execute on each core 505 included in the multi-core system 575. In this embodiment, each instance of the flow distributor 550' can communicate with other instances of the flow distributor 550' to forward packets back and forth across the cores 505. There exist situations where a response to a request packet may not be processed by the same core, i.e. the first core processes the request while the second core processes the response. In these situations, the instances of the flow distributor 550' can intercept the packet and forward it to the desired or correct core 505, i.e. a flow distributor instance 550' can forward the response to the first core. Multiple instances of the flow distributor 550' can execute on any number of cores 505 and any combination of cores 505.

The flow distributor may operate responsive to any one or more rules or policies. The rules may identify a core or packet processing engine to receive a network packet, data or data flow. The rules may identify any type and form of tuple information related to a network packet, such as a 4-tuple of source and destination IP address and source and destination ports. Based on a received packet matching the tuple specified by the rule, the flow distributor may forward the packet to a core or packet engine. In some embodiments, the packet is forwarded to a core via shared memory and/or core to core messaging.

Although FIG. 5B illustrates the flow distributor 550 as executing within the multi-core system 575, in some embodiments the flow distributor 550 can execute on a computing device or appliance remotely located from the multi-core system 575. In such an embodiment, the flow distributor 550 can communicate with the multi-core system 575 to take in data packets and distribute the packets across the one or more cores 505. The flow distributor 550 can, in one embodiment, receive data packets destined for the appliance 200, apply a distribution scheme to the received data packets and distribute the data packets to the one or more cores 505 of the multi-core system 575. In one embodiment, the flow distributor 550 can be included in a router or other appliance such that the router can target particular cores 505 by altering meta data associated with each packet so that each packet is targeted towards a sub-node of the multi-core system 575. In such an embodiment, CISCO's vn-tag mechanism can be used to alter or tag each packet with the appropriate meta data.

Figure 5C:
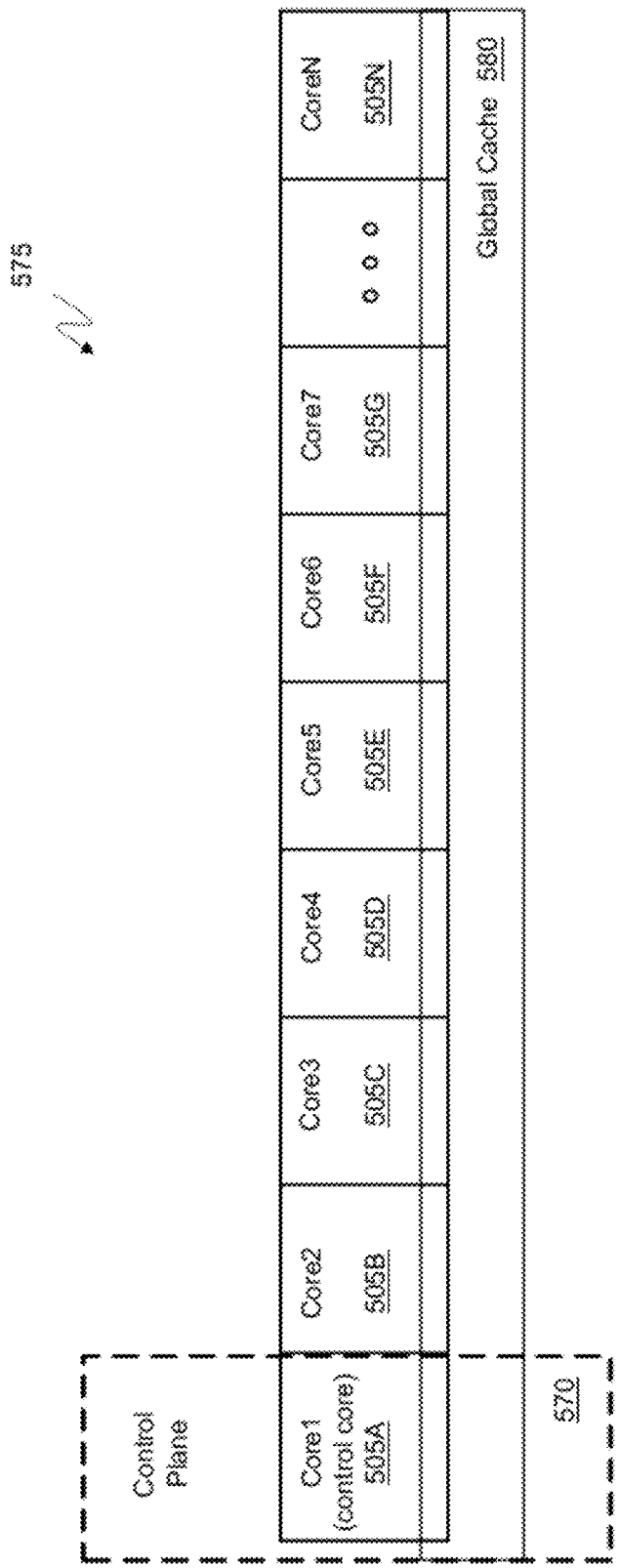
FIG. 5C is a block diagram of an embodiment of an aspect of a multi-core network appliance.

Illustrated in FIG. 5C is an embodiment of a multi-core system 575 comprising one or more processing cores 505A-N. In brief overview, one of the cores 505 can be designated as a control core 505A and can be used as a control plane 570 for the other cores 505. The other cores may be secondary cores which operate in a data plane while the control core provides the control plane. The cores 505A-N may share a global cache 580. While the control core provides a control plane, the other cores in the multi-core system form or provide a data plane. These cores perform data processing functionality on network traffic while the control provides initialization, configuration and control of the multi-core system.

Further referring to FIG. 5C, and in more detail, the cores 505A-N as well as the control core 505A can be any processor described herein. Furthermore, the cores 505A-N and the control core 505A can be any processor able to function within the system 575 described in FIG. 5C. Still further, the cores 505A-N and the control core 505A can be any core or group of cores described herein. The control core may be a different type of core or processor than the other cores. In some embodiments, the control may operate a different packet engine or have a packet engine configured differently than the packet engines of the other cores.

Any portion of the memory of each of the cores may be allocated to or used for a global cache that is shared by the cores. In brief overview, a predetermined percentage or predetermined amount of each of the memory of each core may be used for the global cache. For example, 50% of each memory of each code may be dedicated or allocated to the shared global cache. That is, in the illustrated embodiment, 2 GB of each core excluding the control plane core or core 1 may be used to form a 28 GB shared global cache. The configuration of the control plane such as via the configuration services may determine the amount of memory used for the shared global cache. In some embodiments, each core may provide a different amount of memory for use by the global cache. In other embodiments, any one core may not provide any memory or use the global cache. In some embodiments, any of the cores may also have a local cache in memory not allocated to the global shared memory. Each of the cores may store any portion of network traffic to the global shared cache. Each of the cores may check the cache for any content to use in a request or response. Any of the cores may obtain content from the global shared cache to use in a data flow, request or response.

The global cache 580 can be any type and form of memory or storage element, such as any memory or storage element described herein. In some embodiments, the cores 505 may have access to a predetermined amount of memory (i.e. 32 GB or any other memory amount commensurate with the system 575.) The global cache 580 can be allocated from that predetermined amount of memory while the rest of the available memory can be allocated among the cores 505. In other embodiments, each core 505 can have a predetermined amount of memory. The global cache 580 can comprise an amount of the memory allocated to each core 505. This memory amount can be measured in bytes, or can be measured as a percentage of the memory allocated to each core 505. Thus, the global cache 580 can comprise 1 GB of memory from the memory associated with each core 505, or can comprise 20 percent or one-half of the memory associated with each core 505. In some embodiments, only a portion of the cores 505 provide memory to the global cache 580, while in other embodiments the global cache 580 can comprise memory not allocated to the cores 505.

Each core 505 can use the global cache 580 to store network traffic or cache data. In some embodiments, the packet engines of the core use the global cache to cache and use data stored by the plurality of packet engines. For example, the cache manager of FIG. 2A and cache functionality of FIG. 2B may use the global cache to share data for acceleration. For example, each of the packet engines may store responses, such as HTML data, to the global cache. Any of the cache managers operating on a core may access the global cache to server caches responses to client requests.

In some embodiments, the cores 505 can use the global cache 580 to store a port allocation table which can be used to determine data flow based in part on ports. In other embodiments, the cores 505 can use the global cache 580 to store an address lookup table or any other table or list that can be used by the flow distributor to determine where to direct incoming and outgoing data packets. The cores 505 can, in some embodiments read from and write to cache 580, while in other embodiments the cores 505 can only read from or write to cache 580. The cores may use the global cache to perform core to core communications.

The global cache 580 may be sectioned into individual memory sections where each section can be dedicated to a particular core 505. In one embodiment, the control core 505A can receive a greater amount of available cache, while the other cores 505 can receiving varying amounts or access to the global cache 580.

In some embodiments, the system 575 can comprise a control core 505A. While FIG. 5C illustrates core 1 505A as the control core, the control core can be any core within the appliance 200 or multi-core system. Further, while only a single control core is depicted, the system 575 can comprise one or more control cores each having a level of control over the system. In some embodiments, one or more control cores can each control a particular aspect of the system 575. For example, one core can control deciding which distribution scheme to use, while another core can determine the size of the global cache 580.

The control plane of the multi-core system may be the designation and configuration of a core as the dedicated management core or as a master core. This control plane core may provide control, management and coordination of operation and functionality the plurality of cores in the multi-core system. This control plane core may provide control, management and coordination of allocation and use of memory of the system among the plurality of cores in the multi-core system, including initialization and configuration of the same. In some embodiments, the control plane includes the flow distributor for controlling the assignment of data flows to cores and the distribution of network packets to cores based on data flows. In some embodiments, the control plane core runs a packet engine and in other embodiments, the control plane core is dedicated to management and control of the other cores of the system.

The control core 505A can exercise a level of control over the other cores 505 such as determining how much memory should be allocated to each core 505 or determining which core 505 should be assigned to handle a particular function or hardware/software entity. The control core 505A, in some embodiments, can exercise control over those cores 505 within the control plan 570. Thus, there can exist processors outside of the control plane 570 which are not controlled by the control core 505A. Determining the boundaries of the control plane 570 can include maintaining, by the control core 505A or agent executing within the system 575, a list of those cores 505 controlled by the control core 505A. The control core 505A can control any of the following: initialization of a core; determining when a core is unavailable; re-distributing load to other cores 505 when one core fails; determining which distribution scheme to implement; determining which core should receive network traffic; determining how much cache should be allocated to each core; determining whether to assign a particular function or element to a particular core; determining whether to permit cores to communicate with one another; determining the size of the global cache 580; and any other determination of a function, configuration or operation of the cores within the system 575.

Figure 6A:
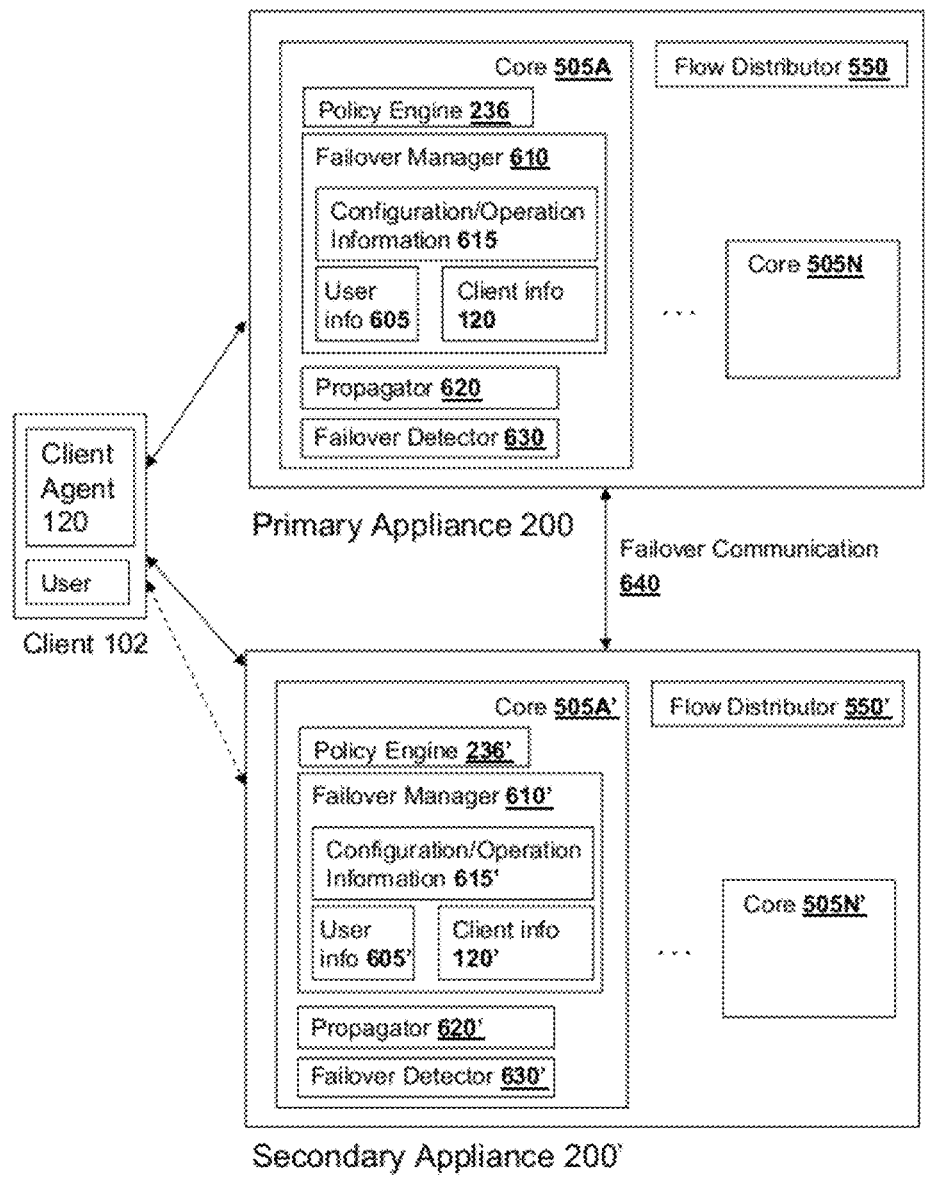
FIG. 6A is a block diagram of an embodiment of a system for maintaining operation of a multi-core network appliance upon failover.

F. Systems and Methods for Maintaining Operation of a Multi-Core Network Appliance Upon Failover Referring now to FIG. 6A, an embodiment of a system for maintaining operation of a multi-core appliance 200 upon failover is illustrated. In brief overview, FIG. 6A depicts a client 102 comprising a client info 120 operated by a user in communication with a primary network appliance 200. The primary appliance 200 comprises a plurality of cores 505A-N and a flow distributor 550. Core 505A of the primary appliance 200 further includes a policy engine 236, a failover manager 610, a propagator 620 and a failover detector 630.

The failover manager 610 includes a configuration/operation information 615, a user info 605 and a client info 120. FIG. 6A further illustrates a secondary appliance 200' in communication with the primary appliance 200 via failover communication 640. Similar to the primary appliance 200, the secondary appliance 200' also comprises a plurality of cores 505A-N' and a flow distributor 550'. The core 505A' of the secondary appliance 200' comprises a policy engine 236', a propagator 620', failover detector 650' and a failover manager 610' that further comprises configuration/operation information 615', user info 605' and a client info 120'.

User on the client may be any user or a person communicating via client 102. In some embodiments, user is a person. User may be a user of the client 102, server 106 or the appliance 200. User may include any number of users using the resources of the server 106, client 102 or the appliance 200. In further embodiments, user is an authenticated user. User may be identified by the client via a user name and password. In some embodiments, User is identified and authenticated by the client 102, server 106 or the primary or secondary appliances 200 or 200'. In further embodiments, user has settings for applications used by the user. In still further embodiments, user is granted access to particular applications, files or services provided by the client 102, server 106 or the appliances 200 or 200'. In some embodiments, client info 120 authenticates and identifies the user to enable particular settings for the communications of the user. In still further embodiments, user communicates via appliances 200 or 200' using any number of connections or sessions. User may use any type and form of settings, configurations, customizations for communication via the appliances 200 or 200'.

Failover manager 610 may be any hardware, software or any combination of hardware or software controlling, managing, configuring and executing failover between the primary appliance 200 and the secondary appliance 200'. A failover manager 610 may comprise any program, executable file, script, daemon, or other set of executable instructions that controls, manages, configures or executes failover between the primary appliance 200 and the secondary appliance 200'. In some embodiments, failover manager 610 of a primary appliance 200 communicates with another failover manager 610, such as a failover manager 610' of the secondary appliance 200'. The communication between the failover managers 610 may include exchange of information such as, settings, configurations, states of operations performed on the traffic traversing the appliances 200, statuses of operation by the appliances 200, states of performance, or operational characteristics of the appliances 200.

Failover manager 610 may communicate with other appliances 200 randomly or on a predetermined frequency, such as every 1 micro second, 1 milli second or every 1 second. In some embodiments, failover manager 610 communicates with other appliances 200 upon occurrence of events, such as detection of failure of a core 505, failure of a component of an appliance 200, power outage or power interruption, software or hardware error, traffic overload, detection of a surge of network traffic or any other event which may trigger a failure of an appliance 200 or a failover. In some embodiments, a failover manager 610 uses a request/reply messaging mechanism or protocol with the server or with another appliance 200. In other embodiments, a failover manager 610 communicates with other appliances 200 or with other failover managers 610 using a custom communication settings, such as a dedicated port or a customized communication protocol. In some embodiments, a single failover manager 610 may communicate with a plurality of other failover managers 610. The failover manager 610 of a primary appliance 200 may send information, such as operational or configuration information to any number of failover managers 610 of any number of appliances 200 or 200'. A failover manager 610 may monitor an appliance 200, vServer, network service 270, client, server or any other network resource. A failover manager 610 may be configured to specifically monitor, communicate with, receive updates from or send updates to any appliance 200 or 200', any server or any client.

Failover manager 610 may include any type and form of function, tool, component or information to manage, control, configure and implement failover between the appliances 200. In some embodiments, failover manager includes information about users that send communication via appliances 200. The user information may include any user specific information for performing functions on the transmissions or the network traffic associated with the user. In some embodiments, failover manager 610 includes configuration information for configuring other appliances 200 to maintain operations on the network traffic upon failover. In some embodiments, configuration includes configurations or instructions for cores 505 for the appliances such as the primary appliances 200 or the secondary appliances 200'. In further embodiments, configuration may include settings for packet processing engines (PPEs), such as for example packet engines 548, operating on the cores 505. Failover manager 610 may further comprise client info 120. The client info 120 may be an agent, an application, a link or any information regarding the client info 120 operating on the client. Failover manager 610 may further include a flow distributor 550, a propagator 620 and a failover detector 630.

Configuration/operation information 615 may include any hardware, software or any combination of hardware and software that comprises configuration or operation settings, parameters, inputs, values or instructions for operating or managing operations of an appliance 200. Configuration/operation information 615 may include objects, data structures, array structures that include instructions or settings for configuring cores 505 or processing functions operating on the cores 505. In some embodiments, configuration/operation information 615 includes configuration settings, data points, instructions, variables or data that configures or sets an appliance 200' or a portion of an appliance 200' to perform a specific set of tasks or operate in a specific manner. In further embodiments, configuration/operation information 615 includes configuration settings, data points, instructions or data to preset an operation of a secondary appliance 200' to a same or a similar operation that was maintained by the primary appliance 200. A configuration/operation information 615 may include settings or configurations to instruct PPEs operating on the cores 505 of the secondary appliance 200' to maintain operation as maintained by the primary appliance 200. In some embodiments, configuration/operation information 615 includes states of operation of one or more cores 505 of the primary appliance 200. In further embodiments, configuration/operation information 615 includes status or states of connections or sessions maintained via the primary appliance 200. In still further embodiments, configuration/operation information 615 includes information about a status of one or more Secure Socket Layer (SSL) cards of the primary appliance 200.

In some embodiments, configuration/operation information 615 includes information about an administrative state of each of the PPEs or PEs 548 of the primary appliance. The administrative state may be any state such as for example: enabled, disabled, hamon on or hamon off. In some embodiments, configuration/operation information 615 includes information about an operational state of each of the PPEs of the primary appliance 200, such as for example state: up, or state: down. In further embodiments, configuration/operation information 615 includes configuration or settings of a PPE for a specific core, such as core 505A or 505N.

The configuration/operation information 615 may include instructions to propagate the configuration to each of a plurality of PPEs operating on the cores 505. In some embodiments, configuration/operation information 615 includes user specific information for handling or operating on transmissions related to a specific user, such as for example the user. The user specific information may include specific protocol settings, compression settings, rules or rule engines, data handling settings or any other type of user specific settings or configurations. Similarly, the configuration/operation information 615 may include settings or configurations for client 102 specific transmission handling or operation, as well as any other server 106 specific configurations. The configuration/operation information 615 may include any type and form or information, instructions, settings, operation status or states or configurations to perform any functionality performed by a primary appliance 200.

User info 605 may be any user specific information used by the appliance to perform user specific operation. User info 605 may include any settings, configurations or instructions for performing operations on any user specific sessions or connections. In some embodiments, user info 605 includes configuration or instructions to perform operations performed by the primary appliance 200 on the network traffic associated with the user. In some embodiments, user info 605 includes instructions to handle requests from the user or responses to the user traversing the appliance 200 or 200'. In further embodiments, user info 605 includes encryption or decryption keys for encrypting or decrypting network traffic going from, or to, the user. In still further embodiments, user info 605 includes user history. In yet further embodiments, user info 605 includes information about access granted or not granted to the user. The access information may define which applications, services or resources the user may or may not access. User info 605 may include user specific rules for managing or controlling user specific network traffic. User info 605 may include any type and form of information, data or instructions relating any user communicating with any primary appliance 200 or secondary appliance 200' via a client 102.

Client info 120 may include any information about configurations or settings of client specific connections, sessions or any settings customized for a specific client 102. In some embodiments, client info 120 includes a script, program, function or an agent of an application operating on a client 102 or a server 106 and traversing the appliance 200 or 200'. In some embodiments, client info 120 comprises a portion of a script, library, function or a program associated with the client info 120 operating on the client 102. Client info 120 may include any information about client 102. In some embodiments, client info 120 includes information about programs, functions, applications, services or functionalities used, accessed or requested by the client 102. In further embodiments, client info 120 includes any information about any service or application accessed or used by the client 102. Client info 120 may include client 102 specific configuration or operation information, such as client 102 settings, client 102 rules or client 102 operation instructions used by the appliance 200 to operate on client 102 network traffic. In some embodiments, client info 120 of a specific client 102 operating on the appliance 200 comprises configurations, settings or instructions for performing client 102 specific operations by the appliance 200. The client 102 specific operations may include, but not be limited to, client 102 specific access granting, client 102 specific security protocol implementation, client 102 specific encryption/decryption, client 102 specific compression or client 102 specific session or connection settings.

Propagator 620 may include any hardware, software or any combination of hardware or software for propagating functions and instructions to components of appliances 200 or 200' upon failover. Propagator 620 may propagate, forward or transmit any information, such as for example configuration/operation information 615, user info 605 or any information relating to client info 120. In some embodiments, propagator 620 comprises hardware components, software operating on hardware devices, functions, programs, scripts, executable, rules, logic or applications. Propagator 620 may comprise functionality for forwarding or propagating instructions, operation or configuration settings or data values used for maintaining operation by a secondary appliance 200' upon failover. In further embodiments, propagator 620 comprises functionality for assisting with execution of functions that assist with maintaining operations performed by appliances 200 or 200'.

Propagator 620 may transmit information between appliances 200 and 200' upon failover or upon detection that a primary appliance 200 is not available. In some embodiments, propagator 620 transmits information between primary appliance 200 and secondary appliance 200' when the primary appliance 200 is available. Propagator 620 may update information between the cores 505' of the secondary appliance 200' and the cores 505 of the primary appliance 200. The information, such as the configuration/operation information 615, may be forwarded and regularly updated by the propagator 620 among PPEs operating on cores 505' of the secondary appliance 200' as well as among PPEs operating on cores 505 of the primary appliance 200. Propagator 620 may propagate information, such as User info 605 between appliances 200 and 200' as well as between different cores 505 of the primary or secondary appliances. The information propagated to the cores 505 or cores 505' by the propagator 620 may include any information, setting, status, data or instruction used by the cores 505 or any component operating on the cores 505 to handle or provide service to network traffic traversing the primary or the secondary appliance 200 and 200'. In some embodiments, the information may include user specific, client specific, server specific, application specific, session specific or connection specific settings or operating instructions to be applied by the primary appliance 200 or secondary appliance 200'. Propagator 620 may regularly and periodically forward or propagate information between appliances 200 and 200'. In some embodiments, propagator 620 updates, forwards or propagates information between appliances 200 or 200' or between cores 505 or 505' responsive to changes in the operation settings or configuration or responsive to some events that trigger the new settings, information or changes that need to be updated.

Failover detector 630 may be any hardware, software or any combination of hardware and software for detecting failover of unavailability of an appliance, such as a primary appliance 200. A failover detector 630 may comprise program, script, daemon, or other set of executable instructions that detects or monitors performance or operational characteristics of an appliance 200. In some embodiments, failover detector 630 of the primary appliance 200 communicates with the secondary appliance 200'. In further embodiments, failover detector 630 of the secondary appliance 200' communicates with the primary appliance 200. The communication may comprise any transmissions, such as ping or request/ response transmissions that may be used to detect failure of one or more cores 505 of the primary appliance 200. The communication may also comprise any information relating operation or configuration of the primary or secondary appliances 200 or 200', such as for example configuration/operation information 615. In some embodiments, failover detector 630 of a secondary appliance 200' sends communication to a primary appliance 200 at a predetermined frequency, such as every 1 msec or 1 sec. In some embodiments, failover detector 630 uses a request/reply messaging mechanism or protocol to communicate with another appliance 200, such as an appliance 200 or 200'. Failover detector 630 may monitor operation or functional performance of the appliance 200 or 200' on which it is located. In further embodiments, failover detector 630 monitors operation or functional performance of another appliance 200 or 200'. In some embodiments, failover detector 630 monitors any number of appliances 200 to detect availability or unavailability of the appliances. Failover detector 630 may comprise any functionality to detect failure of a core 505 of a primary appliance 200. In some embodiments, failover detector 630 identifies the cores 505 of the primary appliance 200 that are not available.

Failover detector 630 may detect failure, malfunction or unavailability of any component of a primary appliance 200 or a secondary appliance 200'. In some embodiments, failover detector 630 detects network traffic congestion or overburdening of core 505A of the plurality of cores 505 on the primary appliance 200. In further embodiments, failover detector 630 of a secondary appliance 200' detects that responses to requests to the primary appliance 200 from the failover detector 630 are received with a delay that exceeds a threshold. In response to this detection, failover detector 630 may determine that the primary appliance 200 is unavailable. In further embodiments, failover detector 630 of a secondary appliance 200' communicates with a failover detector 630 of a primary appliance 200. The failover detector 630 of the secondary appliance 200' may receive from the failover detector 630 of the primary appliance 200 a transmission indicating that one or more cores 505, or one or more PPEs of the primary appliance 200 are not available. The failover detector 630 may alert the secondary appliance 200' that the failover of the primary appliance 200 was detected. In further embodiments, failover detector 630 of the primary appliance 200 communicates with cores 505 of the primary appliances or with PPE of the cores 505 of the primary appliances. The failover detector 630 may determine, responsive to monitoring of the responses of the cores 505 or the PPEs to the requests of the failover detector 630 that the cores 505 or the PPEs operating on cores 505 are not available. In some embodiments, failover detector 630 determines, responsive to response times of the responses from the cores 505 or the PPEs or responsive to changes in response times of the responses that the PPEs of the cores 505 or the cores 505 are not available.

Failover communication 640 may be any communication between the primary appliance 200 and the secondary appliance 200'. Failover communication 640 may be between a master core 505' of a secondary appliance 200' and a master core 505 of a primary appliance 200. Similarly, failover communication 640 may take place between any core of the secondary appliance 200' and any core of the primary appliance 200. In some embodiments, failover communication 640 includes communication relating operation or configuration of the primary appliance 200 used for maintaining operations performed on the network traffic traversing the primary appliance 200. Once the failover communication 640 is transmitted to the secondary appliance 200', the secondary appliance 200' may use the information received to replicate the operation and functionality of the primary appliance 200 for every operation. In some embodiments, failover communication 640 includes communication that is not failover related nor configuration and operation related. Failover communication 640 may include information about a plurality of connections and a plurality of connection sessions. In some embodiments, failover communication 640 includes a connection or a communication session between appliances 200 and 200' for monitoring or detecting failover or availability of the primary appliance 200. Sessions between the appliances 200 and 200' may be used for sending the heartbeat messages for pinging each of the cores 505 of the primary appliance 200 for health and availability. In further embodiments, failover communication 640 includes a connection or a communication session between the appliances 200 and 200' for forwarding or propagating network traffic intended for the primary appliance 200 to the secondary appliance 200'. In still further embodiments, failover communication 640 includes a connection or a communication session between the appliances 200 and 200' for exchanging operation or configuration information or parameters, such as for example configuration/operation information 615, user info 605 or client info 120 information. In further embodiments, failover communication 640 includes a connection or a communication session for communication used for detecting failover, such as the communication by the failover detector 630. In still further embodiments, failover communication 640 includes one or more connections or sessions implemented at any network stack layer or using any communication protocol. Failover communication 640 may be used as a medium of updating configuration or operation information 615, user info 605 and client info 120. Failover communication 640 may comprise one or more connections via allocated ports to transmit updated configuration/operation information 615 from the primary appliance 200 to the secondary appliance 200'. In some embodiments, failover communication 640 comprises a connection established via dedicated ports on the primary and secondary appliance, such as for example port 3003. The failover communication 640 may further interface with a hashing engine that hashes communication transmitted between the ports 3003 of the primary and secondary appliance. The hashing engine may hash the communications communicated via the failover communication 640 and forward it to the receiving core 505A of the primary or the secondary appliance 200 or 200'. Failover communication 640 may further include one or more dedicated connections or sessions implemented via any communication protocol for communicating or transmitting network traffic traversing the primary appliance 200 to the secondary appliance 200'.

Failover communication 650 may further include a User Datagram Protocol (UDP) communication. In some embodiments, UDP communication may be established between the primary appliance 200 and secondary appliance 200 to transmit heartbeat messages. The heartbeat messages may be any sets of responses and requests between the appliances 200 and 200' to establish the health or availability of the primary appliance 200. In some embodiments, UDP communication is used by the secondary appliance to send a request to the primary appliance 200 and the primary appliance 200 responds or does not respond to the secondary appliance 200' to indicate the health of the primary appliance 200. In some embodiments, the response identifies the state, health or availability of the primary appliance 200.

In a multi-core system, failover manager 610, along with propagator 620 and failover detector 630 may operate on a designated core, such as a master core. In some embodiments, a master core 505 includes a master failover manager 610, a master propagator 620 and a failover detector 630. The master core 505' a secondary appliance 200' may communicate with the master core 505 of the primary appliance 200. Master failover manager 610' of the secondary appliance 200 may make determinations regarding the failover and may update each of the slave cores 505' of the secondary appliance 200'. In some embodiments, failover detector 630 of the master core 505' of the secondary appliance 200' detects the failover. The failover manager 610 of the master core 505' may receive configuration/operation information 615 from the primary core 505 of the primary appliance 200. The propagator 620 of the primary core 505 of the secondary appliance may propagate the configuration/operation information 615 to all of the slave cores 505' of the secondary appliance 200. In such embodiments, the primary or the master core 505' of the secondary appliance 200' may communicate with the primary appliance 200 via the failover communication 640. The primary core 505' of the secondary appliance 200 may use the failover manager 610, propagator 620 and failover detector operating on the primary core 505' of the secondary appliance to manage failover for all the cores of the secondary appliance 200'.

In one example, a secondary appliance 200' having a master core 505' comprises a failover detector 630 in communication with one or more cores 505 of the primary appliance 200. The failover detector 630 may regularly send pings, messages or transmissions to the primary appliance 200. In some embodiments, the failover detector 630 pings the failover manager 610 of the primary core 505 of the primary appliance. The failover manager 610 of the primary appliance 200 may monitor each core 505 and each PPE 548 of each core 505 to determine the health and availability of each of the cores 505. Once the failover manager 610 of the primary appliance detects unavailability of any of the cores 505 of the primary appliance, the failover manager 610 of the primary appliance 200 may respond to the failover detector 630 of the secondary appliance 200' that one or more PPEs operating on one or more cores 505 of the primary appliance 200 are not available. In other embodiments, failover detector 630 of the secondary appliance 200 pings or communicates with each core 505 of the primary appliance 200 to determine the health and the availability of the PPEs operating on the cores 505. Once the failover detector 630 of the secondary appliance 200' detects that one or more cores of the primary appliance 200 are not available, the failover detector 630 sends the information to the failover manager 610 that failover is detected. Failover manager 610 may regularly receive updates from the primary appliance 200 regarding the operation and configuration settings or information corresponding to each of the cores 505. Failover manager 610 of the master core 505' of the secondary appliance 200 may request the configuration and operation information about each of the PPEs from the master core 505 of the primary appliance 200. Failover manager 610 may use the latest and most updated configuration and operation information and settings to determine how to configure and set up each of the cores 505 of the secondary appliance 200'. In some embodiments, failover manager 610 of the primary core 505 determines configuration and operation settings for each of the cores 505' of the secondary appliance 200'. Propagator 620 of the primary core 505' of the secondary appliance may forward to each of the cores 505 configuration and operation settings. Each of the PPEs 548 operating on each of the cores 505 may configure and set up to replicate the performance, operation and functionality of each of the cores 505 of the primary appliance 200. Upon receiving the network traffic intended for each of the cores 505 of the primary appliance 200, the PPEs 548 of the cores 505 of the secondary appliance 200' may continue performance as performed on the network traffic by the primary appliance 200 prior to the failover.

Figure 6B:
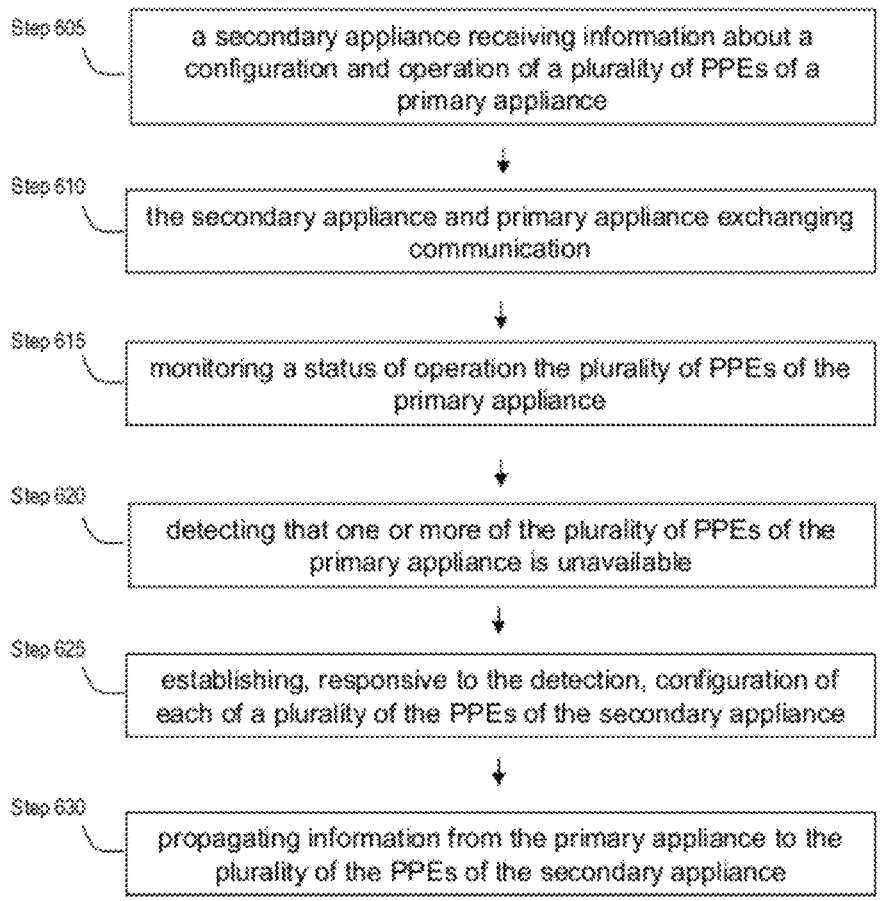
FIG. 6B is a flow diagram of an embodiment of steps of a method for maintaining operation of a multi-core network appliance upon failover.

Referring now to FIG. 6B, embodiments of steps of a method for maintaining operation of a multi-core appliance 200 upon failover is illustrated. In brief overview, at step 605 a secondary appliance receives information about a configuration and operation of a plurality of PPEs of a primary appliance. At step 610, the secondary appliance and primary appliance exchange communication. At step 615, a status of operation of the plurality of PPEs of the primary appliance is monitored. At step 620, one or more of the plurality of PPEs of the primary appliance are detected unavailable. At step 625, response to the detection, configuration of each of a plurality of PPEs of the secondary appliance is established. At step 630, information is propagated from the primary appliance to the plurality of the PPEs of the secondary appliance.

In further overview of FIG. 6B, at step 605, a secondary appliance 200' receives information about configuration and operation of a plurality of packet processing engines (PPEs) operating on a plurality of the cores 505 of the primary appliance 200. The information may be received or sent via any failover communication 640. Secondary appliance 200' may receive configuration/operation information 615 about a plurality of PPEs operating on a plurality of cores 505 from the primary appliance 200. The configuration/operation information 615 may be received from a plurality of cores 505 of the primary appliance 200. In some embodiments, configuration/operation information 615 is received from a designated primary core 505 of the primary appliance. Likewise, the configuration/operation information may be received by a plurality of cores 505' of the secondary appliance 200', or by a designated primary core 505' of the secondary appliance 200'. In some embodiments, secondary appliance 200' receives user info 605 used by the cores 505 of the primary appliance 200 customized or configured for operating on the network traffic of the user. In further embodiments, secondary appliance 200' receives client info 120 information used by the PPEs 548 of the primary appliance 200' for customized or specialized operation on the network traffic in accordance with requirements of the client 102 corresponding to the client info 120. In some embodiments, secondary appliance 200' receives updated configuration/operation information 615. In still further embodiments, secondary appliance 200' receives a set of configuration settings and instructions for configuring each PPE operating on each of the cores 505 on the secondary appliance 200'. The set of configuration settings and instructions may replicate the configuration of the PPEs operating on each of the cores 505 of the primary appliance 200. In some embodiments, secondary appliance 200' receives a set of operation settings and instructions to handle, control, setup or manage operation of each of the PPEs operating on the cores 505 of the secondary appliance 200'. The set of operation settings and instructions may include statuses of SSL cards, operational states, such as for example admin or operational states of the 505 cores. In yet further embodiments, secondary appliance 200' receives a information identifying a status of each secure socket layer (SSL) card of the primary appliance 200. In yet further embodiments, secondary appliance 200' receives information about administrative state, or an operational state, of one or more PPEs 548 on the primary appliance 200. Since the primary and secondary appliance may both include a plurality of cores 505, the configuration of a particular core of the primary appliance 200 may be mapped or copied for a particular corresponding core 505 of the secondary appliance. The configuration and operation information may be for any single PPE or any single core 505, or any group of PPEs or cores 505 of either the primary appliance 200 or the secondary appliance 200'. In some embodiments, secondary appliance 200' sends a transmission to the primary appliance 200 to request the information about configuration and operation of any one PPE or any one core 505 of the primary appliance 200. The primary appliance 200' may respond by resending the information about configuration or operation regarding the requested core or PPE or by sending updates to the previously sent information about configuration or operation of the PPE or the core 505.

At step 610, the secondary appliance 200' and primary appliance 200 exchange any communication. The information may be exchanged via failover communication 640. In some embodiments, the exchanged information may be any information used for performing operation by the appliances 200 on the network traffic between the clients 102 and servers 106. In some embodiments, exchanged information includes updated information about configuration and operation of the primary appliance 200. In some embodiments, failover detector 620 of the secondary appliance 200' sends requests or pings to the primary appliance 200 to check on the health, status or availability of the primary appliance 200. In further embodiments, the primary core 505' of the secondary appliance 200' pings each core 505 of the primary appliance 200. In response to the ping, the primary core 505' of the secondary appliance 200' may determine the health and availability of each of the cores 505 of the primary appliance 200. The primary appliance 200 may respond to the failover detector 620 of the secondary appliance 200' by responding to the request. The failover detector 620 may use the responses, response times or any available information from the request or the response to determine health or availability of the primary appliance 200. In further embodiments, failover detector 620 may ping any core 505 or any PPE operating on any core 505 of the primary appliance 200 to determine health or availability of the PPE or the core 505. The exchanged information may further include any network traffic intended for the primary appliance 200 and forwarded to the secondary appliance 200'. The secondary appliance 200' may be configured to maintain operation previously performed by the primary appliance. The incoming network traffic may be forwarded to the secondary appliance 200' via failover communication 640. Similarly, outgoing network traffic that is operated on by the secondary appliance 200' may be transmitted via failover connection 640.

At step 615, the secondary appliance 200' monitors a status of operation of the plurality of PPEs or the cores 505 of the primary appliance 200. In some embodiments, failover detector monitors the status of operation. In other embodiments, failover manager 610 of the secondary appliance 200' monitors the status of operation of the PPEs or the cores 505 of the primary appliance 200. Status of operation may include any status or description of the primary appliance 200, such for example: up or available, down or unavailable, standby, in error, congested or slow. In some embodiments, status of operation may include any status or operation of any PPE or any core 505 of the primary appliance, such as: down or unavailable, up or available, standby, in error, congested or slow. In some embodiments, failover detector 640 of a secondary appliance 200' transmits a request or a ping to a primary appliance 200. A component of the primary appliance 200, such as the failover manager 610 or the failover detector 630, responds to the request or the ping. Failover detector 630 may use the response, or a timing of the response to make a determination about any of the PPEs or cores 505 operating on the primary appliance 200. In some embodiments, the response is not received by the failover detector 630. Failover detector 630, may in response to the response not being received, make a determination about health or availability of one or more PPEs or the cores 505.

At step 620, the secondary appliance 200' detects that one or more of the PPEs of the primary appliance 200 is unavailable. In some embodiments, failover detector 630 of the secondary appliance 200' detects that one or more PPEs of the primary appliance 200 are unavailable. In further embodiments, failover detector 630 of the secondary appliance 200' detects that one or more cores 505 of the primary appliance 200 are unavailable. In some embodiments, failover manager 610 detects that PPEs or the cores 505 of the primary appliance are unavailable. Detection that one or more PPEs of the primary appliance are unavailable may be responsive to monitoring a status of operation of the PPEs of the primary appliance 200. In some embodiments, detection that one or more PPEs are unavailable is responsive to a transmission received by the secondary appliance 200' from the primary appliance 200. In further embodiments, detection that one or more PPEs are unavailable is responsive to a lack of response to a sent request. In yet further embodiments, detection that one or more PPEs are unavailable is responsive to a delay in response time from the PPE or the core 505 of the primary appliance 200 exceeding a threshold. A delay in response time from the primary appliance 200 may also trigger the detection that one or more PPEs are unavailable. In still further embodiments, detection that one or more PPEs are unavailable is responsive to an updated information about configuration or operation from the primary appliance 200, such as for example updated configuration/operation information 615. In some embodiments, detection that one or more PPEs are unavailable is responsive to receiving of network traffic intended for the primary appliance 200. In some embodiments, detection that one or more PPEs are unavailable is responsive to an amount of network traffic intended for the primary appliance 200 but received by the secondary appliance 200' exceeding a threshold. The detection that one or more PPEs are unavailable may be responsive to a transmission from the primary appliance 200 that comprises configuration/operation information 615, user info 605 or client info 120. In some embodiments, any number of PPEs of the primary appliance 200 may be detected to be unavailable.

At step 625, the secondary appliance 200' establishes, responsive to the detection, configuration of each of a plurality of the PPEs of the secondary appliance 200'. In some embodiments, secondary appliance 200' establishes configuration of one or more PPEs of the secondary appliance 200'. In further embodiments, failover manager 610 of a master core 505 of the plurality of cores 505 of the secondary appliance 200' establishes configuration for each PPEs of the secondary appliance 200'. The failover manager 610 of a master core 505' of the secondary appliance 200' may be designated for configuring each of the plurality of PPEs or PEs 548 on each of the cores 505. The PPEs for which the configuration is established may be selected, identified or indicated by the received configuration/operation information 615 or updated configuration/operation information. In some embodiments, the PPEs for which configuration is established may be selected, identified or indicated by the received user info 605 or client info 120. In some embodiments, propagator 620 propagates configuration and operation information to the selected or identified PPEs. In further embodiments, propagator 620 sets up and initiates configuration and operation settings for the PPEs. In still further embodiments, failover manager 610 sets up and initiates configuration and operation settings for the PPEs for which the configuration is established on the primary appliance 200. In still further embodiments, failover manager 610 sets up and initiates configuration and operation settings for the vservers 270 for which the configuration is established on the primary appliance 200. In some embodiments, configuration for PPEs of the secondary appliance 200' which correspond to the unavailable PPEs of the primary appliance 200 is established. For example, PPEs of the secondary appliance may be mapped, associated with or comprise same or similar configuration and operation instructions and settings as some specific PPEs of the primary appliance. Upon detection of unavailability of one or more of these specific PPEs of the primary appliance 200', secondary appliance 200' may establish configuration for the corresponding PPEs of the secondary appliance 200'.

At step 630, secondary appliance 200' propagates information from the primary appliance 200 to the plurality of PPEs of the secondary appliance 200'. In some embodiments, propagator 620 forwards or propagates information received from the primary appliance 200 to the PPEs configured to handle or operate on the information received. The information received may include network traffic intended for the primary appliance 200. In some embodiments, the information received includes any one of, or any combination of, the configuration/operation information 615, user info 605 and the client info 120. The information may include session specific or connection specific information for operating on the network traffic of the session or the connection. The propagator 620 may be located on the master core 505, such as the core 505A. The propagator 620 may distribute information across the cores 505 or PPEs of the secondary appliance 200'. The propagated information maybe operated on, processed or serviced by the PPEs receiving the propagated information.

G. Systems and Methods for Maintaining Stateful Sessions Upon Failover

Figure 7A:
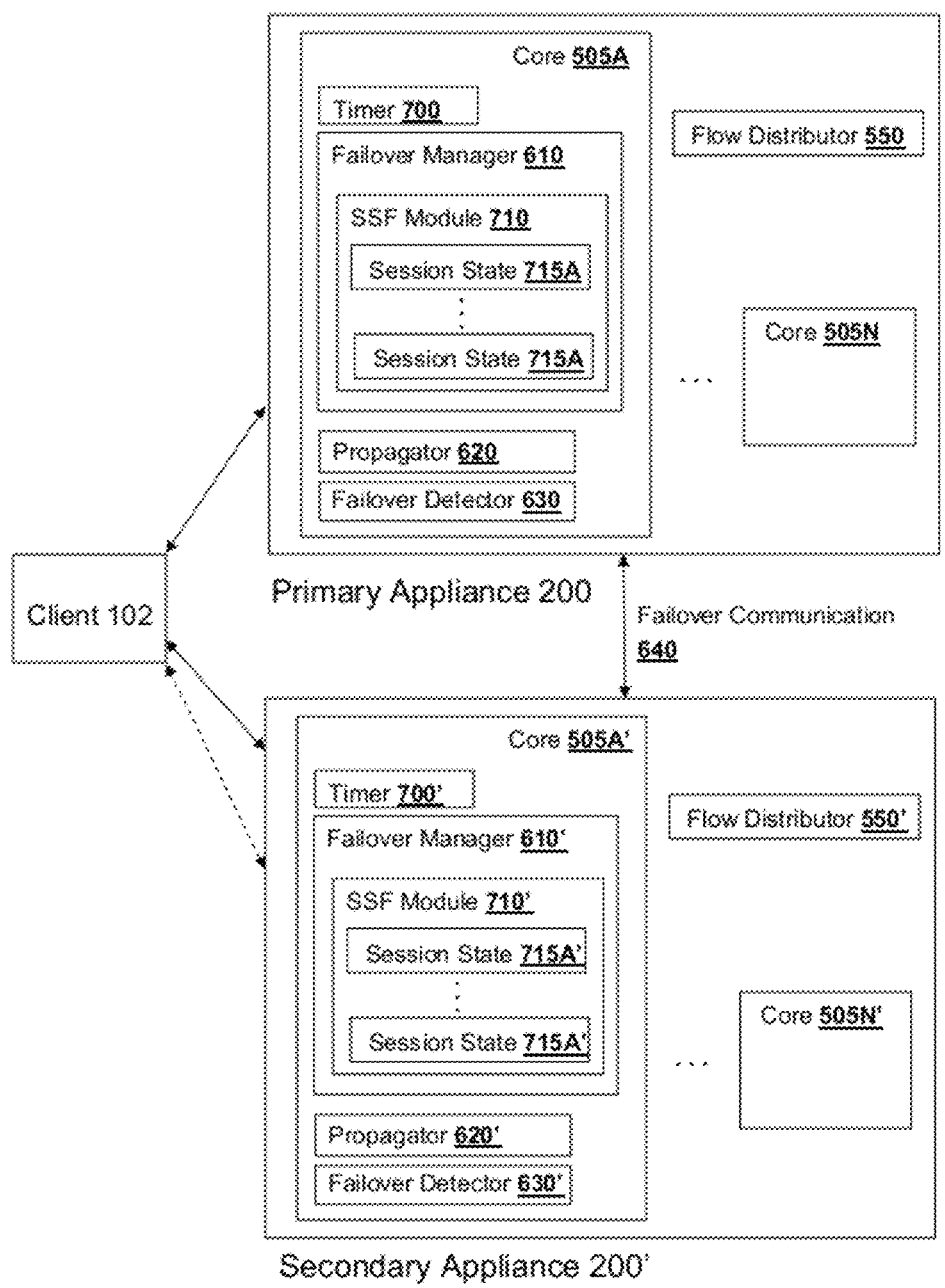
FIG. 7A is block diagram of an embodiment of a system for maintaining stateful sessions upon failover.

Referring now to FIG. 7A, an embodiment of a system for maintaining stateful sessions upon failover is illustrated. In brief overview, FIG. 7A depicts a client 102 in communication with a primary network appliance 200. The primary appliance 200 comprises a plurality of cores 505A-N and a flow distributor 550. Core 505A of the primary appliance 200 further includes a timer 700, a failover manager 610, a propagator 620 and a failover detector 630. The failover manager 610 includes a stateful session failover (SSF) module 710 which further comprises session states 715A-715N. FIG. 7A further illustrates a secondary appliance 200' in communication with the primary appliance 200 via failover communication 640. Similar to the primary appliance 200, the secondary appliance 200' also comprises a plurality of cores 505A-N' and a flow distributor 550'. The core 505A' of the secondary appliance 200' comprises a timer 700', a propagator 620', failover detector 650' and a failover manager 610' which also further comprises SSF module 710' further comprising session states 715A-715N.

Referring to FIG. 7A in greater detail, a timer 700 may be any hardware, software or any combination of hardware or software for counting, monitoring or measuring time duration or duration of time intervals. Timer 700 may include any type and form of a logic circuit. Timer 700 may include functions, scripts, hardware units, components or devices for measuring time intervals or time durations. Timer 700 may be comprise functionality to be set or reset by the appliance 200. Timer 700 may include a logic circuitry to perform periodic actions that are used to count time. In some embodiments, timer 700 includes an oscillator. The oscillator may include a crystal in combination with digital or analog circuitry to perform periodic measurements or actions. Timer 700 may count, monitor or measure an amount of time lapsed, or an amount of time left. Timer 700 may count any duration of time, such as for example 0.01, 0.05, 0.1, 0.25, 0.5, 0.75, 1, 1.25, 1.5, 1.75, 2, 2.25, 2.5, 2.75, 3, 3.25, 3.5, 3.75, 4, 4.5, 5, 6, 7, 8, 9, 10, 20, 30, 50, 70, 90, 100, 200, 300, 500 and 1000 milliseconds. In some embodiments, timer 700 counts an amount of time left until an action occurs, an action is taken or a step is performed. Timer 700 may be used as trigger for another action or a process, such as for example sending a transmission or an instruction. Timer 700 may be a stand alone component anywhere on the appliance 200, and may communicate with any of the cores 505. In some embodiments, each of the cores 505 includes one or more timers 700. Timer 700 may operate or run within a packet engine 548, or within any other component of the appliance 200. Timer 700 may, upon expiration, reset and continue timing or counting time from beginning Timer 700 may monitor, count or measure time on any component of an appliance 200 and may be used in any configuration with any other tasks and for a variety of purposes and functions.

Stateful session failover module 710, also referred to as a SSF module 710, may comprise any module, device, function or a component for maintaining, monitoring, updating, storing and managing any data or state that corresponds to sessions managed by a core 505. SSF module 710 may include any hardware, software, or any combination of hardware and software for storing, editing, maintaining, updating or otherwise managing any data or state relating to any type and form of session. SSF module 710 may include any algorithm, function, program, script, set of commands or instructions for managing, editing, storing and updating data of a state of a session between a client 102 and a server 106. SSF module 710 may include functions, scripts, programs and devices for exchanging communication, such as state session data with a plurality of cores 505. SSF module 710 may operate on each core 505 of a multi-core appliance 200, such as the primary and secondary appliances 200 and 200'. In some embodiments, SSF module 710 includes functions, scripts, programs and devices for exchanging communication, such as state session data with any other SSF module 710 of the same or a different appliance 200. In some embodiments, SSF module 710 operates or runs on a single core 505 of a plurality of cores 505 of a multi-core appliance 200.

SSF module 710 may operate or run on any core 505 of a multi-core appliance 200. In some embodiments, SSF module 710 operates on master core 505 of a plurality of cores 505. In other embodiments, SSF module 710 operates on a slave core 505 of the plurality of cores 505. SSF modules 710 of the slave cores 505 may be configured to forward the data of the session states of the slave cores 505 to the SSF module 710 of the master core 505. In further embodiments, SSF modules 710 of the slave cores 505 communicate with the corresponding cores 505' of a secondary appliance 200' directly. In some embodiments, SSF module 710 of a master core prompts each core 505 to forward session states 715 to the SSF module 710 of the master core 505. SSF module 710 of the master core 505 may forward the received session states 715 to another SSF module 710' of a master core 505' of a secondary multi-core appliance 200'. SSF module 710 may exchange communication with another SSF module 710. The exchanged communication may include any data corresponding to sessions managed by any of the cores 505. In some embodiments, SSF module 710 monitors session states of each of the sessions managed by each of the cores 505 of the appliance 200. In further embodiments, SSF module 710 of a core 505 of an appliance 200 receives an update from a SSF module 710 of another core 505 of the same appliance. The update may include updated session states 715. In some embodiments, the update includes changes in the data of the session states 715 between the current data of the session states 715 and a previously sent data of the session states 715.

The SSF module may implement or support messages for managing session state across multi-core systems. For example, on the primary appliance, a message FORWARD_SESSION_TOSECONDARY may be used by a core owning a session to send updated session state to the master core. This message may include a buffer of data to send to the secondary appliance via the failover connection or an address where the this buffer may be access. A message sent via the failover connection may be referred to as a SSF message. On the second appliance, the following SSF messages may be used by the core receiving the failover connection to send corresponding messages to the core on the secondary that may own the session:

If the SSF message is
  i. SESSION_ADD: then the core of the secondary send the create_session message to the owner core to create a session.
  ii. SESSION_DELETE: then the core of the secondary send the message. delete_session to the owner core to delete a session
  iii. SESSION_CLEAR: A clear_session will be sent to all the cores, indicating that they clear all sessions, created with the senders ip-address.

Session state 715 may include any type and form of information or data that corresponds to a session managed by a core 505, such a SSL VPN session or Load Balancing persistence session. Session state 715 may include session data, parameters or values formatted into packets, objects or files. In some embodiments, session state 715 includes an array or an array of structures storing data corresponding to a session. Session state 715 may include any type and form of configuration of information particular to a session, such as a session between a client 102 and a server 106. In some embodiments, session state 715 includes a state of a session. In further embodiments, session state 715 includes a data about a state of a session. In still further embodiments, session state 715 includes history information regarding a session. In yet further embodiments, session state 715 includes previous communications or transmissions between two or more network devices. Session state 715 may include a session token or an identifier. Session state 715 may further include identifiers of the devices exchanging transmissions via the session, such as hostnames or internet protocol addresses. Session state 715 may further include an object, such as a session cookie. In some embodiments, session state 715 includes a collection of session variables. The session variables may be persisted during the session.

Session state 715 may identify a corresponding session as active, inactive, disconnected, on hold/suspended, failed, error, backup, etc. In one embodiment, session state 715 may identify a session as in an active state. In another embodiment, the session state 715 may identify or change a session from active to inactive. In some embodiments, session state 715 may identify a session as suspended. SSF module 710 may update or change the state of a session from active to suspended. In some embodiments, the session state 715 may be changed or updated by the SSF module 710 from suspended to active.

Session states may include data that identifies various instances or features of a session. Session state 715 may include any data characteristic or ability for any network device involved in the session, such as the client 102, server 106 or the appliance 200. In some embodiments, session state 715 identifies an ability to add data or entries corresponding to the session. In other embodiments, session state 715 identifies an ability to view data or entries corresponding to the session. In further embodiments, session state 715 identifies an ability to edit data or entries corresponding to the session. In yet further embodiments, session state 715 identifies an ability to undo or redo modifications. In still further embodiments, session state 715 identifies an ability to cut, copy, paste or delete existing entries. In yet further embodiments, session state 715 identifies an ability to search entries. In still further embodiments, session state 715 identifies an ability to filter entries.

The appliance 200 may host one or more intranet internet protocol or intranetIP or IIP addresses. The appliance 200 may associate and assign these IIP addresses 282 with a user and/or client For example, when connected from a first network 104 to a second network 104' via the appliance 200, the appliance 200 establishes, assigns or otherwise provides an IntranetIP 20 address for the user and/or client 102 on the second network 104'. The appliance 200 listens for and receives on the second or private network 104' for any communications directed towards the client 102 using the client's established IntranetIP. In one embodiment, the appliance 200 acts as or on behalf of the client 102 on the second private network 104. The appliance 200 may forward to the client 102 communications from the second network 104' directed towards the IIP address.

In more detail, the appliance 200 provides an IIP address to a user or the client of the user. In one embodiment, the IIP address is the internet protocol address of the user, or the client used by the user, for communications on the network 104' accessed via the appliance 200. For example, the user may communicate on a first network 104 via a network stack 310 of a client 102 that provides an internet protocol (IP) address for the first network 104, such as for example, 200.100.10.1. From client 102 on the first network 104, the user may establish a connection, such as an SSL VPN connection, with a second network 104' via the appliance 200. The appliance 200 provides an IIP address for the second network 104' to the client and/or user, such as 192.10.1.1. Although the client 102 has an IP address on the first network 104 (e.g., 200.100.10. I), the user and/or client has an IIP address 282 or second network IP address (e.g., 192.10.1.1) for communications on the second network 104'. In one embodiment, the IIP address is the internet protocol address assigned to the client 102 on the VPN, or SSL VPN, connected network 104'. In another embodiment, the appliance 200 provides or acts as a DNS 286 for clients 102 communicating via the appliance 200. In some embodiments, the appliance 200 assigns or leases internet protocol addresses, referred to as IIP addresses, to client's requesting an internet protocol address, such as dynamically via Dynamic Host Configuration Protocol (DHCP).

The appliance 200 may provide the IIP address from an IIP pool of one or more IIP addresses. In some embodiments, the appliance 200 obtains a pool of internet protocol addresses on network 104' from a server 106 to use for the IIP pool 410. In one embodiment, the appliance 200 obtains an IIP address pool, or portion thereof, from a DNS server 406, such as one provided via server 106. In another embodiment, the appliance 200 obtains an IIP address pool, or portion thereof, from a Remote Authentication Dial In User Service, RADIUS, server, such as one provided via server 106. In yet another embodiment, the appliance 200 acts as a DNS server 286 or provides DNS functionally 286 for network 104'. For example, a vServer 275 may be configured as a DNS 286. In these embodiments, the appliance 200 obtains or provides an IIP pool from the appliance provided DNS 286.

The appliance 200 may comprise any type and form of database or table for associating, tracking, managing or maintaining the designation, allocation and/or assignment of IIP addresses to a 1) user, 2) group, 3) vServer, and/or d) global entities from the IIP pool 410. In one embodiment, the appliance 200 implements an Internet Protocol Light Weight Database Table (IPLWDB). In some embodiments, the IPLWDB maintains entries which provide a one-to-one mapping of an IP address with or to an entity. In another embodiment, once an entity uses or is assigned an IIP address, the IPLWDB maintains the association between the entity and IIP address, which may be referred to as "IIP 30 stickiness" or having the IIP address "stuck" to an entity. In one embodiment, IIP stickiness refers to the ability or effectiveness of the appliance 200 to maintain or hold the association between the entity and the IIP address. In some embodiments, IIP stickiness refers to the ability or effectiveness of the appliance 200 to maintain the entity/IIP address relationship or assignment via any changes in the system, such as a user logging in and out of the appliance, or changing access points.

In some embodiments, the IPLWDB comprises a hash table, which is hashed based on any one or more of the 1) user, 2) group, 3) vServer, and/or d) global entities. The IPLWDB may comprise a hash of the user and any other information associated with the user, such as client 102, or network 104 of client 104. The IPLWDB may track, manage or maintain any status and temporal information related to the IIP address/entity relationship. In one embodiment, the IPLWDB maintains if the IIP address for the entity is currently active or inactive. For example, in some embodiments, the IPLWDB identifies an IIP address as active if it is currently used in an SSL VPN session via the appliance 200. In another embodiment, the IPLWDB 450 maintains temporal data for the IIP address use by the entity: such as when first used, when last used, how long has been used, and when most recently used. In other embodiments, the IPLWDB maintains information on the type or source of usage, such as, in the case of user, what client 102 or network 104 used from, or for what transactions or activities were performed using the assigned IIP address.

In some embodiments, the IPLWDB tracks, manages and maintains multiple IIP addresses used by an entity. The IPLWDB may use one or more IIP policies for determining which IIP address of a plurality of IIP addresses to assign or provide to an entity, such as a user. In one embodiment, the IIP policy may specify to provide for assignment the most recently or last used IIP address of the user. In some embodiments, the IIP policy 20 420 may specify to provide for assignment the most used IIP address of the user. In other embodiments, the IIP policy may specify to provide the least used IIP address of the user. In another embodiment, the IIP policy may specify the order or priority for which to provide IP addresses of the user, for example, from the most recent to least recent. In yet another embodiment, the IIP policy may specify which IIP pool to use, and/or in which order. In some embodiments, the IIP policy may specify whether or not to use a mapped IP address, and under what conditions, such as when an inactive IIP address of the user is not available. In other embodiments, the IIP policy may specify whether or not to transfer a session or login the user, and under what conditions.

Session data and/or state may identify or specify any one or more of the following: 1) identifier for the session, 2) type of session, 3) configuration of session, 4) type or name of application for the session, 5) the computing devices participating in the session, such as network identifiers for the devices, 6) any IIP addresses for the session or users, such as IIP Pool 410, 7) IIP policies 420, 8) IPLWDB 450 9) any policies associated with the session 10) any policies used for the session, such as names of SSL VPN policies, 11) any end point authorization policies, such as client security strings used for the session, 12) session state, and/or 13) any session metrics, such as length of the session. In one embodiment, the primary appliance 200 propagates or synchronizes policies with the secondary appliance 200'.

In some embodiments, the policy configuration of the primary appliance 200 is distributed and used in the secondary appliance 200'. In other embodiments, the primary and secondary appliances are configured with the same policies or with the same policies applicable to sessions to be handled via failover by the secondary 10 appliance 200'. In another embodiment, the secondary appliance 200' maintains and uses one or more different policies on a failover session. In one embodiment, some portions or information of the session may change dynamically during the course of using the session or during the lifetime of the session. For example, the appliance 200 and/or SSF module may maintain counters for auditing and/or to maintain session statistics. These counters may change dynamically during operation or lifetime of the session. In some embodiments, the session propagator 9 15 10 propagates these dynamically changing session information upon the change in the session. In other embodiments, the session propagator propagates session information, including changed session information, on a predetermined frequency or time period. In yet another embodiment, the session propagator propagates session information, including changed session information, triggered by predetermined events. In some embodiments, a propagator on the secondary appliance 200' queries a propagator on the primary appliance 200 on a predetermined basis, such as frequency, time or event based.

As part of the session data and/or state, the appliance 200 such as via SSF module manager may store, maintain or track the values of the client security strings used to perform end point detection and authorization. In some embodiments, these client security string values or end point authorization values are not propagated from the primary appliance to the secondary appliance. In other embodiments, any client security string values propagated to a secondary appliance may become out of sync or stale. In other cases, the values for the client security strings would change if re-obtained or detected from the client. For example, one or more attributes or characteristics of the client may have changed between the client's establishment of the session with the appliance and the failover. The client may go through one or more software upgrades or de-installs between SSL VPN session login and the occurrence of a failover. The attributes of the client 102 may be such that the values of the client security string may not allow the client to be authorized in accordance with policy.

Figure 7B:
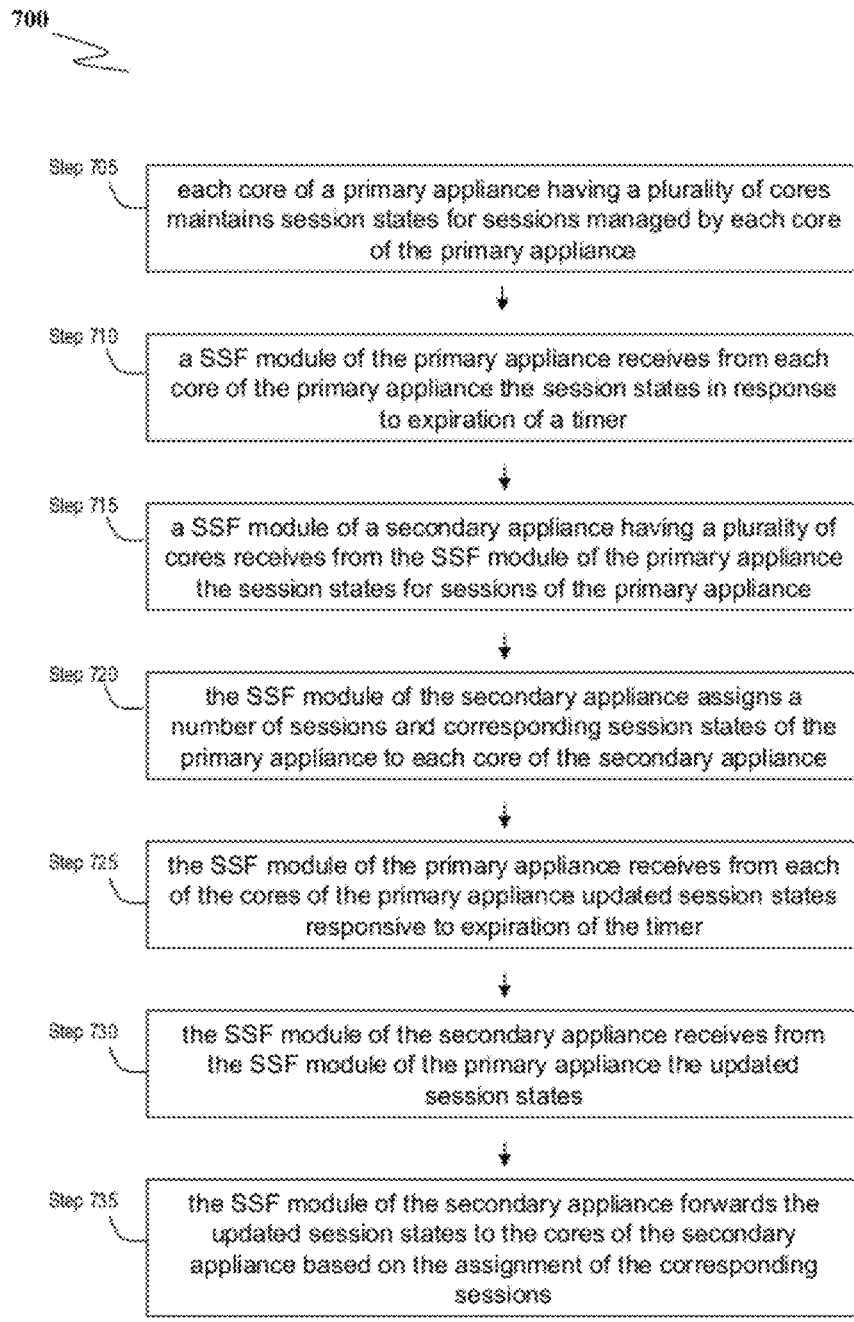
FIG. 7B is a flow diagram of an embodiment of steps of a method for maintaining operation of stateful sessions upon failover.

Referring now to FIG. 7B, embodiments of steps of a method 700 for maintaining operation of a multi-core appliance 200 upon failover is illustrated. In brief overview, at step 705 each core of a multi-core primary appliance 200 maintains session states for sessions managed by each core of the primary appliance 200. At step 710, a SSF module of the primary appliance receives from each core of the primary appliance the session states in response to expiration of a timer. At step 715, a SSF module of a multi-core secondary appliance receives from the SSF module of the primary appliance the session states for sessions of the primary appliance. At step 720, the SSF module of the secondary appliance assigns a number of sessions and corresponding session states of the primary appliance to each core of the secondary appliance. At step 725, the SSF module of the primary appliance receives from each of the cores of the primary appliance updated session states responsive to expiration of the timer. At step 730, the SSF module of the secondary appliance receives from the SSF module of the primary appliance the updated session states. At step 735, the SSF module of the secondary appliance forwards the updated session states to the cores of the secondary appliance based on the assignment of the corresponding sessions.

In further overview of FIG. 7B, at step 705 of the method 700 each core of a multi-core primary appliance 200 maintains session states for sessions operating on, or being managed by, each core of the primary appliance 200. Each core 505 may run, service or manage any number of sessions. In some embodiments, a core 505 manages no sessions. In other embodiments, a core 505 manages a single session. In further embodiments, a core 505 manages a plurality of sessions, such as 2, 5, 10, 20, 50, 100, 1000, or 1,000,000 sessions. Each core 505 may store, maintain or update data that corresponds to states the sessions in the session states 715. In some embodiments, each core 505 stores, maintains or updates values, parameters or settings for the sessions in the state sessions 715. If a modification or a change corresponding to a session occurs, the modification or the change may be updated in the session state 715. In some embodiments, the modifications or changes to the sessions include any change of state, nature or functionality of the session. A core 505 may change or modify the session state 715 from active to inactive, from established to terminated, from functional to non-functional. In some embodiments, a core 505 may maintain in the session state 715 any information about a session, such as information that the session is limited to read only session, information that session has a limited access or a limited service, or that a session is marked for a particular service by the appliance 200. The core 505 may modify the session state 715 to reflect any modification or change corresponding to the session. In some embodiments, core 505 edits or modifies any data of the session state, responsive to any development, change or modification to the session. Core 505 may maintain, store or update history of the session in the session state 715. Core 505 may maintain, store or update persistence related features in the session state 715, such as load balancing persistence.

At step 710, a SSF module 710 of the primary appliance 200 receives from each core 505 of the primary appliance 200 the session states 715 in response to expiration of a timer. In some embodiment, a timer 700 on a cores 505 expires. In response to expiration of the timer 700 on the core, the core 505 may send a message comprising session states 715 of all the sessions of the core 505. In some embodiments, the core 505 sends a message comprising session states 715 of some of the sessions of the core 505. In some embodiments, the message includes session states 715 for active sessions. In other embodiments, the message includes session states 715 that were updated since the previous message comprising session states 715 to the SSF module 710. In some embodiments, SSF module 710 receives messages from each of the cores. Each of the messages may include a memory location in a memory shared by all the cores 505, or any memory that is accessible by the SSF module 710. The message may further include identifications of the session states 715 to be retrieved by the SSF module 710. In some embodiment, SSF module sends a request to each of the cores 505, responsive to an expiration of a timer 700. Each of the cores 505 may respond to the request of the SSF module 710 by sending a message to the SSF module 710.

At step 715, the SSF module 710' of a secondary multi-core appliance 200' receives from the SSF module 710 of the primary multi-core appliance the session states for the sessions of the primary multi-core appliance 200. The session states received by the secondary appliance 200' may include all the session states 715 sent by each of the cores 505 of the primary appliance 200 to the SSF module 710 of the primary appliance 200. In some embodiments, the session states 715 received include some of the session states 715 received by the SSF module 710 of the primary appliance 200 from each of the cores 505. SSF module 710' of the secondary appliance 200' may further receive settings, configurations and parameters for maintaining and operating one or more sessions. In some embodiments, SSF module 710' receives session related configuration and operation information 615. In further embodiments, SSF module 710' receives a session related instructions, commands and settings for running or managing the session on a core 505' of the secondary appliance 200'. Session states 715 received by the SSF module 710 may further identify a core 505 of the primary appliance 200 on which the session corresponding to the session state 715 is operating or running At step 720, the SSF module 710' of the secondary appliance 200' assigns a number of sessions and corresponding session states 715 of the primary appliance 200 to one or more cores 505 of the secondary appliance. In some embodiments, SSF module 710' of the secondary appliance 200' assigns sessions to one or more cores 505' of the secondary appliance. The sessions may be assigned based on the corresponding cores 505 of the primary appliance being used for processing, running, or managing the session. In some embodiments, a session managed by core 505A of the primary appliance 200 is assigned to a core 505A' of the secondary appliance 200'. In further embodiments, a plurality of sessions managed by a core 505N of the primary appliance 200 are assigned to be managed by a core 505N' of the secondary appliance 200'. In yet further embodiments, a plurality of sessions managed by cores 505A and 505N of the primary appliance 200 are assigned to be managed by core 505A' of the secondary appliance 200'. Session states 715 may be assigned, forwarded or propagated to the cores 505' of the secondary appliance 200' by a propagator 620' or by the SSF' module 720. In some embodiments, session states 715 are propagated or forwarded to the cores 505 based on the session assignment of the cores 505. If a session is assigned to a specific core 505, session states 715 corresponding to the session may be forwarded or propagated to the specific core 505. In some embodiments, session states 715 are propagated or forwarded to the cores 505' of the secondary appliance 200' by the SSF modules 710 of the cores 505 of the primary appliance 200. In some embodiments, each core 505 of the primary appliance 200 sends to a core 505' of the secondary appliance a message comprising session states 715 of the core 505.

At step 725, the SSF module 710 of the primary appliance 200 receives from each of the cores 505 of the primary appliance 200 updated session states 715 responsive to expiration of the timer. In some embodiments, SSF module 710 receives from each core 505 updated session states 715. The updates session states 715 may be received responsive to expiration of a timer 700 running on each one of the cores 505. In further embodiments, cores 505 send updated session states 715 responsive to expiration of a timer 700 of a primary core, or a master core 505. A master core 505 may send to each of the cores 505 a message requesting session states 715 in response to a timer 700 expiration. Each core 505 may update session states 715 or any data within the session states 715. In some embodiments, a state, condition, availability or a feature of a session has changed and the core 505 handling the session modifies a session state 715 corresponding to that session in accordance with the change. In further embodiments, core 505 regularly updates or modifies data, values, settings or parameters of the session states 715 responsive to any update, modification or change to the corresponding session. In some embodiments, core 505 updates history of the session in the session state 715 responsive to any exchange of communication via the session, any settings to the session or any development regarding the session. Core 505 may update a session state 715 that to indicate that the session has been established. In further embodiments, core 505 updates a session state 715 to indicate that the session has been terminated. In still further embodiments, core 505 updates a session state 715 to indicate that a session is a read only session. In yet further embodiments, core 505 updates a session state 715 to indicate that a session is granted a limited access or limited privileges to a client 102 or a server 106. In still further embodiments, core 505 updates a session state 715 that a session can be written to or modified by a client or the server. Core 505 may send a message to the SSF module 710 comprising session states 715 of each of the sessions of the core 505 along with updated data of the session states. In some embodiments, core 505 stores updates session states 715 in a memory location that is accessible by the SSF module 710. SSF module 710 may receive the message and identify updated session states 715. In some embodiments, SSF module 710 receives a message comprising a location in a memory in which the core 505 sending the message has stored the updated session states 715. SSF module 710 may access the memory location and retrieve the session states 715. In yet further embodiments, SSF module receives a message comprising only the session states 715 that were updated since the previous update. SSF module 710 may review and process the updated session states 715 from each of the cores 505. SSF module 710 may identify the changes to each session state 715 from a prior update transmission by the cores 505.

At step 730, the SSF module 710' of the secondary appliance 200' receives from the SSF module 710 of the primary appliance 200 the updated session states. In some embodiments, SSF module 710' of the secondary appliance 200' receives from the SSF module 710 of the primary appliance 200 all of the session states 715 received by the SSF module 710 from the cores 505 of the primary appliance. In some embodiments, SSF module 710' of the secondary appliance 200' receives from each core 505 of the primary appliance 200 session states 715 comprising updated data. In further embodiments, SSF module 710' of each of the core 505' of the secondary appliance 200' receives from a core 505 of the primary appliance 200 updated session states 715. In still further embodiments, SSF module 710' of the secondary appliance 200' receives from the SSF module 710 a consolidated data of the session states 715 updated since the previous update transmission from the SSF module 710 to SSF module 710'.

At step 735, the updated session states received by the SSF module 710' of the secondary appliance 200' are forwarded to the cores 505' of the secondary appliance 200'. In some embodiments, updated session states received by the SSF module 710' are forwarded or propagated to each of the cores 505' of the secondary appliance 200' based on the assignment of the corresponding sessions. In some embodiments, propagator 620' of the secondary appliance 200' propagates or forwards the updated session states 715 to the cores 505. In further embodiments, SSF module 710' sends to each of the cores 505' of the secondary appliance a message. The message may include a memory location accessible by each of the cores 505' and instructions to retrieve updated session states 715. In some embodiments, the message includes a memory location accessible to each of the cores 505' and instructions to retrieve updated data for the sessions states 715 already existing on the cores 505'. In further embodiments, the message includes updates session states 715, updates or changes for the session states 715 or data to be updated or changed on the session states 715 stored on the cores 505' of the secondary appliance 200. Updated session states may be propagated or forwarded to the same cores 505' to which the sessions corresponding to the updates session states 715 were assigned. A core 505A' of the secondary appliance 200' may receive an updated session state 715A in response to being assigned a session which corresponds to the session state 715A updated. In further embodiments, changes to data of the session states 715 may be propagated to the cores 505' of the secondary appliance 200'. SSF module 710 of each core 505' of the secondary appliance 200' receiving the updates session states 715 or changes to the data of the session states 715 may process and updated the corresponding session states 715 stored on the core 505'.

In case of a failover, the secondary appliance 200' may use the most up to date session states 715 to maintain operation, performance, functionality and persistence of each of the sessions handled by the primary appliance 200. In response to detection that the primary appliance 200 is unavailable, the cores 505' of the secondary appliance 200' may use the session states 715 to set up configuration and operation of the cores 505' to maintain the operation and functionality of the sessions. In some embodiments, cores 505' of the secondary appliance 200' use the configuration/operation information 615 to configure operation of each core 505'. The operation of each core 505' may be configured in accordance with the operations of the cores 505 of the primary appliance 200 prior to the failover. Similarly, SSF modules 710 of the cores 505' may use session states 715A'-N' to configure each session assigned to each core 505' in accordance to the settings described by the session states 715A'-N'. As such in case of a failover, sessions may be maintained by a secondary appliance 200' in accordance with the states established by the primary appliance 200. Each core 505' of the secondary appliance 200' may take over the operation and handling of the sessions in accordance with the most up to date data of each session state 715 received from the primary appliance 200.

H. Systems and Methods for Implementing Connection Mirroring in a Multi-Core System In order to keep connections alive upon a failover event, the appliance may include various connection failover functionality to maintain and keep the existing connections alive. Under such configurations, the connection between a client and a server over the virtual server may be unaffected by the failover event. In a multi-core intermediary appliance, such functionality may be implemented using connection mirroring, which may also be referred to as CM.

Connection mirroring functionality may operate in two modes: stateless and stateful. In some embodiments of a stateless connection mirroring, neither primary nor secondary nodes have any memory or runtime overhead. For example, a stateless connection may include no record of previous transmissions or transactions. Data flow established on a primary node after failover event may be reestablished or copied onto new primary node based on incoming network packets.

The stateless failover functionality may operate on a particular type of virtual server, such as a vserver 275, which may include the functionality for implementing stateless CM. In some embodiments, the stateless failover functionality may rely on USIP to be set on all services under the connection mirroring compatible virtual server. In some embodiments, the stateless failover functionality may use source IP persistency to ensure that packets that are seen after failover on the client side are directed to the proper server.

The stateful CM may be suitable for TCP service types, such as the TCP service, FTP service, SSL services such as SSL_BRIDGE. The stateful CM may be compatible with any load balancing method and persistence scheme and may be suitable for allowed service types. Stateful CM may also work with UDP protocol and any virtual server, including type ANY virtual server. Stateful CM may utilize more of the memory than the stateless CM functionality and may have a larger runtime overhead. In some embodiments, the stateful CM includes the functionality that maintains a structure to keep to keep knowledge of process control blocks (PCBs). The PCBs may include any dynamic structure resident in memory which stores information about a process. PCBs may include a process identifier, a parent process identifier, a process state, a memory information, a program control data, and general accounting information. The stateful CM functionality may include NAT PCBs for a connection. Stateful CM function may use sequence and ACK numbers synchronized between high availability (HA) nodes, or HA nodes, in real time for TCP protocols. Stateful CM may also use synchronization of some events on the PCBs, such as data holding for server side connection establishment, payload reassembly in case of token load balancing method and even SSL_BRIDGE; synchronization of the application events, such as BA events, in case of FTP.

In multi-core systems, CM may be used to resolve some of the problems relating to connection management. For example, CM may help resolve the issue occurring when a pair of connections residing on a core of a primary system are split among some cores of the secondary system. Another problem may occur when each core on a primary system establishes SSF connection to the secondary system. In such instances, it may not be guaranteed that those connection will be core-to-core. For example, all SSF connections from the primary system end up on one core of the secondary system. In some instances, a meta data of CM connections may be tagged by cm_devno, which may be used for the hash (e.g., RSS hash) on both primary and secondary system and may be treated as globally unique in the single core system. However, in a multi-core system such features are unique only within a packet engine of a core of the multi-core system. As the result, a single packet engine on a secondary system may receive two or more CM connections with the same cm_devno. In such a problem CM may provide a globally unique key for such features, allowing them to be uniquely distinguished among the cores and packet engines.

In stateless CM, a virtual server capable of supporting stateless connections may be used. In some embodiments, a virtual server of type ANY is used for stateless CM. The data flow may be presented as a pair of PCBs, such as NAT PCBs. PCBs are protocol control blocks or otherwise data structures representing or holding information about the connection. The flow of the network traffic after failover may be established based on the incoming packets. For example, if first packet after failover is received from the client, the system may establish flow in the same way as it would have received the incoming request as a new request on a listening service of type ANY virtual server. The virtual server may include modifications required for non SYN packet to create NAT PCBs. In some embodiments, a persistence functionality, such as source IP persistence is used. In further embodiments, a load balancing functionality is used, such as source IP source port hash load balancing method, an example of which is SOURCEIPSOURCEPORTHASH.

Upon a failover, when a first incoming packet is received on the server side, the system may determine if the incoming packet belongs to a service that is bound to the CM enabled vserver. If it is determined that the packet does belong to the service, the CM system may call a function, such as "ns_connfailover_handler" to establish NAT PCBs flow. The server side NAT PCB may be installed on the core that gets the packet. However, if the client NAT PCB belongs to a different core, a software RSS filter may be installed on the core that gets the packet instead of the client NAT PCB. The RSS filter may be installed using an instruction, such as: (NS_RSSF_SENDMSG_NATPCB(NS_RSSF_MSG_ADD, c_natpcb, ns_rssf_callback)). The RSS filter installed instead of the client NAT PCB so that traffic arriving on that core for that NAT PCB is forwarded to the core where the NAT PCB flow resides. If server side NAT PCB and client side NAT PCB belong to the same core, the client side NAT PCB is created and link is established.

When client connection is established on the primary node, the PCB create message, such as SSF_CM_CREATE_PCB, may be sent to the secondary node. Upon receiving the PCB create message the target core may be identified. If the target core is the one on which message was received, the client PCB may be created. If target core is not the one on which message was received, then a core-to-core message may be sent to the target core to create the PCB on the target core.

In the instances in which a link event is sent to the secondary node, the client side PCB may be looked up to determine which core it was created on. The link message may be a message, such as SSF_CM_LINK_PCB, which may be sent along with the information about server side connection. If it is determined that the core on which the client side PCB was created is the same core on which message was received, the server side PCB may be created on the same core as well. However, if it is determined that it is a different core, a core-to-core message may be sent to the target core for processing. Then, the core where server side PCB would have belonged may be determined and if it is not the core where server side PCB is created, the software RSS filter may be installed on the core where server side PCB would have been created.

The port on which the server connection may be listened to may be blocked. Traffic based updates, such as SSF_CM_PCB_UPDATE may be sent from the primary to the secondary upon receiving the "new" ACK. The new ACK message may indicate that the recipient has received the data. If the core on which update is received is the same core on which the PCB pair exists, then the data may be directly updated. However, if the core on which the update is received is different, then a core-to-core message may be sent to the core where the PCB pair exists.

Once NAT PCB flow is created on the primary node, the message SSF_CM_LINK_NATPCB is sent to the secondary node. On the secondary node, NAT PCBs may be created on the core on which the server NAT PCB belongs according to RSS. Similarly, on the core on which the client NAT PCB would have belonged, software RSS filter may instead be installed. SSF connections may be established from every core of the primary system to the secondary system. On the secondary system, SSF connections may land on any core. The same may also occur in asymmetric configurations, when the primary node and the secondary node are not running on the same hardware configuration.

In one embodiment, a design is adopted to the case when connections are not attached to the "proper" core on the secondary. However if each core on primary node establishes an SSF connection to each core on the secondary node, then the amount of core-to-core messages inside the secondary unit may be drastically reduced to only RSS filter messages. This may come at the expense of having many connections and requirement to manage them. The primary unit may know RSS key of the secondary unit. By using that key the primary unit may calculate the core on the secondary where connection must reside and use connection to that core for the messages related to this connection.

Figure 8A:
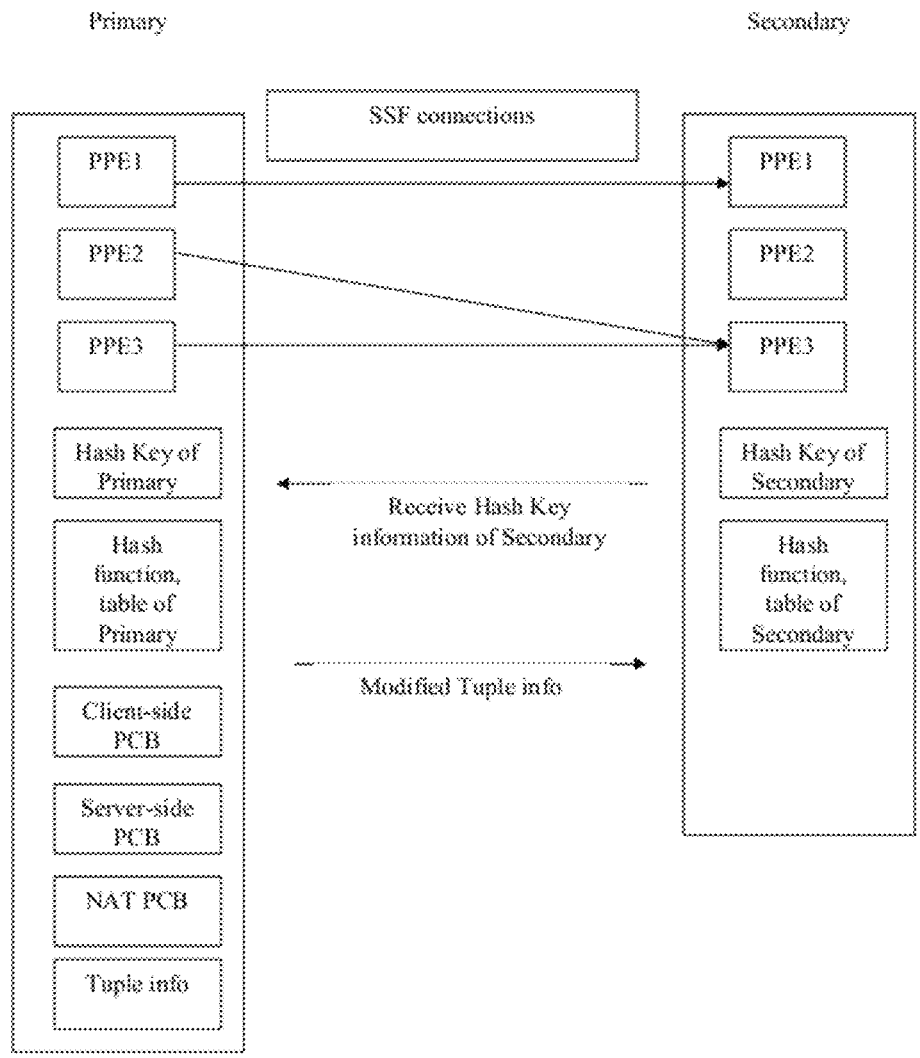
FIG. 8A is block diagram of an embodiment of a system for implementing connection mirroring in a multi-core system.

Referring now to FIG. 8A, an embodiment of a CM system in which SSF connections from a primary packet engine lands on packet engines of a secondary node is illustrated. The SSF connections from primary packet engine 2, also referred to as PPE2, and packet engine 3, also referred to as PPE3, may land on packet engine 3, or PPE 3 of the secondary node. In one embodiment, the PPE2 of the primary node sends request to create a PCB. This PCB may belong to the PPE2 on the secondary node. The PCB creation process may occur via core-to-core messaging between PP3 and PPE2 on the secondary. In one embodiment, an error may occur on PPE2 of the secondary and PCB may fail to create. In this case secondary node may send a SSF_CM_DISABLE_PCB message to primary asking to disable CM on this PCB as the secondary failed to create it. On the secondary system this process may go through the callback function of the core-to-core message and when PPE3 is instructed by PPE2 to send DISABLE message, PPE3 may send this message on the same connection on which original request came. This may be done in order to avoid a core-to-core messaging on the primary as requested PCB belongs to the same core whose connection is used in this transaction.

After SSF CM connection has been established, the primary node may send a command to clear all the sessions on the secondary. The command may be SSF_CM_CLEAR command and may carry the core ID on the primary node from which it was sent. SSF_CM_CLEAR may not include any data in the command structure and SSF header is used for that purpose.

The core identifier may be added to the command structure. In some embodiments a, SSF_CM_CLEAR may include instructions or be designed based on the following pseudo code:

```
typedef struct ns_cm_clear
{ ssf_cmd_t cmd;
u32bits source_core_id;
} ns_cm_clear_t;
```

The source_core_id will be stored in the ns_ssf app struct on the SSF PCB:

```
typedef struct nsssf_info
{   NS_CLIST_ENTRY(nspcb) cltpcb_list;
    /* Incomplete data processing variables */
    char *buff;   /* Buffer where data is assembled (command and session) */
    u16bits btoc; /* Bytes to complete counter */
    u16bits bsize;/* Size of the data after command (comes as in the second byte of command) */
    char cbuff[ssf_cmd_s];
    char *bptr;
    u16bits flags;
    u16bits app_type;
    u08bits source_core_id;
    u08bits remaining[3];
} nsssf_svr_info_t;
```

The source core identifier may be stored in the CM sessions. When the message needs to be sent from the secondary and the core has more then one connection, the connection with the same source core identifier may be selected. This configuration may avoid core-to-core messages on the primary node.

An additional entity may be created on the appliance for CM purposes. This additional entity may be called CM session and may include instructions based on the following embodiment of pseudo code:

```
typedef struct cm_session {
u16bits b64_flags;
u16bits cm_flags;
NS_LIST_ENTRY(cm_session) cm_hash;   /* Hash of mirroring connections */
NS_CLIST_ENTRY(cm_session) cm_list; /* List of mirroring connections */
u32bits cm_devno;   /* Key for the cm_hash */
void *cm_pcb;        /* Points to either PCB or NATPCB */
u32bits cm_incarnation;/* Used during initialization process */
    u32bits cm_last_activity; /* Last activity on the session */
    u32bits cm_reserved[7];
} cm_session_t;
```

This entity may be used to represent CM PCBs and NAT PCBs on both nodes: the primary and the secondary. On the secondary node, PCBs and/or NAT PCBs may not reside in the normal hash tables and global lists. The only way to access these PCBs may be through CM sessions. In some embodiments, cm_devno may be used as a key to the hash table, containing CM sessions. The value of this field may be created on the primary node (by incrementing nscm_devno) and may be used later on the secondary as it may be passed to the secondary via CM messages.

In some embodiments, nscm_devno may be unique per each core, but not globally. Therefore, another way to uniquely identify CM sessions may be used. In some embodiments, this problem may be resolved by using the source IP, destination IP, source port and destination port of the TCP and/or UDP traffic. For example, in CM functions TCP and UDP may be uniquely identified by SRCP_IP, SRC_PORT, DST_IP, DST_PORT and this combination may remain unique in the nCore system. In order to utilize this, function cm_session_t may be changed in some embodiments based on the following pseudo code:

```
typedef struct cm_session {
    ...
    u32bits cm_devno;
    u32bits cm_bothports;
    u32bits cm_srcip;   /* Keys for the cm_hash */
    u32bits cm_dstip;
    ...
} cm_session_t;
```

In some embodiments, Cm_devno, however, may remain in the structure for display purposes. Structures may represent SSF messages and may include IP and port based lookup information, such as embodiments of the following pseudo code:

```
typedef struct ns_cm_server_select_pcb
{    ssf_cmd_t cmd;
    ns_cm_pcb_lookup_info_t cm_lookup;
    ns_cm_sip_info_t cm_server_info;
    ns_cm_sip_info_t cm_lbvip_info;
    u08bits cm_devname[SERVER_UFN];
```

-continued

```
} ns_cm_server_select_pcb_t;
typedef struct ns_cm_nsb
{       ssf_cmd_t cmd;
        ns_cm_pcb_lookup_info_t cm_lookup;
#define _TN(type, name) type cm_##name;
        ns_cm_nsb_info_list
        ns_cm_pcb_update_list
        #undef _TN
} ns_cm_nsb_t; /* nsb to hold, receive tcp parameters are updated */
typedef struct ns_cm_link_pcb
{       ssf_cmd_t cmd;
        ns_cm_pcb_lookup_info_t cm_lookup;
        ns_cm_pcb_info_t cm_link;
} ns_cm_link_pcb_t;
typedef struct ns_cm_getpcb
{       ssf_cmd_t cmd;
        ns_cm_pcb_lookup_info_t cm_lookup;
}       ns_cm_get_pcb_t;
typedef struct ns_cm_pcb_update_info
{       ssf_cmd_t cmd;
        ns_cm_pcb_lookup_info_t cm_lookup;
#define _TN(type, name) type cm_##name;
        ns_cm_pcb_update_list
        ns_cm_pcb_flags_list
#undef _TN
        u32bits cm_link_info;
#define _TN(type, name) type cm_forw_##name;
        ns_cm_pcb_update_list
        ns_cm_pcb_flags_list
#undef _TN
} ns_cm_pcb_update_t;
typedef struct ns_cm_getnatpcb
{       ssf_cmd_t cmd;
        ns_cm_pcb_lookup_info_t cm_lookup;
}       ns_cm_getnatpcb_t;
typedef struct ns_cm_ftp_data
{       ssf_cmd_t cmd;
        ns_cm_pcb_lookup_info_t cm_lookup; /* Listening natpcb
        devno for lookup */
        ns_cm_pcb_lookup_info_t real_natpcb; /* Real natpcb
        parameters */
        mac_entry_t cm_fmac;
        mac_entry_t cm_lmac;
} ns_cm_ftp_data_t;
typedef struct ns_cm_ftp_init
{       ssf_cmd_t cmd;
        ns_cm_pcb_lookup_info_t cm_lookup;
        ns_cm_pcb_lookup_info_t c_natpcb;
        ns_cm_pcb_lookup_info_t s_natpcb;
        mac_entry_t cm_lmac;
```

-continued

```
        mac_entry_t cm_fmac;
        u32bits cm_insertion_seq;
        char cm_adv_data[50]; /* same as ftp_adv_data */
        u16bits cm_olddata_len;
        u32bits cm_ftp_type; /* FTP request/response type */
        u32bits cm_new_ftp_type; /* If ftp command needs to be
        changed */
        u32bits cm_ftpcmd_chg_seq; /* seq no. at which new ftp
        cmd has to be modified */
} ns_cm_ftp_init_t;
typedef struct ns_cm_ftp_sync
{       ssf_cmd_t cmd;
        ns_cm_pcb_lookup_info_t cm_lookup;
        ns_cm_natpcb_info_t c_natpcb;       /* Client natpcb */
        ns_cm_natpcb_info_t s_natpcb;       /* Server natpcb */
} ns_cm_ftp_sync_t;
typedef struct ns_cm_ba_entry
{       ssf_cmd_t cmd;
        ns_cm_pcb_lookup_info_t cm_lookup;
        short cm_total;                     /* No. of bytes added/deleted
        before this ba entry */
        short cm_increment;                 /* Should be signed,could be
                                              negative for deletion */
        u32bits cm_InsertionSeq;            /* The insertion seq where
                                              the data is insert/delete */
        u32bits cm_insertionFlags;          /* Flag for all static data
                                              insertion/deletion */
        u16bits cm_buffsize;                /* Current new data buffer size */
        u16bits cm_newdatalen;              /* No. of bytes in the new
                                              data buffer */
} ns_cm_ba_entry_t;
CM_HASH
```

In some embodiments, on the secondary node, CM_HASH on the core where SSF connection lands may maintain not only the CM sessions created on this core, but also the information about CM sessions sent for creation onto other cores. This may include informational entries. In some embodiments, RSS calculation may not give the right core where NAT PCB or PCB resides. In these embodiments, the sent information from the time of the creation of the PCB may be used to identify the location.

In some embodiments, instead of nscm_devno, four topples/tuples should be assigned to CM session upon creation. A PCB may include instructions based on the following pseudo code: u32 bits nscm_enable_pcb(nspcb_t*pcb, u32 bits devno);

```
#define NS_CM_ENABLE_PCB(pcb, devno) do {\
    if(((pcb)->nscm_session=(cm_session_t *)ns_alloc_b64(b64_cm_sessions_cur_cnt)))\
    {\      struct nscmpcbhash *cm_hash;\
            (pcb)->u_flags |= NSPCB_U_CM_PCB;\
            NS_CLIST_CLEAR((pcb)->nscm_session,cm_list);\
            NS_LIST_CLEAR((pcb)->nscm_session,cm_hash);\
            if(nstcp_cur_ssf_flags & NSSSF_CM_PCB_ACTION)\
                    /* We are in the middle PCB synchronization to the secondary, so insert
new session before the current interleaving point */\
                    NS_CLIST_INSERT_BEFORE(nto_cm_session, (pcb)->nscm_session,
cm_list);\
            else\
                    /* Normal work, insert new session into the tail of the list */\
                    NS_CLIST_QTAIL(&nscm_session_head_pcb, (pcb)->nscm_session,
cm_list);\
            (pcb)->nscm_session->cm_pcb=(void *)(pcb);\
            (pcb)->nscm_session->cm_incarnation=nscm_incarnation;\
            (pcb)->nscm_session->cm_devno=(devno);\
            (pcb)->nscm_session->cm_srcip=(pcb)-> pcb_fip;\
(pcb)->nscm_session->cm_dstip=(pcb)->pcb_lip;\
            (pcb)->nscm_session->cm_bothports=(pcb)-> pcb_bothports;\
            (pcb)->nscm_session->cm_flags = NSCM_FLAG_PCB;\
            (pcb)->nscm_session->cm_last_activity=ns_cur10msticks( );\
            cm_hash=&nscm_pcbhash[nscm_hashfunc((pcb)->nscm_session->cm_devno)];\
```

```
        NS_LIST_INSERT_HEAD(cm_hash, (pcb)->nscm_session, cm_hash);\
        nscur_connmirror_pcb++;\
    }\
    else\
        nscm_err_pcb_enable++;\
} while (0)
```

In some embodiments, NAT PCB may include instructions based on the following pseudo code:

```
u32bits nscm_enable_natpcb(ns_natpcb_t *natpcb,u32bits devno)
#define NS_CM_ENABLE_NATPCB(natpcb,devno) do {\
    if(((natpcb)->nscm_session=(cm_session_t *)ns_alloc_b64(b64_cm_sessions_cur_cnt)))\
    {\
        struct nscmpcbhash *cm_hash;\
        (natpcb)->natpcb_p_flags |= NS_NATPCB_P_CM_NATPCB;\
        NS_CLIST_CLEAR((natpcb)->nscm_session,cm_list);\
        NS_LIST_CLEAR((natpcb)->nscm_session,cm_hash);\
        if(nstcp_cur_ssf_flags & NSSSF_CM_NATPCB_ACTION)\
            /* We are in the middle NATPCB synchronization to the secondary, so
insert new session before the current interleaving point */\
            NS_CLIST_INSERT_BEFORE(nto_cm_session, (natpcb)-
>nscm_session, cm_list);\
        else\
            /* Normal work, insert new session into the tailof the list */\
            NS_CLIST_QTAIL(&nscm_session_head_natpcb, (natpcb)-
>nscm_session, cm_list);\
        (natpcb)->nscm_session->cm_pcb=(void *)(natpcb);\
        (natpcb)->nscm_session->cm_incarnation=nscm_incarnation;\
        (natpcb)->nscm_session->cm_devno=(devno);\
(natpcb)->nscm_session->cm_srcip=(natpcb)->natpcb_dstip;\
(natpcb)->nscm_session->cm_dsstip=(natpcb)->natpcb_srcip;\
(natpcb)->nscm_session->cm_bothports=(natpcb)->natpcb_bothports;\
        (natpcb)->nscm_session->cm_flags = NSCM_FLAG_NATPCB;\
        (natpcb)->nscm_session->cm_last_activity=ns_cur10msticks( );\
        cm_hash=&nscm_pcbhash[nscm_hashfunc((natpcb)->nscm_session-
>cm_devno)];\
        NS_LIST_INSERT_HEAD(cm_hash, (natpcb)->nscm_session, cm_hash);\
        nscur_connmirror_natpcb++;\
    }\
    else\
        nscm_err_natpcb_enable++;\
} while (0)
```

In some embodiments, function nsssf_input may dispatch SSF commands. Those functions which belong to the CM feature may be identified by "_CM_" designation in definitions. In some of the functions, a determination may be made of whether the message should be processed by the core which received the command or some other core. This may be done by calling looking up cm_session and checking owner_core id against local_target_id.

In some embodiments, the code of the commands that act on existing cm_sessions may be based on any of the following pseudo code:

```
Command_handle_func(ssf_pcb)
{ Cm_command_structure* info=(ns_cm_nsb_t *)(pcb->ns_ssf.buff);
...
Cm_session= nscm_hashlookup(info->cm_lookup);
If(cm_session-> cm_owner_core!=local_targetid)
{   If(send_c2c_message(cm_session-> cm_owner_core, info,
    info_size)
    Error_handling( );     }
Else
{   Cm_cmd_handler_real( );     }
Return;
}
```

In some embodiments, the functions that create the CM session, may include instructions may be based on the following pseudo code:

```
Command_handle_func(ssf_pcb)
{   Cm_create_command_structure*
    info=(ns_cm_nsb_t *)(pcb->ns_ssf.buff);
Owner_core=ns_ip_get_vmpeid(corresponding_protocol_tcp_or_udp,
info->cm_lookup.cm_dstip, info->cm_lookup.cm_srcip,
info->cm_lookup.cm_pcb_bothports);
If(owner_core!=local_targetid)
{   If(send_c2c_message(owner_core,into, info_size)
    Error_handling( );     }
Else
{   Cm_create_cmd_handler_real( );     }
}
```

In some embodiments, the first command that is sent from primary core to the secondary core may be SSF_CM_CLEAR which may instruct the secondary to clean all the CM connections it knows of. Upon completing the cleanup, the secondary core may send SSF_CM_CLEAR_COMPLETE to the primary core indicating that the cleanup is complete and the primary may start pushing the CM connections it knows of to the secondary core.

In some embodiments, when the system uses the primary node and establishes SSF connection to the secondary from every core, any connection may be used to send SSF_CM_CLEAR command. On the first received command, the secondary may initiate cleanup on all cores.

In some embodiments, a primary multi-core device may set out to set up a failover mechanism for maintaining connections and keeping such connections alive by a secondary multi-core device, should the primary device fail. In one example, SSF connections may be used between the cores of the two devices and each device may also utilize an RSS key for flow distributor or receiver side scaling. A first core of a primary multi-core device may be the core maintaining a connection between a client and a server. The first core of the primary device may include information about the connection, such as the tuple information, e.g. source IP address, destination IP address, port number for the client side, port number for the server side, MAC addresses for the client and server as well as any other connection related information such as connection based encryption/decryption information, compression decompression or any other connection related processing instructions or settings. The first core of the primary appliance may set up a PCB as a data structure in which the connection related information will be stored and which may be used for supporting and/or servicing the connection.

The primary device may intend to set up a backup of the same connection on a core of a secondary multi-core intermediary device which may serve as a backup device keeping any connections of the primary device alive should the primary device experience a failure. Setting up a backup of the connection may entail performing any necessary steps so that the core on the secondary device may take over and process any incoming requests with respect to the connection should such requests arise. This may include setting up a connection related PCB on the secondary device or sending to the secondary device any connection related information needed to set up a backup connection. Such information may include a client side IP addresses, server side and client side MAC addresses, server side and client side port numbers and any other process related settings and/or configurations, such as compression/decompression information, encryption/decryption settings and any connection specific processing functionalities.

In order to set up a backup of a connection on a secondary device, a packet engine on the core of the primary device responsible for the connection may use an algorithm to identify the target core of the secondary device on which the connection will be established. Such algorithm may be an RSS algorithm, and may use a hash or RSS key, function and/or table. The algorithm may enable the packet engine to calculate a target core on the secondary multi-core device based on the information such as an secondary device's RSS key and tuple information of the connection to be backed up. The tuple information of the connection may include any connection specific information, for example a source IP address, a destination IP address, a client side port number, a server side port number, a source MAC address, a destination MAC address or any other information helping uniquely identify the connection. In some embodiments, the tuple information is a 4-tuple information of a connection, such as a source IP address, destination IP address, source port number and destination port number. Once the algorithm processes the RSS key and the tuple information, the algorithm may output a result which identifies the core on the secondary device which will support the backup of the connection.

As the RSS key of the secondary device may be different than the RSS of the primary device, the target core of the secondary does not have to correspond to the core that is the primary. As such, since the RSS key of the secondary device and the connection 4-tuple information is unique, the RSS algorithm may repeatedly and reliably produce the same result using these same inputs. As such, should an RSS algorithm running on the secondary device process using the same inputs, namely the RSS key of the secondary device and the 4-tuple information of the connection, the RSS algorithm on the secondary device would still identify the same target core of the secondary device.

Once the target core of the secondary is identified by the primary, the core on the primary device may move forward to establish a new direct connection between the primary core on the primary device and the target core on the second device. As the secondary device may also use an RSS algorithm in order to assign new connections to the cores, the primary device may modify the transmission to the target core to ensure that the RSS algorithm on the secondary core picks the target core when evaluating its own inputs to the algorithm. As the RSS algorithm on the secondary device uses the RSS key of the secondary device and the 4-tuple information of the incoming connection request from the primary device as inputs into the RSS algorithm, the primary device may compare the core identified by the result and compare this core with the target core. Should the core identified by the RSS algorithm be different than the desired core, the primary device may modify the 4-tuple information of the new connection request to ensure that the target core of the secondary device is identified by the outcome of the RSS algorithm calculation.

In one example, in order to ensure that the RSS algorithm on the secondary device routs the new connection request to the desired target core, the primary device may run the RSS algorithm on the primary device while using as inputs the secondary device RSS key and the 4-tuple information of the new request. If the result of the RSS calculation identifies a core different from the desired target core, the device may change a port in the 4-tuple information with a different available port and run the RSS algorithm again. In some embodiments, both ports may be modified while this iteration is performed. The RSS algorithm of the primary device may go through multiple iterations and may modify any of the ports, any of the IP addresses any other information of the tuple until the RSS algorithm reaches the desired result of the target core. Once the RSS algorithm of the primary appliance identifies the target core using the RSS key of the secondary appliance and this latest 4-tuple configuration, the primary appliance may send the connection request using the latest 4-tuple configuration to the secondary appliance. As the secondary appliance RSS algorithm will also use the secondary device RSS key and the 4-tuple configuration of the request to identify the core to which to forward the connection request, the RSS algorithm of the secondary appliance will choose to forward the connection request to the target core of the secondary appliance, as desired by the primary device.

Responsive to the request, the target core of the second appliance may establish a connection with the requesting core of the primary appliance. This connection may be used to transmit between the primary core and the target core any information about the connection of the client to the appliance and/or server, such as the PCB, NATPCB and other information about the connection. With this information, the target core may establish a mirror of the connection on the secondary appliance.

The media for transferring data between the primary and secondary nodes or devices may be SSF. SSF may be used for any connection mirroring functionality. Every core on the primary may establish a connection to a secondary node. On secondary node SSF connections may land on any core, so that even multiple connections may land on one core and none on another. However, this may be controlled using the technique based on tuple information, described above.

When a client connection is established on primary, a PCB create message, such as SSF_CM_CREATE_PCB may be sent to the secondary node. The PCB create message may include any and all information for creating a connection or setting up the core for handling and maintaining a connection. Upon receiving the PCB create message by the secondary device the target core may be identified using the algorithm described above. If the target core is the one on which message was received, client PCB may be created. If target core is not the one on which message was received, then a core-to-core message may be sent to the target core to create PCB there. However, the PCB may also be sent by modifying the tuple information of the connection by the primary device, as described above.

In case that a link message, such as SSF_CM_LINK_PCB with the information about server side connection is sent to the secondary, the client side PCB may be looked up to determine which core it was created on. If the core where client side PCB was created is the same as the core on which message was received, the server side PCB may be created on this core as well. However, if it turns out to be a different core, then a core-to-core message may be sent to the target core for processing. Next the core where server side PCB would have belonged is determined and if this is not the core where server side PCB is created, the software RSS filter may be installed on the core where server side PCB would have been created.

In some embodiments, a port in the core where the server connection will end up may be blocked and reserved. Traffic based updates, such as SSF_CM_PCB_UPDATE, may be sent from the primary to the secondary upon receiving the "new" ACK, which means that recipient has received the data and acknowledges it. If the core on which update is received the same where PCB pair exists the data may be directly updated, if the core is different, then a core-to-core message may be sent to the core where the PCB pair exists. Once a NAT PCBs flow is created on primary, the message SSF_CM_LINK_NATPCB may be sent to the secondary. On the secondary, NAT PCBs may be created on the core where NAT PCB belongs according to the algorithm or the RSS and on the core where client NAT PCB would have belonged software RSS filter may be installed.

Figure 8B:
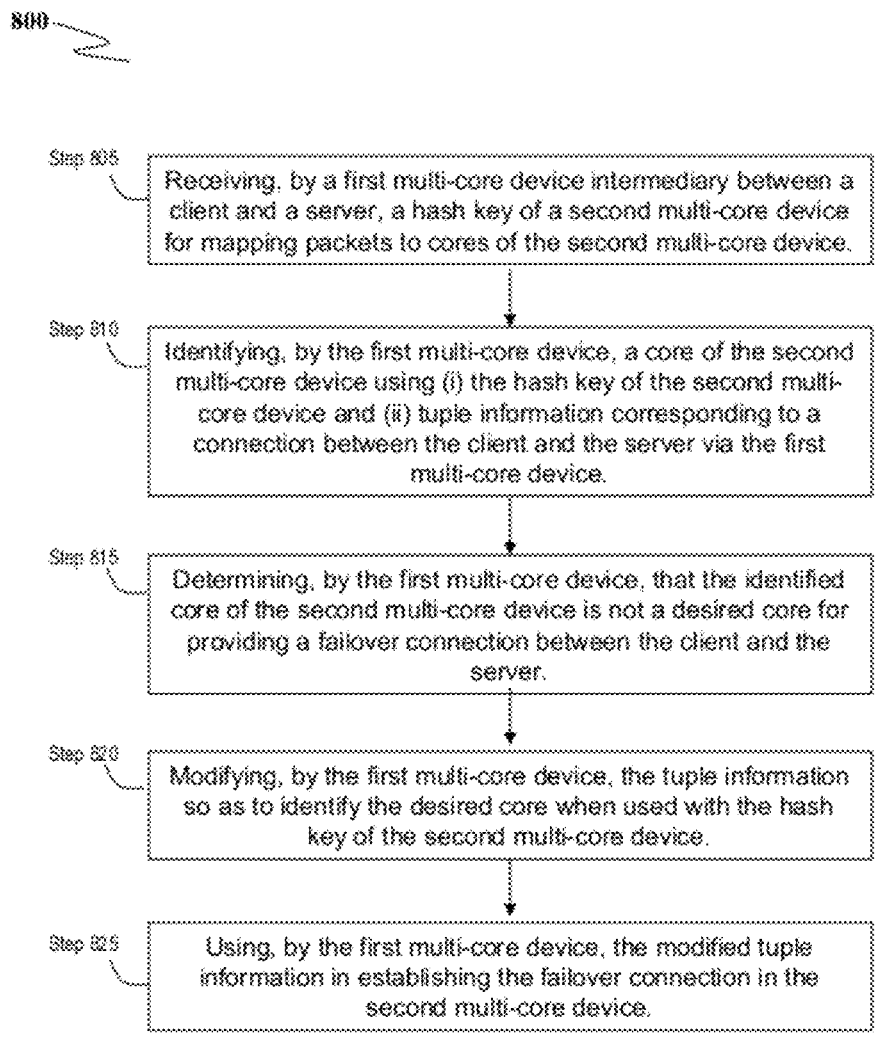
FIG. 8B is a flow diagram of an embodiment of steps of a method for implementing connection mirroring in a multi-core system.

Referring now to FIG. 8B, a method for providing failover connection mirroring between two or more multi-core devices intermediary between a client and a server is depicted. The method may include receiving, by a multi-core device intermediary between a client and a server, a hash key of a second multi-core device, such as the hash key used by the flow distributor of the second multi-core device for distributing packets across the cores of the second multi-core device (805). The multi-core device may identify a core of the other or second multi-core system using (i) the hash key of the other or second multi-core device and (ii) tuple information corresponding to a connection between the client and the server via the multi-core device (810). The multi-core device may determine that the identified core of the other multi-core device is not a desired core or the target core for providing a failover connection between the client and the server (815). The multi-core device may modify the tuple information so as to identify the desired core or target core when used with the hash key of the other multi-core system (820). The multi-core device may use the modified tuple information to establish the failover connection in the other multi-core device (825), such as by sending the modified tuple information to the second or other multi-core device.

Referring now to (805), a multi-core device intermediary between a client and a server may receive a hash key of another multi-core device used by the flow distributor or RSS of the another multi-code device. The multi-core device may sometimes be referred to as the primary, the first multi-core device or the first device, for example, as described above in connection with FIG. 8A. The other multi-core device may sometimes be referred to as the secondary or the second or the other multi-core device. In some embodiments, the device receives a request to establish a connection between the client and the server. Responsive to the request, the first multi-core device may send a request to another device to establish a failover connection between the client and the server, for example a failover connection via another device. The device may determine that a failover connection is appropriate or required based on the request. In some embodiments, the device receives another request to establish or facilitate the establishment of a failover connection. The device may determine that the secondary is a suitable and/or available device for providing the failover connection. In some embodiments, the device identifies the secondary as its failover device. The secondary may, in some cases, provide one or more existing failover connections corresponding to connections in the primary and/or another device.

In some embodiments, the device may request a hash key of the secondary. The hash key may correspond to a hash key used by the RSS or the flow distributor of the secondary, for use in mapping or distributing portions of network traffic to one or more cores in the secondary. In certain embodiments, the hash key of the secondary may be unique or different from the primary and/or other devices. The hash key of the secondary may be different from the primary due to a different hash function, table, number of cores in the primary, for example. The hash key of the secondary may be the same as the primary in some cases (e.g., out-of-the-box factory settings), but may be modified, updated or reconfigured over time. In some embodiments, the hash key may include a hash table and/or hash function. The hash key may include a program, translation device, code, script, certificate or other mechanism for use in identifying a core based on suitable inputs or coupling information (e.g., tuple information). The hash key may comprise a RSS key. In certain embodiments, the device may request a hash table and/or hash function of the secondary. The device may issue such a request responsive to receiving a request to establish a connection and/or a failover connection between the client and the server. In some embodiments, the device may request the secondary for, and/or receive information about, the hash key, table and/or function of the secondary. The device may be able to reproduce or simulate the functionality of the hash key, table and/or function of the secondary based on the information.

In further details of (810), the device may identify a core of the secondary using (i) the hash key of the secondary device and (ii) tuple information corresponding to a connection between the client and the server via the device. The device may use the algorithm of the flow distributor or RSS using the hask key of the secondary device and the tuple information as input. As such, the first device can determine on what core the connection would be assigned or distributed to if the connection passed thru the flow distributor or RSS of the second device. The device may identify or determine tuple information corresponding to a connection established, or being established, between the client and the server. In some embodiments, the device may generate or assemble the tuple information, for example, using information about the connection, which may include port and/or address (e.g. IP address) information of the client and/or server, for example. The device may determine the tuple information from the request for establishing the connection. The device may determine the tuple information from connection processes established with the connection, e.g., from one or more PCBs associated with the connection with the client and/or server. The device may determine the tuple information from a packet or traffic intercepted from the connection. The device may determine the tuple information via a core, virtual server, RSS engine, RSS algorithm, PCB, packet engine and/or a RSS module of the device. In some embodiments, the core of the device handling the connection between the client and the server provides the tuple information.

In certain embodiments, the device incorporates or reconfigures its RSS module with the secondary's hash key. The device may temporarily reconfigure its RSS module based on information extracted from the secondary's hash key, function and/or table. In some embodiments, the device generates or configures another RSS module based on the secondary's hash key. The device may use a virtual server, process or other entity to simulate the function of a RSS module using the secondary's hash key. The device may apply the tuple information to the hash key to evaluate to a result corresponding to a core of the second multi-core device. For example and in some embodiments, the device may configure an RSS algorithm to use the secondary's hash key and the tuple information. The RSS algorithm may evaluate, perform a calculation, or otherwise process the tuple information and/or hash key information into a result. The result may correspond to an identifier of a core. The identifier may be used to uniquely identify or map to one of a plurality of cores in a multi-core device, e.g., the secondary. The device may use the result or identifier to identify a core in the secondary, e.g., based on the existing tuple information.

Referring now to (815), the device may determine that the identified core of the secondary is not a desired core or target core for providing a failover connection between the client and the server. The device may request information from the secondary, including core and/or failover setup, capabilities and/or configurations. The device may communicate with the secondary to determine the status of one or more cores in the secondary. In some embodiments, the secondary may report the status and/or identification of one or more cores in the secondary, e.g., cores that are operational and/or have capacity to handle traffic or a connection. The device may identify, as a desired or target core for providing the failover connection, a core that is at least one of: available, operational and not handling another failover connection. The device may identify the desired or target core based on information about other failover connections in the secondary that the device had facilitated. In some embodiments, the device may identify, as the desired or target core, a core that is not supporting an existing failover connection.

The device may compare the result or identifier evaluated using the secondary's hash table, against an identifier of the desired or target core. In some embodiments, the target core of the secondary device may be the same core as the connection would be distributed on the primary device (e.g., core 1 on primary device so target core on secondary device is core 1). In some embodiments, the target core of the secondary device may be a core mapped to by the primary device (e.g., core 1 on primary device is mapped to core 2 on secondary device). In some embodiment, the device may determine that the result or identifier corresponds to the desired or target core. In other embodiments, the device may determine that the result or identifier does not correspond to the desired or target core. The secondary's hash key, table and/or function may map, translate or operate with tuple information (or information generated based at least in part on tuple information) to produce a result different from the hash key, table and/or function of the primary. For example, a certain tuple may consistently map to core 1 in the primary but to core 3 in the secondary. Another tuple may map to core 5 in the primary but core 2 in the secondary. In some embodiments, to predict how a tuple will map in the secondary, the primary may use or analyze the secondary's hash key. In certain embodiments, the primary may extract information from the secondary's hash key to determine what tuple will map to a certain desired core in the secondary. The primary may, for example, determine an inverse mapping function or table based on the hash key to identify what tuple information a desired or target core may map to.

In further details of (820), the device may modify the tuple information so as to identify the desired or target core when used with the hash key of the secondary (820). In some embodiments, the device may determine that the secondary's hash key translates or maps the tuple information to the desired or target core. The device may determine not to modify the tuple information responsive to successfully translating or mapping the tuple information to the desired core. In some embodiments, the device may determine that the tuple information has to be modified so that the tuple identifies the desired or target core when used with the secondary's hash key. The device may try one or more combinations or modifications of the tuple information with the secondary's hash key to try to match to the desired core. In some embodiments, the device may determine the modification (e.g., the minimum changes, to a port number for example) required to map to the desired or target core. The device may determine a modification to one or more of an address and/or a port in the tuple information. For example, the device may determine the modification based on an inverse mapping function or table derived from the secondary's hash key.

In some embodiments, the device may use port numbers from a range of available port numbers (source or destination) until a matching target core is computed using the secondary's hash key and the modified tuple information. In some embodiments, the port numbers may be mapped port numbers hosted by the primary and/or secondary device. In some embodiments, the device may use IP addresses from a range of available IP addresses (source or destination) until a matching target core is computed using the secondary's hash key and the modified tuple information. In some embodiments, the IP addresses numbers may be mapped IP addresses hosted by the primary and/or secondary device. In some embodiments, the device may use port numbers from a range of available port numbers (source or destination) in combination with IP addresses from a range of IP addresses until a matching target core is computed using the secondary's hash key and the modified tuple information.

In some embodiments, the device may determine that one or more modifications to the tuple information allows the secondary to map the modified tuple information to the desired core. The hash key may map one or more sets of tuple information to a particular core. The hash key setup may be configured so that many different configurations of client-server connections may be handled by a limited number of cores in each multi-core device. The device may determine a suitable modification from the one or more modifications determined. The device may determine a minimal or suitable change, from the one or more modifications, to apply to the tuple information. The minimal or suitable change may be a modification to a port number and/or an address in the tuple information.

Referring now to (825), the device may use the modified tuple information to establish the failover connection in the secondary. The primary device may send or provide the modified tuple information to the secondary device. The device may send a message to the secondary device to establish a mirrored failover connection based on the modified tuple information. The device may use the modified tuple information to establish the failover connection via the desired or target core of the secondary. In some embodiments, the device sends a copy of the traffic received from the client or server to the secondary, e.g., via a SSF connection. The device may instruct a gateway, router or other network device on the client-side and/or server-side to send a copy of the traffic received from the client or server to the secondary. The device may instruct or request the client and/or server to send a copy of packets transmitted from the client and/or server to the secondary. In some embodiments, the device may request or instruct the secondary to establish a connection with the client and server. The device may communicate the modified tuple information to the secondary to reconfigure the connection. The device may communicate the modified tuple information to the secondary to establish the failover connection. The device may establish a stateful failover connection in the secondary mirroring the connection in the first multi-core device. The connecting device (e.g., secondary) may retain or track session state in a stateful connection. In some embodiments, a modification in the tuple information corresponding to the client and the server does not affect the source and destination points of the connection, or their proper identification in the secondary.

In some embodiments, the device establishes a session or connection to the secondary. The connection or session may be referred to as a connection mirroring (CM) or SSF connection or session. The device may communicate any suitable information with the secondary using the established connection or session, for example, as discussed above in connection with FIG. 8A. The device may communicate any device or connection-related information, such as device settings, process configurations, connection or session state, device capabilities or functionalities, client and/or server information, to the secondary, for example, using any embodiment of the features and methods described in connection with FIGS. 7A and 7B.

In some embodiments, the device communicates client-side and/or server-side process information to the second multi-core device to establish the failover connection with the client and the server. The process information may be in the form of PCBs, for example as described above in connection with at least FIG. 8A. The process information may include some or all of the modified tuple information. The device may create a copy of the device's client-side and/or server-side PCB to convey to the secondary. The PCB(s) may enable the secondary to establish the client-side and/or server-side connection to the client and/or server. In some embodiments, the device may modify the PCB(s) corresponding to the modification applied to the tuple information. The device may include some or all of the modified tuple information in the PCB(s) for use by the secondary. The device may communicate the modified tuple information to the secondary via the PCB(s) transmitted to the secondary. In some embodiments, the device communicates network address translation information to the second multi-core device to establish the failover connection with the client and the server. This information may comprise, or be in the form of one or more NAT PCBs. In some embodiments, any of portion of the above-mentioned PCBs may be combined or re-arranged into one or more PCBs. Portions of these information may be communicated in batch or separately to the secondary via the CM session.

In some embodiments, the device may transmit a message to the secondary to establish one or more PCBs for the failover connection. The secondary may establish the PCBs to begin supporting a preliminary or temporary failover connection. The information (e.g., tuple or PCB information) and/or message (e.g., PCB creation request) communicated through the CM session may be received by a RSS engine or other module of the secondary. In some embodiments, the RSS engine may determine the desired core for establishing the failover connection. The RSS engine or algorithm may apply the modified tuple information to the secondary's hash key, function and/or table to determine the desired core. The RSS engine may forward the received information and/or message to the desired core for processing.

In some embodiments, the secondary sends the information and/or request to a core for processing, e.g., regardless or oblivious of whether it is the desired core. The core may be selected randomly, based on load-balancing, or a RSS process or other process. A packet engine, virtual server or RSS engine of the recipient core may determine if the information and/or message is meant for another core (e.g., the desired core). The recipient core may apply the modified tuple information to the secondary's hash key, function and/or table to determine the desired core. The recipient core may forward the received information (e.g., PCB(s)) and/or modified tuple information) and/or message to the desired core. The recipient core may send or convey the information to the desired core via core-to-core message or RSS processes, for example as described above in connection with at least FIG. 8A.

In some embodiments, the message is processed by a core that first receives the message (e.g., not the desired core). The device may send the message to establish connection processes in the secondary prior to conveying the tuple information and/or PCB information. The core may establish one or more PCBs, e.g., to temporarily handle the failover connection. The secondary may subsequently determine that the core is not the desired core. The secondary may transfer or relocate the established PCB(s), e.g., via core-to-core message or a RSS filter, to the desired core for failover handling.

In some embodiments, the device facilitates the establishment of a (e.g., second) failover connection via a second core of the secondary mirroring a connection via a second core of the first device. The device may facilitate or request establishment of a plurality of failover connections in the secondary mirroring connections via the device. In certain embodiments, the device may convey corresponding sets of tuple information to the secondary to setup each failover connection. The device may communication a plurality of sets of CM information (e.g., client-side, server-side and/or NAT PCBs) to the secondary for establishing the failover connections. In certain embodiments, each set of CM information is communicated via a separate CM session or connection. In other embodiments, the CM information may be communicated to the secondary by sharing one or more CM sessions.

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, floppy disk, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

Having described certain embodiments of these methods and systems, it will now become apparent to one of skill in the art that other embodiments incorporating the concepts of the invention may be used.

We claim:

1. A method for providing failover connection mirroring between multi-core devices intermediary between a client and a server, the method comprising:
   (a) receiving, by a first multi-core device intermediary between a client and a server, a hash key of a second multi-core device, the hash key used by the second multi-core device for determining which cores to distribute packets received by the second multi-core device, the hash key different from a second hash key used by the first multi-core device for determining which cores to distribute packets received by the first multi-core device;
   (b) identifying, by the first multi-core device, a core of the second multi-core device using (i) the hash key of the second multi-core device and (ii) tuple information corresponding to a connection between the client and the server via the first multi-core device;
   (c) determining, by the first multi-core device, that the identified core of the second multi-core device is not a target core for providing a failover connection between the client and the server;
   (d) modifying, by the first multi-core device, the tuple information so as to identify the target core when used with the hash key of the second multi-core device; and
   (e) using, by the first multi-core device, the modified tuple information in establishing the failover connection in the second multi-core device.

2. The method of claim 1, wherein (b) further comprises applying the tuple information to the hash key to evaluate to a result corresponding to a core of the second multi-core device.

3. The method of claim 1, wherein (c) further comprises identifying, as the target core for providing the failover connection, a core that is at least one of: available and operational.

4. The method of claim 1, wherein (d) further comprises modifying at least one of a port number and an address in the tuple information.

5. The method of claim 1, wherein (e) further comprises using the modified tuple information to establish the failover connection via the target core of the second multi-core device.

6. The method of claim 1, wherein (e) further comprises communicating the modified tuple information to the second multi-core device to establish the failover connection.

7. The method of claim 1, wherein (e) further comprises establishing a stateful failover connection in the second multi-core device mirroring the connection in the first multi-core device.

8. The method of claim 1, further comprising communicating client-side and server-side process information to the second multi-core device to establish the failover connection with the client and the server.

9. The method of claim 1, further comprising communicating network address translation information to the second multi-core device to establish the failover connection with the client and the server.

10. The method of claim 1, further comprising establishing a failover connection via a second core of the second multi-core device mirroring a connection via a second core of the first multi-core device.

11. A system for providing failover connection mirroring between multi-core devices intermediary between a client and a server, the system comprising:
   a first multi-core device intermediary between a client and a server;
   a hash key used by a second multi-core device for determining which cores to distribute packets received by the second multi-core device, the hash key different from a second hash key used by the first multi-core device for determining which cores to distribute packets received by the first multi-core device;
   wherein the first multi-core device identifies a core of the second multi-core device using (i) the hash key of the second multi-core device and (ii) tuple information corresponding to a connection between the client and the server via the first multi-core device, determines that the identified core of the second multi-core device is not a target core for providing a failover connection between the client and the server; and
   wherein the first multi-core device modifies the tuple information so as to identify the target core when used with the hash key of the second multi-core device and uses the modified tuple information in establishing the failover connection in the second multi-core device.

12. The system of claim 11, wherein the first multi-core device applies the tuple information to the hash key to evaluate to a result corresponding to a core of the second multi-core device.

13. The system of claim 11, wherein the first multi-core device identifies, as the target core for providing the failover connection, a core that is at least one of: available and operational.

14. The system of claim 11, wherein the modified tuple information comprises at least one of a port number and an address which is modified from that of the tuple information corresponding to the first connection.

15. The system of claim 11, wherein the modified tuple information to used to establish the failover connection via the target core of the second multi-core device.

16. The system of claim 11, wherein the first multi-core device communicates the modified tuple information to the second multi-core device to establish the failover connection.

17. The system of claim 11, wherein the modified tuple information to used to establish a stateful failover connection in the second multi-core device mirroring the connection in the first multi-core device.

18. The system of claim 11, wherein the first multi-core device communicates client-side and server-side process information to the second multi-core device to establish the failover connection with the client and the server.

19. The system of claim 11, wherein the first multi-core device communicates network address translation information to the second multi-core device to establish the failover connection with the client and the server.

20. The system of claim 11, wherein the first multi-core device further facilitates establishment of a failover connection via a second core of the second multi-core device mirroring a connection via a second core of the first multi-core device.

* * * * *